(12) United States Patent
Wedig et al.

(10) Patent No.: US 10,769,904 B2
(45) Date of Patent: *Sep. 8, 2020

(54) EVACUATION SYSTEM

(71) Applicant: ONEEVENT TECHNOLOGIES, INC., Mount Horeb, WI (US)

(72) Inventors: Kurt Joseph Wedig, Mount Horeb, WI (US); Daniel Ralph Parent, Mount Horeb, WI (US); Scott Holmstrom, Mount Horeb, WI (US); Paul Robert Mullaly, Santa Monica, CA (US)

(73) Assignee: OneEvent Technologies, Inc., Mount Horeb, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,021

(22) Filed: Nov. 14, 2019

(65) Prior Publication Data

US 2020/0082684 A1 Mar. 12, 2020

Related U.S. Application Data

(63) Continuation of application No. 16/027,115, filed on Jul. 3, 2018, now Pat. No. 10,540,871.

(Continued)

(51) Int. Cl.
*G08B 13/00* (2006.01)
*G08B 7/06* (2006.01)
(Continued)

(52) U.S. Cl.
CPC .......... *G08B 7/066* (2013.01); *G06Q 90/205* (2013.01); *G07C 9/00* (2013.01);
(Continued)

(58) Field of Classification Search
CPC ........ B60W 40/09; H04W 4/46; G06Q 40/08; G07C 5/008; G08G 1/22
See application file for complete search history.

(56) References Cited

U.S. PATENT DOCUMENTS 5,801,632 A 9/1998 Opal
6,150,935 A 11/2000 Anderson
(Continued)

OTHER PUBLICATIONS

Non-Final Office Action on U.S. Appl. No. 16/027,115 dated Mar. 19, 2019.

(Continued)

*Primary Examiner* — Munear T Akki
(74) *Attorney, Agent, or Firm* — Foley & Lardner LLP

(57) ABSTRACT

A method for monitoring devices based at least in part on detected conditions includes accumulating, by one or more sensory nodes, sensed information in an area that includes a controllable device. The method also includes analyzing the sensed information to identify historical information regarding the area that includes the controllable device. The method also includes sensing a condition within the area by the one or more sensory nodes. The method also includes determining, based at least in part on the sensed condition and at least in part on the historical information, that the sensed condition relates to the controllable device. The method further includes generating, responsive to said determining, an alert regarding the controllable device.

21 Claims, 21 Drawing Sheets

Related U.S. Application Data

(60) Provisional application No. 62/528,803, filed on Jul. 5, 2017.

(51) Int. Cl.

| | |
|---|---|
| *G08B 19/00* | (2006.01) |
| *G07C 9/00* | (2020.01) |
| *H04W 4/33* | (2018.01) |
| *G08B 31/00* | (2006.01) |
| *H04W 4/024* | (2018.01) |
| *G08B 25/14* | (2006.01) |
| *G08B 29/26* | (2006.01) |
| *G08B 13/196* | (2006.01) |
| *G08B 27/00* | (2006.01) |
| *G08B 25/08* | (2006.01) |
| *G06Q 90/00* | (2006.01) |
| *G08B 29/18* | (2006.01) |

(52) U.S. Cl.
CPC ....... *G08B 13/19684* (2013.01); *G08B 19/00* (2013.01); *G08B 25/08* (2013.01); *G08B 25/14* (2013.01); *G08B 27/001* (2013.01); *G08B 29/26* (2013.01); *G08B 31/00* (2013.01); *H04W 4/024* (2018.02); *H04W 4/33* (2018.02); *G08B 29/181* (2013.01)

(56) References Cited

U.S. PATENT DOCUMENTS

| | | | |
|---|---|---|---|
| 2002/0075244 A1* | 6/2002 | Tani | G06F 3/0481 |
| | | | 345/173 |
| 2009/0273470 A1 | 11/2009 | Sinkevicius et al. | |
| 2012/0098666 A1* | 4/2012 | Bavishi | F02D 19/025 |
| | | | 340/626 |
| 2012/0262294 A1* | 10/2012 | Nikolovski | G08B 21/043 |
| | | | 340/565 |
| 2015/0096352 A1 | 4/2015 | Peterson et al. | |
| 2015/0169190 A1* | 6/2015 | Girardeau | G06F 3/04842 |
| | | | 715/771 |
| 2018/0315200 A1 | 11/2018 | Davydov et al. | |

OTHER PUBLICATIONS

Notice of Allowance on U.S. Appl. No. 16/027,115 dated Sep. 3, 2019.

* cited by examiner

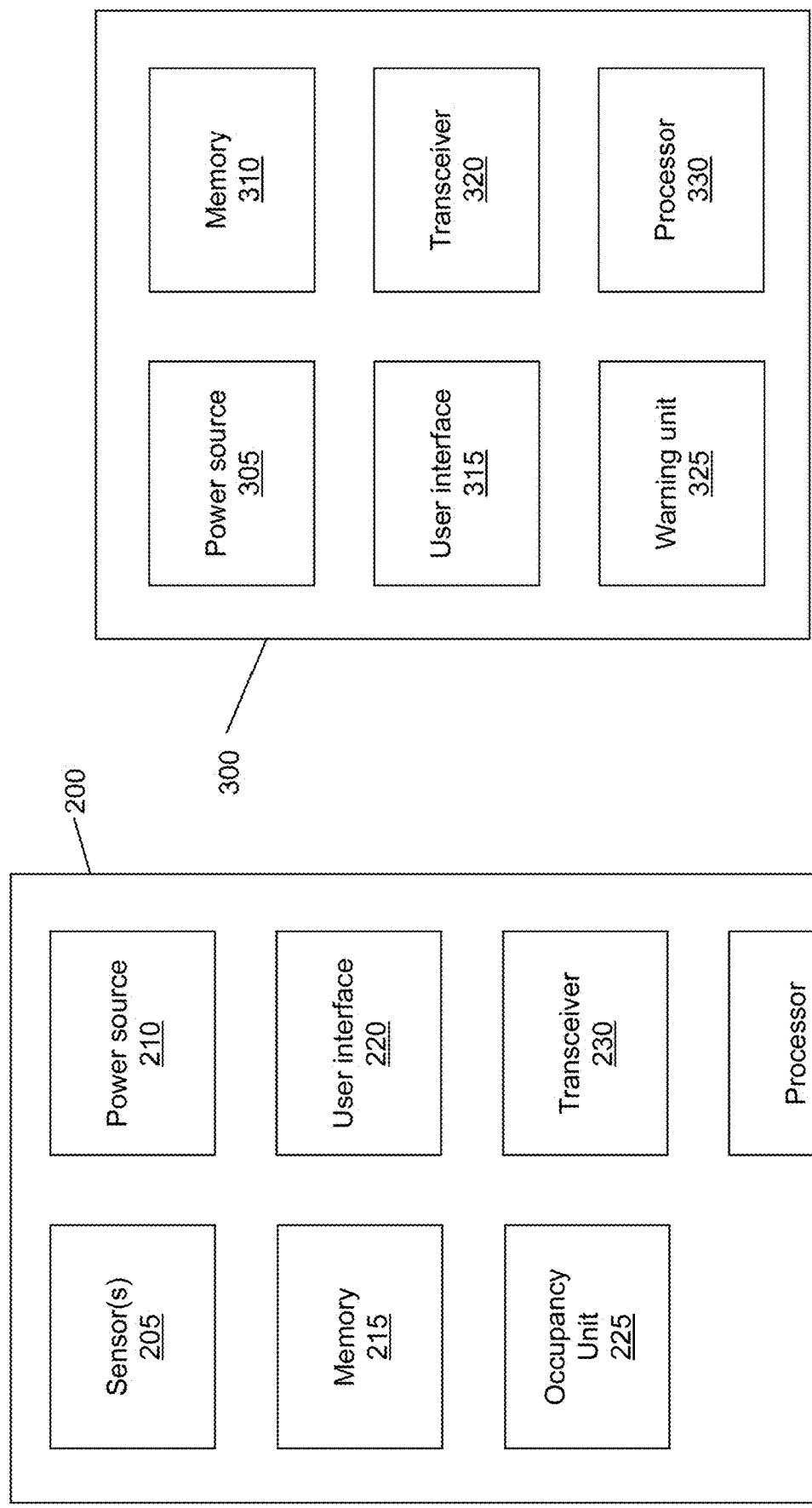

EVACUATION SYSTEM

RELATED APPLICATIONS

The present application is a continuation of U.S. patent application Ser. No. 16/027,115, filed on Jul. 3, 2018, which claims the benefit of U.S. Patent Application No. 62/528,803, filed on Jul. 5, 2017, and is related to U.S. application Ser. No. 15/620,097, filed on Jun. 12, 2017, which is a continuation of U.S. patent application Ser. No. 14/633,949, filed on Feb. 27, 2015 (now U.S. Pat. No. 9,679,449), which is a continuation-in-part application of U.S. patent application Ser. No. 13/083,266 filed Apr. 8, 2011 (now U.S. Pat. No. 8,970,365, issued on Mar. 3, 2015), which is a continuation-in-part of U.S. patent application Ser. No. 12/346,362, filed Dec. 30, 2008 (now U.S. Pat. No. 8,749,392, issued Jun. 10, 2014). U.S. patent application Ser. No. 13/083,266 is also a continuation-in-part application of U.S. patent application Ser. No. 12/389,665 filed Feb. 20, 2009 (now U.S. Pat. No. 8,253,553, issued Aug. 28, 2012). Each of these applications is incorporated herein by reference.

BACKGROUND

Most homes, office buildings, stores, etc. are equipped with one or more smoke detectors. In the event of a fire, the smoke detectors are configured to detect smoke and sound an alarm. The alarm, which is generally a series of loud beeps or buzzes, is intended to alert individuals of the fire such that the individuals can evacuate the building. Unfortunately, with the use of smoke detectors, there are still many casualties every year caused by building fires and other hazardous conditions. Confusion in the face of an emergency, poor visibility, unfamiliarity with the building, etc. can all contribute to the inability of individuals to effectively evacuate a building. Further, in a smoke detector equipped building with multiple exits, individuals have no way of knowing which exit is safest in the event of a fire or other evacuation condition. As such, the inventors have perceived an intelligent evacuation system to help individuals successfully evacuate a building in the event of an evacuation condition.

SUMMARY

An illustrative method includes receiving occupancy information from a node located in an area of a structure, where the occupancy information includes a number of individuals located in the area. An indication of an evacuation condition is received from the node. One or more evacuation routes are determined based at least in part on the occupancy information. An instruction is provided to the node to convey at least one of the one or more evacuation routes.

An illustrative node includes a transceiver and a processor operatively coupled to the transceiver. The transceiver is configured to receive occupancy information from a second node located in an area of a structure. The transceiver is also configured to receive an indication of an evacuation condition from the second node. The processor is configured to determine an evacuation route based at least in part on the occupancy information. The processor is further configured to cause the transceiver to provide an instruction to the second node to convey the evacuation route.

An illustrative system includes a first node and a second node. The first node includes a first processor, a first sensor operatively coupled to the first processor, a first occupancy unit operatively coupled to the first processor, a first transceiver operatively coupled to the first processor, and a first warning unit operatively coupled to the processor. The first sensor is configured to detect an evacuation condition. The first occupancy unit is configured to determine occupancy information. The first transceiver is configured to transmit an indication of the evacuation condition and the occupancy information to the second node. The second node includes a second transceiver and a second processor operatively coupled to the second transceiver. The second transceiver is configured to receive the indication of the evacuation condition and the occupancy information from the first node. The second processor is configured to determine one or more evacuation routes based at least in part on the occupancy information. The second processor is also configured to cause the second transceiver to provide an instruction to the first node to convey at least one of the one or more evacuation routes through the first warning unit.

Another illustrative method includes receiving, with a portable occupancy unit, a first signal using a first detector, where the first signal is indicative of an occupant in a structure. A second signal is received with the portable occupancy unit using a second detector. The second signal is indicative of the occupant in the structure. The first signal and the second signal are processed to determine whether the occupant is present in the structure. If it is determined that the occupant is present in the structure, an output is provided to convey that the occupant has been detected.

An illustrative portable occupancy unit includes a first detector, a second detector, a processor, and an output interface. The first detector is configured to detect a first signal, where the first signal is indicative of an occupant in a structure. The second detector is configured to detect a second signal, where the second signal is indicative of the occupant in the structure. The processor is configured to process the first signal and the second signal to determine whether the occupant is present in the structure. The output interface is configured to convey an output if the occupant is present in the structure.

An illustrative tangible computer-readable medium having computer-readable instructions stored thereon is also provided. If executed by a portable occupancy unit, the computer-executable instructions cause the portable occupancy unit to perform a method. The method includes receiving a first signal using a first detector, where the first signal is indicative of an occupant in a structure. A second signal is received using a second detector, where the second signal is indicative of the occupant in the structure. The first signal and the second signal are processed to determine whether the occupant is present in the structure. If it is determined that the occupant is present in the structure, an output is provided to convey that the occupant has been detected.

An illustrative method includes receiving, at a server, an indication of an evacuation condition from a sensory node located in a structure. The method also includes determining a severity of the evacuation condition. The method further includes adjusting a sensitivity of at least one sensory node in the structure based at least part on the severity of the evacuation condition.

An illustrative system server includes a memory configured to store an indication of an evacuation condition that is received from a sensory node located in a structure. The system server also includes a processor operatively coupled to the memory. The processor is configured to determine a severity of the evacuation condition. The processor is also configured to adjust a sensitivity of at least one sensory node in the structure based at least part on the severity of the evacuation condition.

An illustrative non-transitory computer-readable medium has computer-readable instructions stored thereon. The computer-readable instructions include instructions to store an indication of an evacuation condition that is received from a sensory node located in a structure. The computer-readable instructions also include instructions to determine a severity of the evacuation condition. The computer-readable instructions further include instructions to adjust a sensitivity of at least one sensory node in the structure based at least part on the severity of the evacuation condition.

An illustrative apparatus includes a protective housing and a recording device. The protective housing can include a water-resistant layer comprising a material that is impervious to water. The water-resistant layer can define an inside space of the protective housing. The protective housing can also include a fire-resistant layer that surrounds the water-resistant layer and an outside layer that surrounds the fire-resistant layer. The recording device within the inside space can include a transceiver configured to receive sensed data from one or more sensory nodes and from a commercial panel of a building, a memory configured to store the data received by the transceiver, and a processor operatively coupled to the transceiver and the memory. The processor can be configured to publish the sensed data such that the sensed data is accessible to a first responder.

An illustrative method can include providing a water-resistant layer of a protective housing. The water-resistant layer can include a material that is impervious to water and defines an inside space of the protective housing. The method can also include surrounding the water-resistant layer with a fire-resistant layer of the protective housing and surrounding the fire-resistant layer with an outside layer. The method can further include providing a recording device within the inside space. The recording device can include a transceiver, a memory, and a processor. The transceiver can be configured to sense data from one or more sensory nodes or from a commercial panel of a building. The memory can be configured to store the sensed data, and the processor can be configured to publish the sensed data such that the sensed data is accessible to a first responder.

An illustrative method for controlling devices based at least in part on detected conditions includes sensing, by a sensory node in a structure, a condition within the structure. The method also includes transmitting, by the sensory node, an indication of the condition and information regarding the condition to a device in communication with the sensory node. The method also includes determining, based at least in part on the information regarding the condition, that a controllable device associated with the structure is to be placed into an off state. The method further includes transmitting, responsive to the determining, a control signal to the controllable device to place the controllable device into the off state.

An illustrative apparatus includes a transceiver and a processor. The transceiver is configured to receive, from a sensory node in a structure, an indication of a sensed condition within the structure and information regarding the sensed condition. The processor is operatively coupled to the transceiver, and is configured to determine, based at least in part on the information regarding the sensed condition, that a controllable device associated with the structure is to be placed into an off state. The processor is also configured to generate, responsive to the determination, a control signal to cause the controllable device to enter the off state. The transceiver is further configured to transmit the control signal to the controllable device.

An illustrative method for monitoring devices based at least in part on detected conditions includes accumulating, by one or more sensory nodes, sensed information in an area that includes a controllable device. The method also includes analyzing the sensed information to identify historical information regarding the area that includes the controllable device. The method also includes sensing a condition within the area by the one or more sensory nodes. The method also includes determining, based at least in part on the sensed condition and at least in part on the historical information, that the sensed condition relates to the controllable device. The method further includes generating, responsive to said determining, an alert regarding the controllable device.

An illustrative system includes one or more sensory nodes and a processor. The one or more sensory nodes are configured to sense information in an area that includes a controllable device. The processor is configured to analyze the sensed information to identify historical information regarding the area that includes the controllable device. The one or more sensory nodes are further configured to sense a condition within the area by the one or more sensory nodes. The processor is also configured to determine, based at least in part on the sensed condition and at least in part on the historical information, that the sensed condition relates to the controllable device. The processor is further configured to generate, responsive to said determining, an alert regarding the controllable device.

Other principal features and advantages will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings.

FIG. 2 is a block diagram illustrating a sensory node in accordance with an illustrative embodiment.

FIG. 3 is a block diagram illustrating a decision node in accordance with an illustrative embodiment.

DETAILED DESCRIPTION

Described herein are illustrative evacuation systems for use in assisting individuals with evacuation from a structure during an evacuation condition. An illustrative evacuation system can include one or more sensory nodes configured to detect and/or monitor occupancy and to detect the evacuation condition. Based on the type of evacuation condition, the magnitude (or severity) of the evacuation condition, the location of the sensory node which detected the evacuation condition, the occupancy information, and/or other factors, the evacuation system can determine one or more evacuation routes such that individuals are able to safely evacuate the structure. The one or more evacuation routes can be conveyed to the individuals in the structure through one or more spoken audible evacuation messages. The evacuation system can also contact an emergency response center in response to the evacuation condition.

Figure 1:
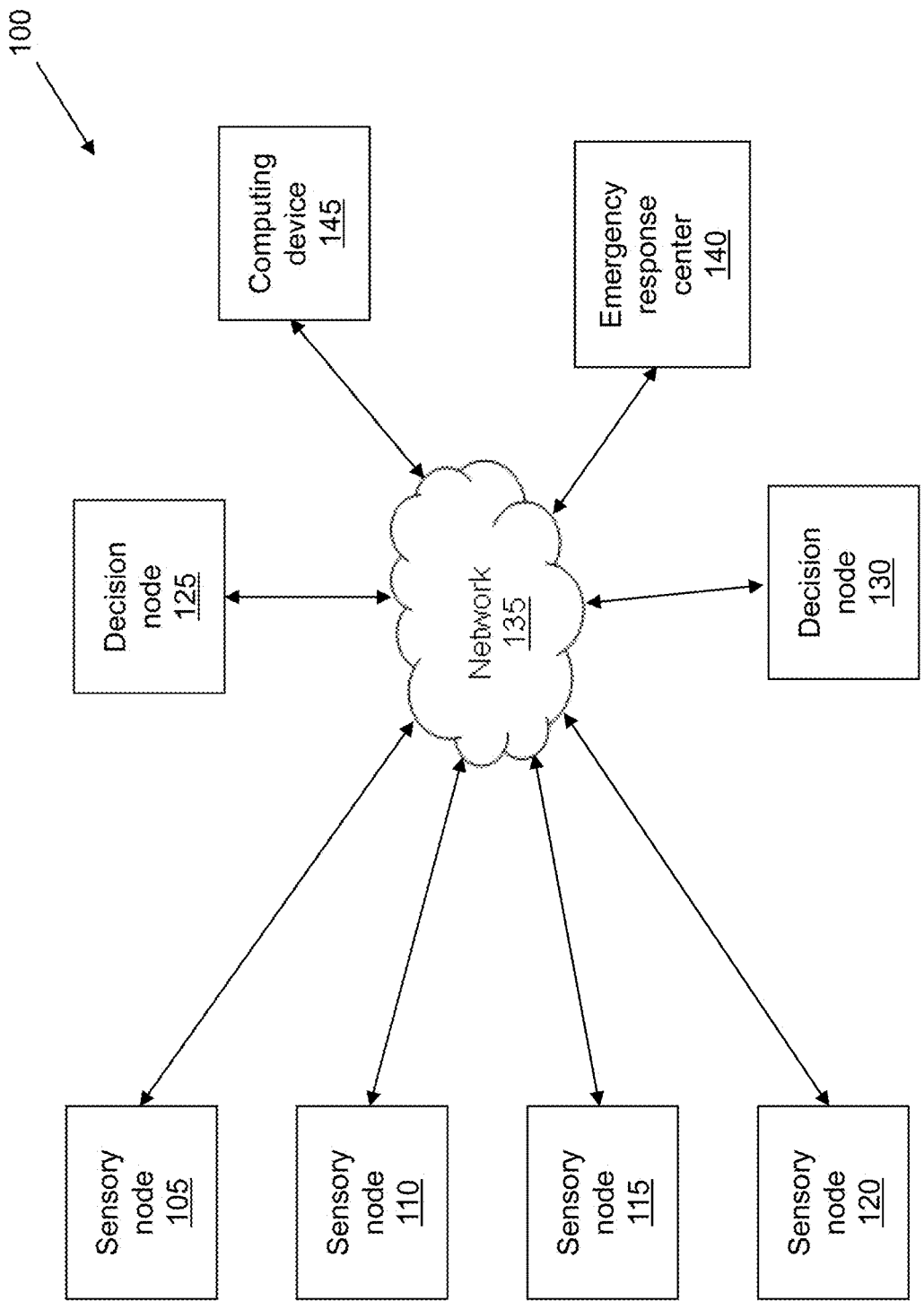
FIG. 1 is a block diagram illustrating an evacuation system in accordance with an illustrative embodiment.

FIG. 1 is a block diagram of an evacuation system 100 in accordance with an illustrative embodiment. In alternative embodiments, evacuation system 100 may include additional, fewer, and/or different components. Evacuation system 100 includes a sensory node 105, a sensory node 110, a sensory node 115, and a sensory node 120. In alternative embodiments, additional or fewer sensory nodes may be included. Evacuation system 100 also includes a decision node 125 and a decision node 130. Alternatively, additional or fewer decision nodes may be included.

In an illustrative embodiment, sensory nodes 105, 110, 115, and 120 can be configured to detect an evacuation condition. The evacuation condition can be a fire, which may be detected by the presence of smoke and/or excessive heat. The evacuation condition may also be an unacceptable level of a toxic gas such as carbon monoxide, nitrogen dioxide, etc. Sensory nodes 105, 110, 115, and 120 can be distributed throughout a structure. The structure can be a home, an office building, a commercial space, a store, a factory, or any other building or structure. As an example, a single story office building can have one or more sensory nodes in each office, each bathroom, each common area, etc. An illustrative sensory node is described in more detail with reference to FIG. 2.

Sensory nodes 105, 110, 115, and 120 can also be configured to detect and/or monitor occupancy such that evacuation system 100 can determine one or more optimal evacuation routes. For example, sensory node 105 may be placed in a conference room of a hotel. Using occupancy detection, sensory node 105 can know that there are approximately 80 individuals in the conference room at the time of an evacuation condition. Evacuation system 100 can use this occupancy information (i.e., the number of individuals and/or the location of the individuals) to determine the evacuation route(s). For example, evacuation system 100 may attempt to determine at least two safe evacuation routes from the conference room to avoid congestion that may occur if only a single evacuation route is designated. Occupancy detection and monitoring are described in more detail with reference to FIG. 2.

Decision nodes 125 and 130 can be configured to determine one or more evacuation routes upon detection of an evacuation condition. Decision nodes 125 and 130 can determine the one or more evacuation routes based on occupancy information such as a present occupancy or an occupancy pattern of a given area, the type of evacuation condition, the magnitude of the evacuation condition, the location(s) at which the evacuation condition is detected, the layout of the structure, etc. The occupancy pattern can be learned over time as the nodes monitor areas during quiescent conditions. Upon determination of the one or more evacuation routes, decision nodes 125 and 130 and/or sensory nodes 105, 110, 115, and 120 can convey the evacuation route(s) to the individuals in the structure. In an illustrative embodiment, the evacuation route(s) can be conveyed as audible voice evacuation messages through speakers of decision nodes 125 and 130 and/or sensory nodes 105, 110, 115, and 120. Alternatively, the evacuation route(s) can be conveyed by any other method. An illustrative decision node is described in more detail with reference to FIG. 3.

Sensory nodes 105, 110, 115, and 120 can communicate with decision nodes 125 and 130 through a network 135. Network 135 can include a short-range communication network such as a Bluetooth network, a Zigbee network, etc. Network 135 can also include a local area network (LAN), a wide area network (WAN), a telecommunications network, the Internet, a public switched telephone network (PSTN), and/or any other type of communication network known to those of skill in the art. Network 135 can be a distributed intelligent network such that evacuation system 100 can make decisions based on sensory input from any nodes in the population of nodes. In an illustrative embodiment, decision nodes 125 and 130 can communicate with sensory nodes 105, 110, 115, and 120 through a short-range communication network. Decision nodes 125 and 130 can also communicate with an emergency response center 140 through a telecommunications network, the Internet, a PSTN, etc. As such, in the event of an evacuation condition, emergency response center 140 can be automatically notified. Emergency response center 140 can be a 911 call center, a fire department, a police department, etc.

In the event of an evacuation condition, a sensory node that detected the evacuation condition can provide an indication of the evacuation condition to decision node 125 and/or decision node 130. The indication can include an identification and/or location of the sensory node, a type of the evacuation condition, and/or a magnitude of the evacuation condition. The magnitude of the evacuation condition can include an amount of smoke generated by a fire, an amount of heat generated by a fire, an amount of toxic gas in the air, etc. The indication of the evacuation condition can be used by decision node 125 and/or decision node 130 to determine evacuation routes. Determination of an evacuation route is described in more detail with reference to FIG. 4.

In an illustrative embodiment, sensory nodes 105, 110, 115, and 120 can also periodically provide status information to decision node 125 and/or decision node 130. The status information can include an identification of the sensory node, location information corresponding to the sensory node, information regarding battery life, and/or information regarding whether the sensory node is functioning properly. As such, decision nodes 125 and 130 can be used as a diagnostic tool to alert a system administrator or other user of any problems with sensory nodes 105, 110, 115, and 120. Decision nodes 125 and 130 can also communicate status information to one another for diagnostic purposes. The system administrator can also be alerted if any of the nodes of evacuation system 100 fail to timely provide status information according to a periodic schedule. In one embodiment, a detected failure or problem within evacuation system 100 can be communicated to the system administrator or other user via a text message or an e-mail.

In one embodiment, network 135 can include a redundant (or self-healing) mesh network centered around sensory nodes 105, 110, 115, and 120 and decision nodes 125 and 130. As such, sensory nodes 105, 110, 115, and 120 can communicate directly with decision nodes 125 and 130, or indirectly through other sensory nodes. As an example, sensory node 105 can provide status information directly to decision node 125. Alternatively, sensory node 105 can provide the status information to sensory node 115, sensory node 115 can provide the status information (relative to sensory node 105) to sensory node 120, and sensory node 120 can provide the status information (relative to sensory node 105) to decision node 125. The redundant mesh network can be dynamic such that communication routes can be determined on the fly in the event of a malfunctioning node. As such, in the example above, if sensory node 120 is down, sensory node 115 can automatically provide the status information (relative to sensory node 105) directly to decision node 125 or to sensory node 110 for provision to decision node 125. Similarly, if decision node 125 is down, sensory nodes 105, 110, 115, and 120 can be configured to convey status information directly or indirectly to decision node 130. The redundant mesh network can also be static such that communication routes are predetermined in the event of one or more malfunctioning nodes. Network 135 can receive/transmit messages over a large range as compared to the actual wireless range of individual nodes. Network 135 can also receive/transmit messages through various wireless obstacles by utilizing the mesh network capability of evacuation system 100. As an example, a message destined from an origin of node A to a distant destination of node Z (i.e., where node A and node Z are not in direct range of one another) may use any of the nodes between node A and node Z to convey the information. In one embodiment, the mesh network can operate within the 2.4 GHz range. Alternatively, any other range(s) may be used.

In an illustrative embodiment, each of sensory nodes 105, 110, 115, and 120 and/or each of decision nodes 125 and 130 can know its location. The location can be global positioning system (GPS) coordinates. In one embodiment, a computing device 145 can be used to upload the location to sensory nodes 105, 110, 115, and 120 and/or decision nodes 125 and 130. Computing device 145 can be a portable GPS system, a cellular device, a laptop computer, or any other type of communication device configured to convey the location. As an example, computing device 145 can be a GPS-enabled laptop computer. During setup and installation of evacuation system 100, a technician can place the GPS-enabled laptop computer proximate to sensory node 105. The GPS-enabled laptop computer can determine its current GPS coordinates, and the GPS coordinates can be uploaded to sensory node 105. The GPS coordinates can be uploaded to sensory node 105 wirelessly through network 135 or through a wired connection. Alternatively, the GPS coordinates can be manually entered through a user interface of sensory node 105. The GPS coordinates can similarly be uploaded to sensory nodes 110, 115, and 120 and decision nodes 125 and 130. In one embodiment, sensory nodes 105, 110, 115, and 120 and/or decision nodes 125 and 130 may be GPS-enabled for determining their respective locations. In one embodiment, each node can have a unique identification number or tag, which may be programmed during the manufacturing of the node. The identification can be used to match the GPS coordinates to the node during installation. Computing device 145 can use the identification information to obtain a one-to-one connection with the node to correctly program the GPS coordinates over network 135. In an alternative embodiment, GPS coordinates may not be used, and the location can be in terms of position with a particular structure. For example, sensory node 105 may be located in room five on the third floor of a hotel, and this information can be the location information for sensory node 105. Regardless of how the locations are represented, evacuation system 100 can determine the evacuation route(s) based at least in part on the locations and a known layout of the structure.

In one embodiment, a zeroing and calibration method may be employed to improve the accuracy of the indoor GPS positioning information programmed into the nodes during installation. Inaccuracies in GPS coordinates can occur due to changes in the atmosphere, signal delay, the number of viewable satellites, etc., and the expected accuracy of GPS is usually about 6 meters. To calibrate the nodes and improve location accuracy, a relative coordinated distance between nodes can be recorded as opposed to a direct GPS coordinate. Further improvements can be made by averaging multiple GPS location coordinates at each perspective node over a given period (i.e., 5 minutes, etc.) during evacuation system 100 configuration. At least one node can be designated as a zeroing coordinate location. All other measurements can be made with respect to the zeroing coordinate location. In one embodiment, the accuracy of GPS coordinates can further be improved by using an enhanced GPS location band such as the military P(Y) GPS location band. Alternatively, any other GPS location band may be used.

FIG. 2 is a block diagram illustrating a sensory node 200 in accordance with an illustrative embodiment. In alternative embodiments, sensory node 200 may include additional, fewer, and/or different components. Sensory node 200 includes sensor(s) 205, a power source 210, a memory 215, a user interface 220, an occupancy unit 225, a transceiver 230, a warning unit 235, and a processor 240. Sensor(s) 205 can include a smoke detector, a heat sensor, a carbon monoxide sensor, a nitrogen dioxide sensor, and/or any other type of hazardous condition sensor known to those of skill in the art. In an illustrative embodiment, power source 210 can be a battery. Sensory node 200 can also be hard-wired to the structure such that power is received from the power supply of the structure (i.e., utility grid, generator, solar cell, fuel cell, etc.). In such an embodiment, power source 210 can also include a battery for backup during power outages.

Memory 215 can be configured to store identification information corresponding to sensory node 200. The identification information can be any indication through which other sensory nodes and decision nodes are able to identify sensory node 200. Memory 215 can also be used to store location information corresponding to sensory node 200. The location information can include global positioning system (GPS) coordinates, position within a structure, or any other information which can be used by other sensory nodes and/or decision nodes to determine the location of sensory node 200. In one embodiment, the location information may be used as the identification information. The location information can be received from computing device 145 described with reference to FIG. 1, or from any other source. Memory 215 can further be used to store routing information for a mesh network in which sensory node 200 is located such that sensory node 200 is able to forward information to appropriate nodes during normal operation and in the event of one or more malfunctioning nodes. Memory 215 can also be used to store occupancy information and/or one or more evacuation messages to be conveyed in the event of an evacuation condition. Memory 215 can further be used for storing adaptive occupancy pattern recognition algorithms and for storing compiled occupancy patterns.

User interface 220 can be used by a system administrator or other user to program and/or test sensory node 200. User interface 220 can include one or more controls, a liquid crystal display (LCD) or other display for conveying information, one or more speakers for conveying information, etc. In one embodiment, a user can utilize user interface 220 to record an evacuation message to be played back in the event of an evacuation condition. As an example, sensory node 200 can be located in a bedroom of a small child. A parent of the child can record an evacuation message for the child in a calm, soothing voice such that the child does not panic in the event of an evacuation condition. An example evacuation message can be "wake up, Kristin, there is a fire, go out the back door and meet us in the back yard as we have practiced." Different evacuation messages may be recorded for different evacuation conditions. Different evacuation messages may also be recorded based on factors such as the location at which the evacuation condition is detected. As an example, if a fire is detected by any of sensory nodes one through six, a first pre-recorded evacuation message can be played (i.e., exit through the back door), and if the fire is detected at any of nodes seven through twelve, a second pre-recorded evacuation message can be played (i.e., exit through the front door). User interface 220 can also be used to upload location information to sensory node 200, to test sensory node 200 to ensure that sensory node 200 is functional, to adjust a volume level of sensory node 200, to silence sensory node 200, etc. User interface 220 can also be used to alert a user of a problem with sensory node 200 such as low battery power or a malfunction. In one embodiment, user interface 220 can be used to record a personalized message in the event of low battery power, battery malfunction, or other problem. For example, if the device is located within a home structure, the pre-recorded message may indicate that "the evacuation detector in the hallway has low battery power, please change." User interface 220 can further include a button such that a user can report an evacuation condition and activate the evacuation system. User interface 220 can be, for example, an application on a smartphone.

Occupancy unit 225 can be used to detect and/or monitor occupancy of a structure. As an example, occupancy unit 225 can detect whether one or more individuals are in a given room or area of a structure. A decision node can use this occupancy information to determine an appropriate evacuation route or routes. As an example, if it is known that two individuals are in a given room, a single evacuation route can be used. However, if three hundred individuals are in the room, multiple evacuation routes may be provided to prevent congestion. Occupancy unit 225 can also be used to monitor occupancy patterns. As an example, occupancy unit 225 can determine that there are generally numerous individuals in a given room or location between the hours of 8:00 am and 6:00 pm on Mondays through Fridays, and that there are few or no individuals present at other times. A decision node can use this information to determine appropriate evacuation route(s). Information determined by occupancy unit 225 can also be used to help emergency responders in responding to the evacuation condition. For example, it may be known that one individual is in a given room of the structure. The emergency responders can use this occupancy information to focus their efforts on getting the individual out of the room. The occupancy information can be provided to an emergency response center along with a location and type of the evacuation condition. Occupancy unit 225 can also be used to help sort rescue priorities based at least in part on the occupancy information while emergency responders are on route to the structure.

Occupancy unit 225 can detect/monitor the occupancy using one or more motion detectors to detect movement. Occupancy unit 225 can also use a video or still camera and video/image analysis to determine the occupancy. Occupancy unit 225 can also use respiration detection by detecting carbon dioxide gas emitted as a result of breathing. An example high sensitivity carbon dioxide detector for use in respiration detection can be the MG-811 CO2 sensor manufactured by Henan Hanwei Electronics Co., Ltd. based in Zhengzhou, China. Alternatively, any other high sensitivity carbon dioxide sensor may be used. Occupancy unit 225 can also be configured to detect methane, or any other gas which may be associated with human presence.

Occupancy unit 225 can also use infrared sensors to detect heat emitted by individuals. In one embodiment, a plurality of infrared sensors can be used to provide multidirectional monitoring. Alternatively, a single infrared sensor can be used to scan an entire area. The infrared sensor(s) can be combined with a thermal imaging unit to identify thermal patterns and to determine whether detected occupants are human, feline, canine, rodent, etc. The infrared sensors can also be used to determine if occupants are moving or still, to track the direction of occupant traffic, to track the speed of occupant traffic, to track the volume of occupant traffic, etc. This information can be used to alert emergency responders to a panic situation, or to a large captive body of individuals. Activities occurring prior to an evacuation condition can be sensed by the infrared sensors and recorded by the evacuation system. As such, suspicious behavioral movements occurring prior to an evacuation condition can be sensed and recorded. For example, if the evacuation condition was maliciously caused, the recorded information from the infrared sensors can be used to determine how quickly the area was vacated immediately prior to the evacuation condition. Infrared sensor based occupancy detection is described in more detail in an article titled "Development of Infrared Human Sensor" in the Matsushita Electric Works (MEW) Sustainability Report 2004, the entire disclosure of which is incorporated herein by reference.

Occupancy unit 225 can also use audio detection to identify noises associated with occupants such as snoring, respiration, heartbeat, voices, etc. The audio detection can be implemented using a high sensitivity microphone which is capable of detecting a heartbeat, respiration, etc. from across a room. Any high sensitivity microphone known to those of skill in the art may be used. Upon detection of a sound, occupancy unit 225 can utilize pattern recognition to identify the sound as speech, a heartbeat, respiration, snoring, etc. Occupancy unit 225 can similarly utilize voice recognition and/or pitch tone recognition to distinguish human and non-human occupants and/or to distinguish between different human occupants. As such, emergency responders can be informed whether an occupant is a baby, a small child, an adult, a dog, etc. Occupancy unit 225 can also detect occupants using scent detection. An example sensor for detecting scent is described in an article by Jacqueline Mitchell titled "Picking Up the Scent" and appearing in the August 2008 Tufts Journal, the entire disclosure of which is incorporated herein by reference.

In an alternative embodiment, sensory node 200 (and/or decision node 300 described with reference to FIG. 3) can be configured to broadcast occupancy information. In such an embodiment, emergency response personnel can be equipped with a portable receiver configured to receive the broadcasted occupancy information such that the responder knows where any humans are located with the structure. The occupancy information can also be broadcast to any other type of receiver. The occupancy information can be used to help rescue individuals in the event of a fire or other evacuation condition. The occupancy information can also be used in the event of a kidnapping or hostage situation to identify the number of victims involved, the number of perpetrators involved, the locations of the victims and/or perpetrators, etc.

Transceiver 230 can include a transmitter for transmitting information and/or a receiver for receiving information. As an example, transceiver 230 of sensory node 200 can receive status information, occupancy information, evacuation condition information, etc. from a first sensory node and forward the information to a second sensory node or to a decision node. Transceiver 230 can also be used to transmit information corresponding to sensory node 200 to another sensory node or a decision node. For example, transceiver 230 can periodically transmit occupancy information to a decision node such that the decision node has the occupancy information in the event of an evacuation condition. In some embodiments, the transceiver 230 can transmit occupancy information every 1 second, every 4 seconds, every 10 seconds, every minute, every 3 minutes, every 15 minutes, etc. Alternatively, transceiver 230 can be used to transmit the occupancy information to the decision node along with an indication of the evacuation condition. Transceiver 230 can also be used to receive instructions regarding appropriate evacuation routes and/or the evacuation routes from a decision node. Alternatively, the evacuation routes can be stored in memory 215 and transceiver 230 may only receive an indication of which evacuation route to convey.

Warning unit 235 can include a speaker and/or a display for conveying an evacuation route or routes. The speaker can be used to play an audible voice evacuation message. The evacuation message can be conveyed in one or multiple languages, depending on the embodiment. If multiple evacuation routes are used based on occupancy information or the fact that numerous safe evacuation routes exist, the evacuation message can include the multiple evacuation routes in the alternative. For example, the evacuation message may state "please exit to the left through stairwell A, or to the right through stairwell B." The display of warning unit 235 can be used to convey the evacuation message in textual form for deaf individuals or individuals with poor hearing. Warning unit 235 can further include one or more lights to indicate that an evacuation condition has been detected and/or to illuminate at least a portion of an evacuation route. In the event of an evacuation condition, warning unit 235 can be configured to repeat the evacuation message(s) until a stop evacuation message instruction is received from a decision node, until the evacuation system is reset or muted by a system administrator or other user, or until sensory node 200 malfunctions due to excessive heat, etc. Warning unit 235 can also be used to convey a status message such as "smoke detected in room thirty-five on the third floor." The status message can be played one or more times in between the evacuation message. In an alternative embodiment, sensory node 200 may not include warning unit 235, and the evacuation route(s) may be conveyed only by decision nodes. The evacuation condition may be detected by sensory node 200, or by any other node in direct or indirect communication with sensory node 200.

Processor 240 can be operatively coupled to each of the components of sensory node 200, and can be configured to control interaction between the components. For example, if an evacuation condition is detected by sensor(s) 205, processor 240 can cause transceiver 230 to transmit an indication of the evacuation condition to a decision node. In response, transceiver 230 can receive an instruction from the decision node regarding an appropriate evacuation message to convey. Processor 240 can interpret the instruction, obtain the appropriate evacuation message from memory 215, and cause warning unit 235 to convey the obtained evacuation message. Processor 240 can also receive inputs from user interface 220 and take appropriate action. Processor 240 can further be used to process, store, and/or transmit occupancy information obtained through occupancy unit 225. Processor 240 can further be coupled to power source 210 and used to detect and indicate a power failure or low battery condition. In one embodiment, processor 240 can also receive manually generated alarm inputs from a user through user interface 220. As an example, if a fire is accidently started in a room of a structure, a user may press an alarm activation button on user interface 220, thereby signaling an evacuation condition and activating warning unit 235. In such an embodiment, in the case of accidental alarm activation, sensory node 200 may inform the user that he/she can press the alarm activation button a second time to disable the alarm. After a predetermined period of time (i.e., 5 seconds, 10 seconds, 30 seconds, etc.), the evacuation condition may be conveyed to other nodes and/or an emergency response center through the network.

FIG. 3 is a block diagram illustrating a decision node 300 in accordance with an illustrative embodiment. In alternative embodiments, decision node 300 may include additional, fewer, and/or different components. Decision node 300 includes a power source 305, a memory 310, a user interface 315, a transceiver 320, a warning unit 325, and a processor 330. In one embodiment, decision node 300 can also include sensor(s) and/or an occupancy unit as described with reference to sensory unit 200 of FIG. 2. In an illustrative embodiment, power source 305 can be the same or similar to power source 210 described with reference to FIG. 2. Similarly, user interface 315 can be the same or similar to user interface 220 described with reference to FIG. 2, and warning unit 325 can be the same or similar to warning unit 235 described with reference to FIG. 2.

Memory 310 can be configured to store a layout of the structure(s) in which the evacuation system is located, information regarding the locations of sensory nodes and other decision nodes, information regarding how to contact an emergency response center, occupancy information, occupancy detection and monitoring algorithms, and/or an algorithm for determining an appropriate evacuation route. Transceiver 320, which can be similar to transceiver 230 described with reference to FIG. 2, can be configured to receive information from sensory nodes and other decision nodes and to transmit evacuation routes to sensory nodes and/or other decision nodes. Processor 330 can be operatively coupled to each of the components of decision node 300, and can be configured to control interaction between the components.

In one embodiment, decision node 300 can be an exit sign including an EXIT display in addition to the components described with reference to FIG. 3. As such, decision node 300 can be located proximate an exit of a structure, and warning unit 325 can direct individuals toward or away from the exit depending on the identified evacuation route(s). In an alternative embodiment, all nodes of the evacuation system may be identical such that there is not a distinction between sensory nodes and decision nodes. In such an embodiment, all of the nodes can have sensor(s), an occupancy unit, decision-making capability, etc.

Figure 4:
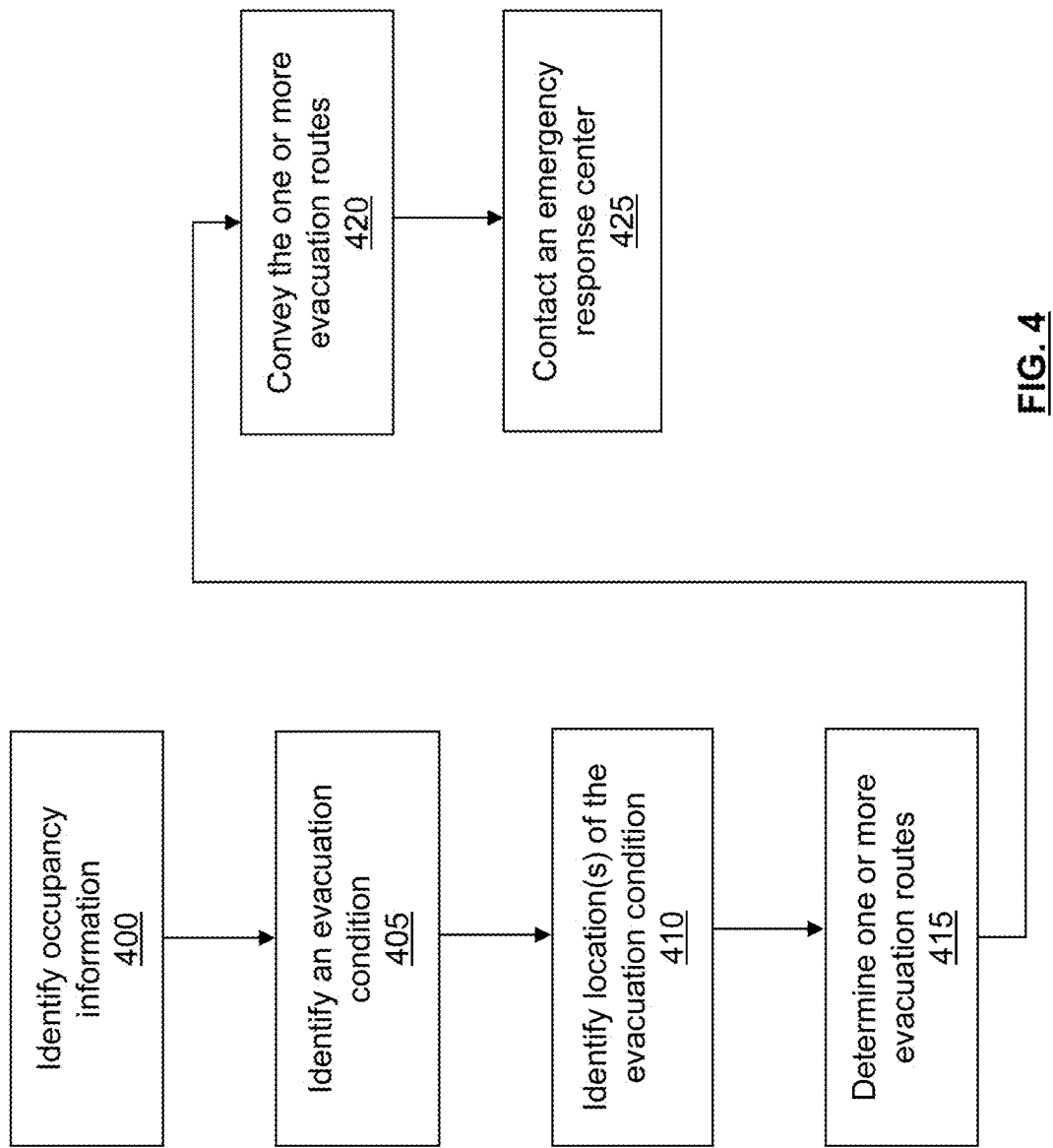
FIG. 4 is a flow diagram illustrating operations performed by an evacuation system in accordance with an illustrative embodiment.

FIG. 4 is a flow diagram illustrating operations performed by an evacuation system in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 4 can be performed by one or more sensory nodes and/or by one or more decision nodes. In an operation 400, occupancy information is identified. The occupancy information can include information regarding a number of individuals present at a given location at a given time (i.e., current information). The occupancy information can also include occupancy patterns based on long term monitoring of the location. The occupancy information can be identified using occupancy unit 225 described with reference to FIG. 2 and/or by any other methods known to those of skill in the art. The occupancy information can be specific to a given node, and can be determined by sensory nodes and/or decision nodes.

In an operation 405, an evacuation condition is identified. The evacuation condition can be identified by a sensor associated with a sensory node and/or a decision node. The evacuation condition can result from the detection of smoke, heat, toxic gas, etc. A decision node can receive an indication of the evacuation condition from a sensory node or other decision node. Alternatively, the decision node may detect the evacuation condition using one or more sensors. The indication of the evacuation condition can identify the type of evacuation condition detected and/or a magnitude or severity of the evacuation condition. As an example, the indication of the evacuation condition may indicate that a high concentration of carbon monoxide gas was detected.

In an operation 410, location(s) of the evacuation condition are identified. The location(s) can be identified based on the identity of the node(s) which detected the evacuation condition. For example, the evacuation condition may be detected by node A. Node A can transmit an indication of the evacuation condition to a decision node B along with information identifying the transmitter as node A. Decision node B can know the coordinates or position of node A and use this information in determining an appropriate evacuation route. Alternatively, node A can transmit its location (i.e., coordinates or position) along with the indication of the evacuation condition.

In an operation 415, one or more evacuation routes are determined. In an illustrative embodiment, the one or more evacuation routes can be determined based at least in part on a layout of the structure, the occupancy information, the type of evacuation condition, the severity of the evacuation condition, and/or the location(s) of the evacuation condition. In an illustrative embodiment, a first decision node to receive an indication of the evacuation condition or to detect the evacuation condition can be used to determine the evacuation route(s). In such an embodiment, the first decision node to receive the indication can inform any other decision nodes that the first decision node is determining the evacuation route(s), and the other decision nodes can be configured to wait for the evacuation route(s) from the first decision node. Alternatively, multiple decision nodes can simultaneously determine the evacuation route(s) and each decision node can be configured to convey the evacuation route(s) to a subset of sensory nodes. Alternatively, multiple decision nodes can simultaneously determine the evacuation route(s) for redundancy in case any one of the decision nodes malfunctions due to the evacuation condition. In one embodiment, each decision node can be responsible for a predetermined portion of the structure and can be configured to determine evacuation route(s) for that predetermined portion or area. For example, a first decision node can be configured to determine evacuation route(s) for evacuating a first floor of the structure, a second decision node can be configured to determine evacuation route(s) for evacuating a second floor of the structure, and so on. In such an embodiment, the decision nodes can communicate with one another such that each of the evacuation route(s) is based at least in part on the other evacuation route(s).

As indicated above, the one or more evacuation routes can be determined based at least in part on the occupancy information. As an example, the occupancy information may indicate that approximately 50 people are located in a conference room in the east wing on the fifth floor of a structure and that 10 people are dispersed throughout the third floor of the structure. The east wing of the structure can include an east stairwell that is rated for supporting the evacuation of 100 people. If there are no other large groups of individuals to be directed through the east stairwell and the east stairwell is otherwise safe, the evacuation route can direct the 50 people toward the east stairwell, down the stairs to a first floor lobby, and out of the lobby through a front door of the structure. In order to prevent congestion on the east stairwell, the evacuation route can direct the 10 people from the third floor of the structure to evacuate through a west stairwell assuming that the west stairwell is otherwise safe and uncongested. As another example, the occupancy information can be used to designate multiple evacuation routes based on the number of people known to be in a given area and/or the number of people expected to be in a given area based on historical occupancy patterns.

The one or more evacuation routes can also be determined based at least in part on the type of evacuation condition. For example, in the event of a fire, all evacuation routes can utilize stairwells, doors, windows, etc. However, if a toxic gas such as nitrogen dioxide is detected, the evacuation routes may utilize one or more elevators in addition to stairwells, doors, windows, etc. For example, nitrogen dioxide may be detected on floors 80-100 of a building. In such a situation, elevators may be the best evacuation option for individuals located on floors 90-100 to evacuate. Individuals on floors 80-89 can be evacuated using a stairwell and/or elevators, and individuals on floors 2-79 can be evacuated via the stairwell. In an alternative embodiment, elevators may not be used as part of an evacuation route. In one embodiment, not all evacuation conditions may result in an entire evacuation of the structure. An evacuation condition that can be geographically contained may result in a partial evacuation of the structure. For example, nitrogen dioxide may be detected in a room on the ground floor with an open window, where the nitrogen dioxide is due to an idling vehicle proximate the window. The evacuation system may evacuate only the room in which the nitrogen dioxide was detected. As such, the type and/or severity of the evacuation condition can dictate not only the evacuation route, but also the area to be evacuated.

The one or more evacuation routes can also be determined based at least in part on the severity of the evacuation condition. As an example, heat may be detected in the east stairwell and the west stairwell of a structure having only the two stairwells. The heat detected in the east stairwell may be 120 degrees Fahrenheit (F) and the heat detected in the west stairwell may be 250 degrees F. In such a situation, if no other options are available, the evacuation routes can utilize the east stairwell. The concentration of a detected toxic gas can similarly be used to determine the evacuation routes. The one or more evacuation routes can further be determined based at least in part on the location(s) of the evacuation condition. As an example, the evacuation condition can be identified by nodes located on floors 6 and 7 of a structure and near the north stairwell of the structure. As such, the evacuation route for individuals located on floors 2-5 can utilize the north stairwell of the structure, and the evacuation route for individuals located on floors 6 and higher can utilize a south stairwell of the structure.

In an operation 420, the one or more evacuation routes are conveyed. In an illustrative embodiment, the one or more evacuation routes can be conveyed by warning units of nodes such as warning unit 235 described with reference to FIG. 2 and warning unit 325 described with reference to FIG. 3. In an illustrative embodiment, each node can convey one or more designated evacuation routes, and each node may convey different evacuation route(s). Similarly, multiple nodes may all convey the same evacuation route(s). In an operation 425, an emergency response center is contacted. The evacuation system can automatically provide the emergency response center with occupancy information, a type of the evacuation condition, a severity of the evacuation condition, and/or the location(s) of the evacuation condition. As such, emergency responders can be dispatched immediately. The emergency responders can also use the information to prepare for the evacuation condition and respond effectively to the evacuation condition.

In one embodiment, occupancy unit 225 of FIG. 2 can also be implemented as and/or used in conjunction with a portable, handheld occupancy unit. The portable occupancy unit can be configured to detect human presence using audible sound detection, infrared detection, respiration detection, motion detection, scent detection, etc. as described above, and/or ultrasonic detection. Firefighters, paramedics, police, etc. can utilize the portable occupancy unit to determine whether any human is present in a room with limited or no visibility. As such, the emergency responders can quickly scan rooms and other areas without expending the time to fully enter the room and perform an exhaustive manual search.

Figure 5:
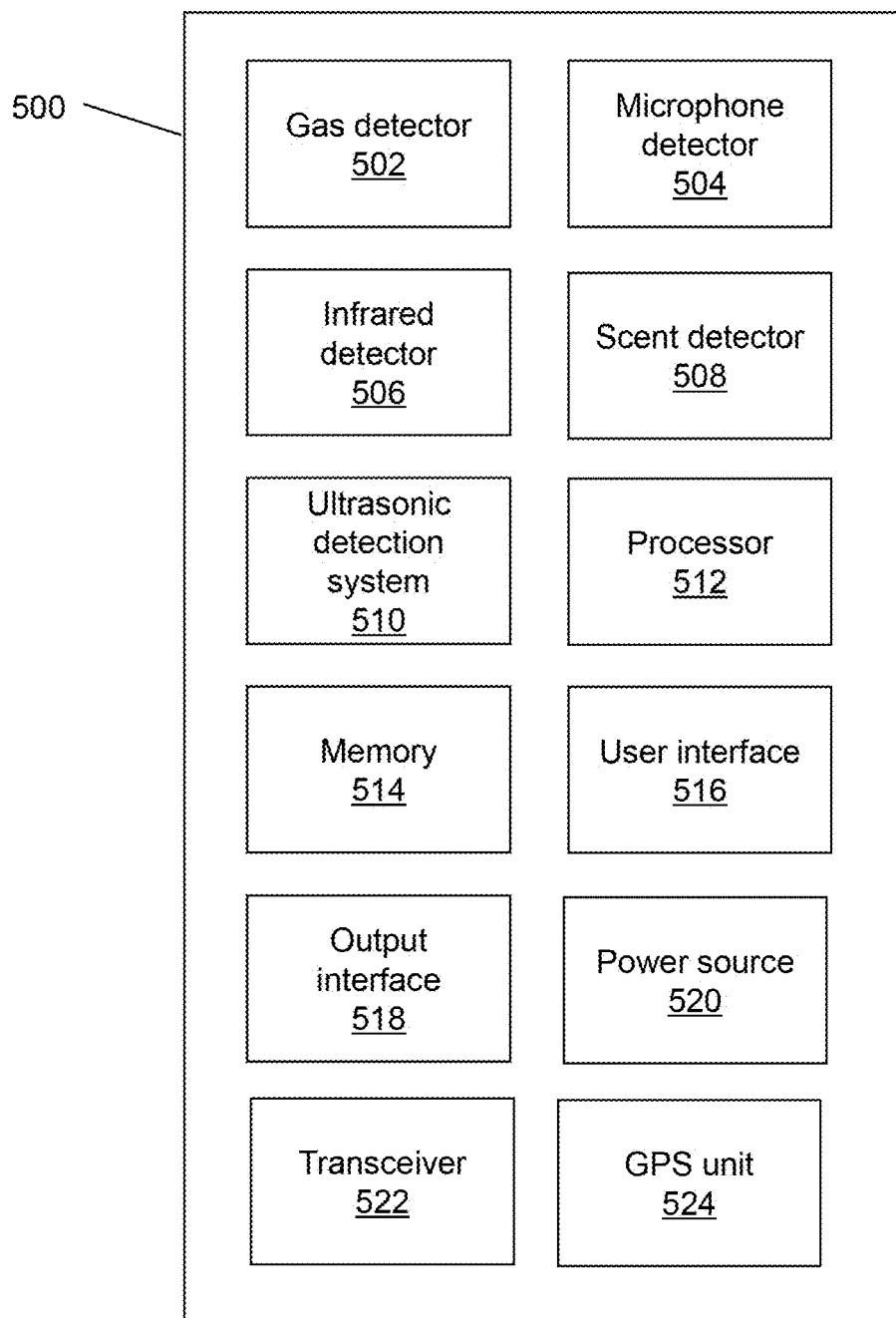
FIG. 5 is a block diagram illustrating a portable occupancy unit in accordance with an illustrative embodiment.

FIG. 5 is a block diagram illustrating a portable occupancy unit 500 in accordance with an illustrative embodiment. In one embodiment, portable occupancy unit 500 can be implemented as a wand having sensors on one end, a handle on the other end, and a display in between the sensors and the handle. Alternatively, any other configuration may be used. For example, as described in more detail below, at least a portion of portable occupancy unit 500 may be incorporated into an emergency response suit.

Portable occupancy unit 500 includes a gas detector 502, a microphone detector 504, an infrared detector 506, a scent detector 508, an ultrasonic detection system 510, a processor 512, a memory 514, a user interface 516, an output interface 518, a power source 520, a transceiver 522, and a global positioning system (GPS) unit 524. In alternative embodiments, portable occupancy unit 500 may include fewer, additional, and/or different components. In one embodiment, portable occupancy unit 500 can be made from fire retardant materials and/or other materials with a high melting point or heat tolerance in the event that portable occupancy unit 500 is used at the site of a fire. Alternatively, any other materials may be used to construct portable occupancy unit 500. Gas detector 502, microphone detector 504, infrared detector 506, and scent detector 508 can be used to detect occupancy as described above with reference to occupancy unit 225 of FIG. 2.

Ultrasonic detection system 510 can be configured to detect human presence using ultrasonic wave detection. In one embodiment, ultrasonic detection system 510 can include a wave generator and a wave detector. The wave generator can emit ultrasonic waves into a room or other structure. The ultrasonic waves can reflect off of the walls of the room or other structure. The wave detector can receive and examine the reflected ultrasonic waves to determine whether there is a frequency shift in the reflected ultrasonic waves with respect to the originally generated ultrasonic waves. Any frequency shift in the reflected ultrasonic waves can be caused by movement of a person or object within the structure. As such, an identified frequency shift can be used to determine whether the structure is occupied. Alternatively, processor 512 may be used to identify frequency shifts in the reflected ultrasonic waves. In one embodiment, occupancy unit 225 described with reference to FIG. 2 can also include an ultrasonic detection system.

Processor 512 can be used to process detected signals received from gas detector 502, microphone detector 504, infrared detector 506, scent detector 508, and/or ultrasonic detection system 510. In an illustrative embodiment, processor 512 can utilize one or more signal acquisition circuits (not shown) and/or one or more algorithms to process the detected signals and determine occupancy data. In one embodiment, processor 512 can utilize the one or more algorithms to determine a likelihood that an occupant is present in a structure. For example, if the detected signals are low, weak, or contain noise, processor 512 may determine that there is a low likelihood that an occupant is present. The likelihood can be conveyed to a user of portable occupancy unit 500 as a percentage, a description (i.e., low, medium, high), etc. Alternatively, processor 512 can determine the likelihood that an occupant is present and compare the likelihood to a predetermined threshold. If the likelihood exceeds the threshold, portable occupancy unit 500 can alert the user to the potential presence of an occupant. If the determined likelihood does not exceed the threshold, portable occupancy unit 500 may not alert the user.

In an illustrative embodiment, processor 512 can determine whether occupants are present based on the combined input from each of gas detector 502, microphone detector 504, infrared detector 506, scent detector 508, and/or ultrasonic detection system 510. In an illustrative embodiment, the one or more algorithms used by processor 512 to determine occupancy can be weighted based on the type of sensor(s) that identify an occupant, the number of sensors that identify the occupant, and/or the likelihood of occupancy corresponding to each of the sensor(s) that identified the occupant. As an example, detection by ultrasonic detection system 510 (or any of the other detectors) may be given more weight than detection by scent detector 508 (or any of the other detectors). As another example, processor 512 may increase the likelihood of occupancy as the number of detectors that detected any sign of occupancy increases. Processor 512 can also determine the likelihood of occupancy based on the likelihood corresponding to each individual sensor. For example, if all of the detectors detect occupancy with a low likelihood of accuracy, the overall likelihood of a present occupant may be low. In one embodiment, any sign of occupancy by any of the sensors can cause processor 512 to alert the user. Similarly, processor 512 can provide the user with information such as the overall likelihood of occupancy, the likelihood associated with each sensor, the number of sensors that detected occupancy, the type of sensors that detected occupancy, etc. such that the user can make an informed decision.

Processor 512 can also be used to monitor and track the use of portable occupancy unit 500 such that a report can be created, stored, and/or conveyed to a recipient. As an example, the report can include a time, location, and likelihood of occupancy for each potential occupant that is identified by portable occupancy unit 500. The report can also include any commands received from the user of portable occupancy unit 500, any information received from outside sources and conveyed to the user through portable occupancy unit 500, etc. The report can be stored in memory 514. The report can also be conveyed to an emergency response center, other emergency responders, etc. via transceiver 522.

In addition to informing a user of whether an occupant is detected and/or a likelihood that the detection is accurate, portable occupancy unit 500 can also inform the user whether a detected occupant is a human or an animal (i.e., dog, cat, rat, etc.) using infrared pattern analysis based on information received from infrared detector 506 and/or audible sound analysis based on information received from microphone detector 504. Portable occupancy unit 500 can also use detected information and pattern analysis to determine and convey a number of persons or animals detected and/or whether detected persons are moving, stationary, sleeping, etc. In one embodiment, portable occupancy unit 500 can also use temperature detection through infrared detector 506 and/or any of the other detection methods to help determine and convey whether a detected occupant is dead or alive.

In one embodiment, a separate signal acquisition circuit can be used to detect/receive signals for each of gas detector 502, microphone detector 504, infrared detector 506, scent detector 508, and ultrasonic detection system 510. Alternatively, one or more combined signal acquisition circuits may be used. Similarly, a separate algorithm can be used to process signals detected from each of gas detector 502, microphone detector 504, infrared detector 506, scent detector 508, and ultrasonic detection system 510. Alternatively, one or more combined algorithms may be used.

The one or more algorithms used by processor 512 can include computer-readable instructions and can be stored in memory 514. Memory 514 can also be used to store present occupancy information, a layout or map of a structure, occupancy pattern information, etc. User interface 516 can be used to receive inputs from a user for programming and use of portable occupancy unit 500. In one embodiment, user interface 516 can include voice recognition capability for receiving audible commands from the user. Output interface 518 can include a display, one or more speakers, and/or any other components through which portable occupancy unit 500 can convey an output regarding whether occupants are detected, etc. Power source 520 can be a battery and/or any other source for powering portable occupancy unit 500.

Transceiver 522 can be used to communicate with occupancy unit 225 and/or any other source. As such, portable occupancy unit 500 can receive present occupancy information and/or occupancy pattern information from occupancy unit 225. Portable occupancy unit 500 can use the present occupancy information and/or occupancy pattern information to help determine a likelihood that one or more humans is present in a given area. For example, the occupancy pattern information may indicate that there is generally a large number of people in a given area at a given time. If used in the given area at or near the given time, the occupancy detection algorithms used by portable occupancy unit 500 may be adjusted such that any indication of occupancy is more likely to be attributed to human occupancy. The present occupancy information can be similarly utilized. Transceiver 522 can also be used to receive information regarding the type of evacuation condition, a location of the evacuation condition, a temperature at a given location, a toxic gas concentration at a given location, etc. The information, which can be received from the evacuation system, an emergency response center, and/or any other source, can be used by the user to identify high risk areas, to identify an optimal route to a given location, etc.

Transceiver 522 can also include short range communication capability such as Bluetooth, Zigbee, Bluetooth Low Energy, etc. for conveying information to a user that is wearing a firefighter suit or other emergency responder suit. For example, transceiver 522 can convey information regarding a detected occupant to an earpiece of the user and/or for conveyance through a speaker or display screen built into a helmet of the suit worn by the user. Transceiver 522 can also receive information from a transmitter incorporated into the suit worn by the user. For example, the transmitter incorporated into the suit can transmit voice or other commands to transceiver 522 of portable occupancy unit 500. As such, the user can control portable occupancy unit 500 while wearing bulky fire retardant gloves and/or other protective equipment.

Global positioning system (GPS) unit 524 can be configured to direct a user of portable occupancy unit 500 to a known location of an occupant using output interface 518. The known location can be received from occupancy unit 225, from an emergency response center, and/or from any other source. In an alternative embodiment, portable occupancy unit 500 can receive verbal and/or textual directions to a known location of an occupant. The verbal and/or textual directions can be received from occupancy unit 225, from the emergency response center, and/or from any other source. The verbal and/or textual directions can be conveyed to a user through output interface 518.

Global positioning system unit 524 can also be used to determine a current location of portable occupancy unit 500 for conveyance to an emergency response center, other portable occupancy units, occupancy unit 225, other computing devices, etc. The current location can be conveyed by transceiver 522. The current location can be used to determine a location of a user of portable occupancy unit 500, to tag a located occupant, to tag a potential source of a fire or other evacuation condition, etc. As an example, a user of portable occupancy unit 500 may locate an occupant in a room in which the occupant is not in immediate danger. The user can tag the room using GPS unit 524 and convey the location to an emergency responder such that the emergency responder can find the occupant and lead him/her safely out of the structure. As such, the user of portable occupancy unit 500 can continue searching for additional occupants that may be in more immediate danger.

In one embodiment, at least a portion of portable occupancy unit 500 may be incorporated into a suit of an emergency responder, such as a firefighter suit. For example, the sensors may be incorporated into a helmet of the suit, into one or both gloves of the suit, into a backpack of the suit, etc. The output interface may be incorporated into one or more speakers of the helmet of the suit. The output interface can also be incorporated into a display screen within the helmet of the suit. The processor, memory, user interface, power source, transceiver, and GPS unit can similarly be incorporated into the suit. In an alternative embodiment, at least the sensors and the transceiver may be incorporated into a wand or other portable unit, and the output interface, processor, memory, user interface, power source, and GPS unit can be incorporated into the suit.

In one embodiment, the system herein can be implemented using a remote server that is in communication with a plurality of sensory nodes that are located in a dwelling. The remote server can be used to process information reported by the sensory nodes and to control the sensory nodes. In one embodiment, the remote server can replace the decision node(s) such that a given dwelling is only equipped with the sensory nodes. In such an embodiment, the system can be implemented using cloud computing techniques as known to those of skill in the art.

Figure 6:
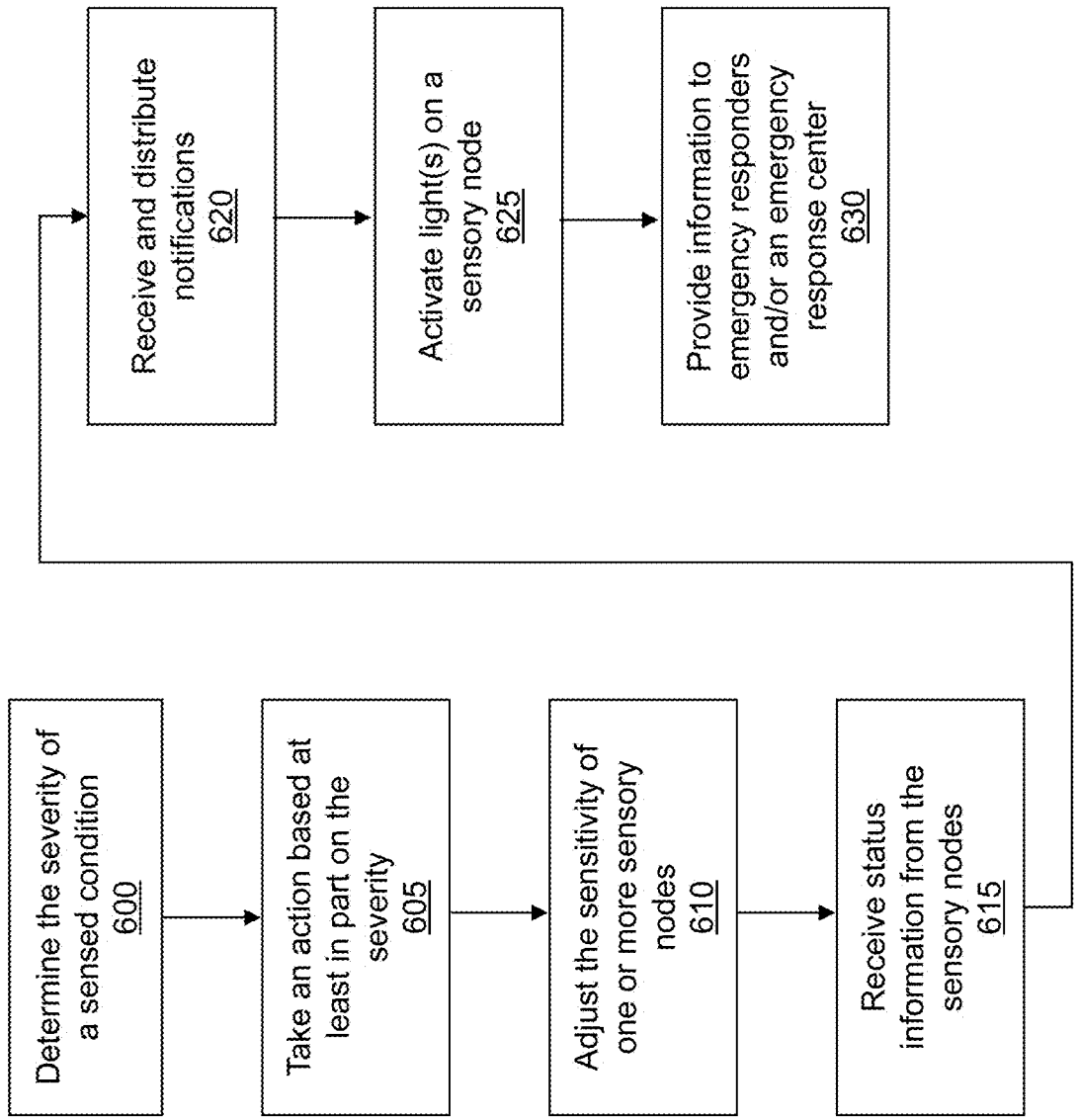
FIG. 6 is a flow diagram illustrating operations performed by an evacuation system in accordance with an illustrative embodiment.

FIG. 6 is a flow diagram illustrating operations performed by an evacuation system in accordance with an illustrative embodiment. In alternative embodiments, fewer, additional, and/or different operations may be performed. The use of a flow diagram is not meant to be limiting with respect to the order of operations performed. In an operation 600, the system determines a severity of a sensed condition. In one embodiment, the severity may be based at least in part on a rate of change (or spread rate) of the sensed condition. As an example, a condition may be detected at a first sensory node. The rate of change can be based on the amount of time it takes for other sensory nodes to sense the same condition or a related condition. If the other sensory nodes rapidly sense the condition after the initial sensing by the first sensory node, the system can determine that the condition is severe and rapidly spreading. As such, the severity of a sensed condition can be based at least in part on the rate at which the sensed condition is spreading. Detected occupancy can also be used to determine the severity of a sensed condition. As an example, a sensed condition may be determined to be more severe if there are any occupants present in the structure where the condition was sensed.

The type of sensed condition may also be used to determine the severity of a sensed condition. As an example, sensed smoke or heat indicative of a fire may be determined to be more severe than a sensed gas such as carbon monoxide, or vice versa. The amount of dispersion of a sensed condition may also be used to determine the severity of the sensed condition. In one embodiment, known GPS locations associated with each of the sensory nodes that have sensed a condition can be used to determine the dispersion of the condition. As an example, if numerous sensory nodes spread out over a large area detect the sensed condition, the system can determine that the severity is high based on the large amount of dispersion of the sensed condition. In one embodiment, the GPS locations associated with each of the nodes can be fine-tuned using wireless triangulation as known to those of skill in the art. As an example, a first node may be considered to be at location zero, and locations of all of the other nodes in the building/structure can be relative to location zero. Using wireless triangulation techniques, the relative signal strength of the nodes can be used to determine the locations of the nodes relative to location zero, and the determined locations can be used to replace and improve the accuracy of the GPS locations originally assigned to the nodes during installation.

The magnitude of the sensed condition can further be used to determine the severity of the sensed condition. As an example, a high temperature or large amount of smoke can indicate a fire of large magnitude, and the system can determine that the severity is high based on the large magnitude. As another example, a large amount of detected carbon dioxide can indicate a high risk to occupants and be designated an evacuation condition of high severity.

In an illustrative embodiment, the determination of whether a sensed condition has high severity can be based on whether any of the factors taken into consideration for determining severity exceed a predetermined threshold. As an example, a determination of high severity may be made based on the spread rate if a second sensory node detects the sensed condition (that was originally detected by a first sensory node) within 5 seconds of detection of the sensed condition by the first sensory node. Alternatively, the spread rate threshold may be 0.5 seconds, 1 second, 3 seconds, 10 seconds, etc. As another example, the high severity threshold for occupancy may be if one person or pet is detected in the building, if one person or pet is detected within a predetermined distance of the sensory node that sensed the condition, etc. With respect to magnitude, the high severity threshold may be if the temperature is greater than 150 degrees Fahrenheit (F), greater than 200 degrees F., greater than 300 degrees F., etc. The magnitude threshold may also be based on an amount of smoke detected, an amount of gas detected, etc. The high severity threshold with respect to dispersion can be if the sensed condition is detected by two or more sensory nodes, three or more sensory nodes, four or more sensory nodes, etc. The high severity threshold with respect to dispersion may also be in terms of a predetermined geographical area. As an example, the system may determine that the severity is high if the evacuation condition has dispersed an area larger than 100 square feet, 200 square feet, etc. The system may also determine that the severity is high if the evacuation condition has dispersed through at least two rooms of a structure, at least three rooms of the structure, etc.

In an operation 605, an action is taken based on the severity. In one embodiment, the system can prioritize the sensed condition based at least in part on the severity. A sensed condition with high severity may be prioritized higher than a sensed condition with low severity. In one embodiment, the priority can be provided to emergency rescue personnel as an indication of the urgency of the sensed condition. The emergency rescue personnel can be use the severity indication to help determine the amount of resources (e.g., personnel, fire trucks, etc.) to deploy in response to the evacuation condition. The severity can also be used by the system to help determine whether a sensed condition is a false alarm. A sensed condition with a high severity can be determined to be an actual evacuation condition and the system can trigger the appropriate alarms, notifications, etc. In one embodiment, the severity of a sensed condition may also be used to control the sensitivity of the sensory node that sensed the condition and other sensory nodes in the vicinity of the sensory node that sensed the condition. Sensitivity adjustment is described below with respect to an operation 610.

In the operation 610, the sensitivity of one or more sensory nodes is adjusted. Sensitivity can refer to the rate at which a sensory node scans its environment for smoke, gas such as carbon monoxide, temperature, occupancy, battery power, ambient light, etc. Examples of sensitivity can be scanning twice a second, once a second, once every 5 seconds, once every 30 seconds, once a minute, once an hour, etc. As indicated above, in one embodiment, the system may adjust the sensitivity of one or more sensory nodes based on the severity of a sensed condition. As also described above, severity can be determined based on factors such as the rate of change of the sensed condition, detected occupancy, the type of sensed condition, the amount of dispersion of the sensed condition, the magnitude of the sensed condition, etc. As an example, smoke may be detected at a sensory node X, and sensory node X can transmit an indication that smoke was detected to a decision node and/or a remote server. If the decision node and/or remote server determine that the sensed condition has high severity, the system can increase the sensitivity of the sensory node X and/or sensory nodes Y and Z in the vicinity of sensory node X such that the scan rate for these nodes increases. The increased sensitivity can also result in a higher communication rate such that the decision node and/or remote server receive more frequent communications from sensory nodes X, Y, and Z regarding sensor readings. The increased sensitivity may also result in a reduction in one or more predetermined thresholds that the system uses to determine if a sensed condition has high severity, to determine if the sensed condition triggers a notification, etc.

The sensitivity of sensory nodes can also be adjusted if any sensory node detects a condition, regardless of the severity of the condition. As an example, the system may automatically increase the sensitivity of sensory nodes Y and Z (which are in the vicinity of sensory node X) if sensory node X detects a condition. The system may also increase the sensitivity of all sensory nodes in a building/structure if any one of the sensory nodes in that building/structure sense a condition. In one embodiment, in the event of an alternating current (AC) power failure, the sensitivity of sensory nodes may be decreased to conserve battery power within the sensory nodes. Similarly, in embodiments where AC power is not present, the system may decrease the sensitivity of any nodes that have low battery power.

The sensitivity of sensory nodes may also be controlled based on a location of the sensory node and/or a learned condition relative to the sensory node. For example, a sensory node in a kitchen or in a specific location within a kitchen (such as near the oven/stovetop) may have higher sensitivity than sensory nodes located in other portions of the structure. The sensitivity may also be higher in any sensory node where a condition has been previously detected, or in sensory nodes where a condition has been previously detected within a predetermined amount of time (e.g., within the last day, within the last week, within the last month, within the last year, etc.). The sensitivity may also be based on occupancy patterns. For example, the sensitivity of a given sensory node may be lower during times of the day when occupants are generally not in the vicinity of the node and raised during times of the day when occupants are generally in the vicinity of the node. The sensitivity may also be raised automatically any time that an occupant is detected within the vicinity of a given sensory node.

The sensitivity of a sensory node may also be increased in response to the failure of another sensory node. As an example, if a sensory node X is no longer functional due to loss of power or malfunction, the system can automatically increase the sensitivity of nodes Y and Z (which are in the vicinity of node X). In one embodiment, the system may increase the sensitivity of all nodes in a building/structure when any one of the sensory nodes in that building/structure fails. In another embodiment, the system may automatically increase the sensitivity of one or more nodes in a building/structure randomly or as part of a predetermined schedule. The one or more nodes selected to have higher sensitivity can be changed periodically according to a predetermined or random time schedule. In such an embodiment, the other nodes in the building/structure (e.g., the nodes not selected to have the higher sensitivity) may have their sensitivity lowered or maintained at a normal sensitivity level, depending on the embodiment.

In an operation 615, status information regarding the sensory nodes is received from the sensory nodes. In an illustrative embodiment, the sensory nodes periodically provide status information to the decision node and/or remote server. The status information can include an identification of the sensory node, location information corresponding to the sensory node, information regarding battery life of the sensory node, information regarding whether the sensory node is functioning properly, information regarding whether any specific sensors of the sensory node are not functioning properly, information regarding whether the speaker(s) of the sensory node are functioning properly, information regarding the strength of the communication link used by the sensory node, etc. In one embodiment, information regarding the communication link of a sensory node may be detected/determined by the decision node and/or remote server. The status information can be provided by the sensory nodes on a predetermined periodic basis. In the event of a problem with any sensory node, the system can alert a system administrator (or user) of the problem. The system can also increase the sensitivity of one or more nodes in the vicinity of a sensory node that has a problem to help compensate for the deficient node. The system may also determine that a node which fails to timely provide status information according to a periodic schedule is defective and take appropriate action to notify the user and/or adjust the sensitivity of surrounding nodes.

In an operation 620, the system receives and distributes notifications. The notifications can be related to school closings, flight delays, food/drug recalls, natural disasters, weather, AMBER alerts for missing children, etc. The system can receive the notifications from any source known to those of skill in the art. In one embodiment, the notifications are received by the decision node and/or remote server and provided to one or more sensory nodes. The notifications can be provided to the sensory nodes as recorded messages that can be played through the speaker(s) of the sensory nodes. The notifications can also be provided to the sensory nodes as textual messages that are conveyed to users through a display on the sensory nodes. The display can be a liquid crystal display (LCD) or any other display type known to those of skill in the art. The notifications can also be provided to users as e-mails, text messages, voicemails, etc. independent of the sensory nodes.

In one embodiment, the system can determine the sensory nodes (e.g., locations) to which the notification applies and send the notification to sensory nodes and/or users located within that geographical area. The determination of which sensory nodes are to receive the notification can be based on information known to the system such as the school district in which nodes are located, the zip code in which nodes are located, etc. The sensory nodes in a given geographical area can also be determined based at least in part on the GPS locations associated with the sensory nodes. In an alternative embodiment, the nodes affected by a notification may be included in the notification such that the system does not determine the nodes to which the notification applies.

In one embodiment, users can tailor the mass notification feature of the system based on their desires/needs. For example, the user can filter notifications by designating the types of notifications that he/she wishes to receive. As such, only the desired type(s) of notifications will be provided to that user. The user may also designate one or more specific sensory nodes that are to receive and convey the notifications, such as only the node(s) in the kitchen, only the node(s) in the master bedroom, etc. The specific sensory node(s) designated to receive and convey the notification may also be based on the time of day that the notification is received. For example, the user may designate the node(s) in the kitchen to convey notifications between 8:00 am and 10:00 pm, and the node(s) in the master bedroom to convey notifications that are received from 10:01 pm through 7:59 am. The user can also select a volume that notifications are to be played at, and different volume levels may be designated for different times of day. The user may also pre-record messages that are to be conveyed through the speaker(s) of the sensory node(s) based on the type of notification. For example, in the event of a tornado notification, the pre-recorded message from the user may be "A tornado is approaching, please head to the basement and stay away from windows." Alternatively, default messages generated by the system or the mass notification system may be used. The user can further designate the number of times that a notification is to be repeated. In one embodiment, sensory nodes may include a notification light that indicates a notification has been received. The user can receive the notification by pushing a button on the sensory node to play the notification. In addition to the notification itself, the system may also provide instructions to the user for responding to the notification. The instructions may include an evacuation route, a place to go within a dwelling, a place not to go within the dwelling, to leave the dwelling etc.

In an operation 625, one or more lights on a sensory node are activated. The light(s) can be used to illuminate the immediate area of the sensory node to help occupants identify and utilize evacuation routes. In one embodiment, the light(s) on the sensory node can be light emitting diode (LED) lights. In one embodiment, the lights can be activated in the event of an AC power loss at a sensory node, regardless of whether an evacuation condition is sensed. In an alternative embodiment, the lights may be activated only if there is AC power loss and a detected evacuation condition. In one embodiment, the sensory nodes may include ambient light sensors, and the lights on the sensory node can be activated in the event of an evacuation condition where no or little ambient light is detected by the sensory node.

In one embodiment, the decision nodes and/or remote server may periodically transmit a heartbeat signal to the sensory nodes using communication links between the decision nodes/remote server and the sensory nodes. If the heartbeat signal is not received by a sensory node, the sensory node can poll surrounding sensory nodes to determine whether the surrounding nodes have received the heartbeat signal. If the surrounding nodes have received the heartbeat signal, the sensory node can determine that there is a problem with its communication link. If the surrounding nodes have not received the heartbeat signal, the sensory node can determine that there is a power loss or radio communication failure with the decision node and/or remote server. If it is determined that there is a power failure with a local decision node or server, the sensory node can be configured to detect whether there is sufficient ambient light in the vicinity, and to activate the one or more lights on the sensory node if there is not sufficient ambient light. In one embodiment, in the event of a power failure, the sensory nodes can also enter a lower power smoke detector mode in which the sensory node functions only as a traditional smoke detector to conserve battery power until AC power is restored.

In an operation 630, information is provided to emergency responders and/or an emergency call center. Emergency responders can be fire fighters, police officers, paramedics, etc. The emergency call center can be a 911 call center or other similar facility. In an illustrative embodiment, emergency responders can log in to the system to access information regarding evacuation conditions. A user interface can be provided for emergency responders to log in through a computing device such as a laptop computer, smart phone, desktop computer, etc. Individual emergency responders or entire emergency response units can have a unique username and password for logging in to the system. In one embodiment, the system can keep track of the time and identity of individuals who log in to the system.

Upon logging in to the system, the emergency responder can be provided with a list of sensed evacuation conditions. The list can include an identification of the type of sensed condition such as fire, smoke, gas, etc. The list can include a time at which the condition was first sensed or last sensed based on one or more timestamps from the sensory node(s) that detected the condition. The list can include an address where the condition was sensed and a number of individuals that live at or work at the address. The list can include the type of structure where the condition was sensed such as one story business, three story office building, two story residential home, ranch residential home, etc. The list can also include the size of the structure where the condition was sensed such as a square footage. The list can further include an indication of the response status such as whether anyone has responded to the condition, who has responded to the condition, the time that the condition was responded to, whether additional assistance is needed, etc. In one embodiment, when new entries are added to the list, an audible, textual, and or vibratory alarm can be transmitted from the computing device to notify the emergency responder that a new evacuation condition has been sensed.

In an illustrative embodiment, the first responder can select an entry from the list of in progress evacuation conditions to receive additional information regarding the selected entry. The additional information can include an animated isothermal view of the structure that shows the current temperatures throughout the structure based on temperatures detected by the sensory nodes within the structure. In addition to temperature zones, the animated isothermal view can illustrate window locations, door locations, any other exit/entry points of the structure, the road(s) nearest the structure, etc. In one embodiment, a separate isothermal view can be provided for each floor and/or each room of the structure, such as a first floor, second floor, third floor, basement, master bedroom, kitchen, etc. The additional information can include a time at which the condition was detected, a number of persons that live or work at the structure, ages of the persons that live or work at the structure, names of the persons that live or work at the structure, a number and/or type of pets at the structure, whether there are farm animals present, the type and/or number of farm animals present, a type of the structure, a size of the structure, a type and/or composition of roofing that the structure has, the type of truss system used in the structure, a type of siding of the structure (e.g., vinyl, aluminum, brick, etc.), whether the structure has sprinklers, whether there are any special needs individuals that live or work in the structure, the type of special needs individuals that live or work in the structure, a lot size of the location, characteristics of the lot such as hilly, trees, flat, etc., a number and/or type of vehicles (cars, trucks, boats, etc.) that may be present at the location, potential obstructions such as on street parking, steep driveway, and hills, etc. As discussed in further detail below, general information regarding the structure, occupants, lot, vehicles, etc. can be provided by the user during installation and setup of the system.

In one embodiment, the additional information can also include a number of occupants detected at the location at the current time and/or at the time the condition was detected. In such an embodiment, the system can track the number of occupants in a structure by monitoring the exit/entry points of the structure. The occupancy information can also include a location of the occupants. As an example, the system may determine that three occupants are located in a room of the structure, and that the temperature surrounding the room is high. As such, the emergency responders can determine that the three individuals are trapped in the room and make it a priority to get those individuals out of the structure.

The additional information can include a time when the condition was first detected, historical spread rates of the condition, the severity of the condition, the magnitude of the condition, the amount of dispersion of the condition, the current spread rate of the condition, etc. The amount of dispersion can be used to determine the extent of the evacuation condition and allow responders to determine an appropriate number of responders to send to the structure. As an example, if the system senses smoke and high temperature at every sensory node within the structure, the emergency responders can determine that a fire is present and has spread throughout the structure. Appropriate resources to fight the fire can then be dispatched.

The additional information can further include an estimated arrival time of the emergency responder to the location using any GPS navigational techniques known to those of skill in the art, the current time, and the condition at the location. The condition at the location can be estimated by the system based on sensed conditions, such as flames in the kitchen, flames in the basement, smoke throughout the structure, etc. The condition at the location may also be based on a first-hand account of an occupant of the structure. In one embodiment, the occupant can provide the first-hand account to an emergency call center operator who can enter the information into the system such that it is accessible by the emergency responders. The emergency call center operator can also enter additional information such as whether any responders are currently on site at the location, a number of responders on site, etc. The first-hand account may also be entered directly into the system by the occupant through a computing device once the occupant has evacuated the structure. The computing device can be handheld, such as a smartphone. The first-hand account can include information regarding the evacuation condition, information regarding occupants still in the structure, information regarding access to the structure, etc. In one embodiment, the user can verbally provide the information and the system can provide the verbal account to the emergency responder. Alternatively, the system can automatically transcribe the verbal account into text and provide the text to the emergency responder. In another embodiment, the user may textually provide the information.

The additional information regarding an evacuation condition can also include statistics regarding the condition. The statistics can include a heat rise at the structure in terms of degrees per time unit (e.g., 50 degrees F./second), a smoke rise at the structure in terms of parts per million (ppm) per time unit (e.g., 2000 ppm/second), and/or a gas rise such as a carbon monoxide level increase. The heat rise, smoke rise, and/or gas rise can be provided textually and/or visually through the use of a graph or chart. The statistics can also include a heat magnitude and/or smoke magnitude. The statistics can also include one or more locations of the dwelling where occupants were last detected, whether there is still AC power at the location, whether communication to/from the sensory nodes is still possible, whether there is any ambient light at the location, etc. In an illustrative embodiments, any of the statistics may be associated with a timestamp indicative of a time of the measurements, etc. that the statistic is based on.

The additional information regarding an evacuation condition can also include maps. The maps may include a street map of the area surrounding the location at which the evacuation condition was sensed, a map that illustrates utility locations and fire hydrants proximate to the location at which the evacuation condition was sensed, an overhead satellite view showing the location at which the evacuation condition was sensed, a map showing neighborhood density, etc. In one embodiment, one or more of the maps may highlight the route of the emergency responder such that the emergency responder knows the relative location of the structure as he/she arrives at the scene. The additional information may also include a weather report and/or predicted weather for the location at which the evacuation condition was sensed. The maps and/or weather information can be obtained from mapping and weather databases as known to those of skill in the art.

The additional information regarding an evacuation condition can also include pictures of the interior and/or exterior of the structure. The pictures can include one or more views of the home exterior, illustrating windows, doors, and other possible exits and/or one or more views of the lot on which the structure is located. The pictures can also include one or more interior views of the structure such as pictures of the kitchen, pictures of the bathroom(s), pictures of the bedroom(s), pictures of the basement, pictures of the family room(s), pictures of the dining room(s), etc. The pictures can further include blueprints of the structure. The blueprints can illustrate each floor/level of the structure, dimensions of rooms of the structure, locations of windows and doors, names of the rooms in the structure, etc. In one embodiment, construction information may be included in conjunction with the pictures. The construction information can include the type/composition of the roof, the type of truss system used, the type of walls in the structure, whether there is a basement, whether the basement is finished, whether the basement is exposed, whether the basement has egress windows, the type(s) of flooring in the structure, the utilities utilized by the structure such as water, electricity, natural gas, etc., the grade of the lot on which the structure is located, etc.

In one embodiment, the system can also generate an investigation page that illustrates statistics relevant to an event investigation. The investigation page can include information regarding what was detected by each of the sensory nodes based on location of the sensory nodes. The detected information can be associated with a timestamp indicating the time that the detection was made. As an example, an entry for a first sensory node located in a kitchen 7:00 pm can indicate a detected smoke level at 7:00 pm, a detected temperature at 7:00 pm, a detected carbon monoxide level at 7:00 pm, a detected number of occupants at 7:00 pm, etc. Additional entries can be included for the first sensory node at subsequent times such as 7:01 pm, 7:02 pm, 7:03 pm, etc. until the evacuation condition is resolved or until the first sensory node is no longer functional. Similar entries can be included for each of the other nodes in the structure. The entries can also indicate the time at which the system determined that there is an evacuation condition, the time at which the system sends an alert to emergency responders and/or an emergency call center, the time at which emergency responders arrive at the scene, etc.

The investigation page may also include textual and/or visual indications of smoke levels, heat levels, carbon monoxide levels, occupancy, ambient light levels, etc. as a function of time. The investigation page can also include diagnostics information regarding each of the sensory nodes at the structure. The diagnostics information can include information regarding the battery status of the node, the smoke detector status of the node, the occupancy detector status of the node, the temperature sensor status of the node, the carbon monoxide detector status of the node, the ambient light detector status of the node, the communication signal strength of the node, the speaker status of the node, etc. The diagnostic information can also include an installation date of the system at the structure, a most recent date that maintenance was performed at the structure, a most recent date that a system check was performed, etc. The investigation page can also include a summary of the evacuation condition that may be entered by an event investigator.

In an illustrative embodiment, emergency response call centers can also access the system through a user interface. As indicated above, emergency response operators can add information through the user interface such that the information is accessible to the emergency responders. The information can be received through a 911 call from an occupant present at the location of the evacuation condition. The information may also be received from emergency responders at the location of the evacuation condition. In one embodiment, an audible, textual, and/or vibratory alarm can be triggered upon detection of an evacuation condition to alert an emergency response operator of the condition. In one embodiment, the alarm may continue until the emergency response operator acknowledges the evacuation condition.

In one embodiment, the system can also send a 'warning' alert to a user such as a home owner/business owner when an evacuation condition is detected at his/her structure. In an illustrative embodiment, the system can determine that there is an evacuation condition if a smoke level, heat level, carbon monoxide level, etc. exceeds a respective predetermined evacuation condition threshold. The predetermined evacuation condition thresholds can be set by the system or designated by the user, depending on the embodiment. The system may also be configured to send a 'watch' alert to a user if a smoke level, heat level, carbon monoxide level, occupancy level, etc. exceeds a respective predetermined watch threshold. The predetermined watch thresholds can be set by the system or designated by the user, depending on the embodiment. In an illustrative embodiment, the watch thresholds can be in between a normal/expected level and the predetermined evacuation condition threshold. As such, the watch thresholds can be used to provide an early warning to a user that there may be a problem. As an example, the watch threshold for heat in a master bedroom may be 150 degrees F. and the evacuation condition threshold for heat in the master bedroom may be 200 degrees F. As another example, the user may indicate that a detected occupancy which exceeds a watch threshold (e.g., 10 people, 15 people, etc.) should result in a watch alert being sent to the user. As such, the user can determine whether there is an unauthorized party at his/her home. The user can also set the watch threshold for occupancy to 1 person for periods of time when the user is on vacation. As such, the user can be alerted if anyone enters his/her home while he/she is on vacation. A watch alert can also be sent to the user if a power loss is detected at any of the nodes. Watch alerts can also be sent to the user if the system detects a problem with any node such as low battery, inadequate communication signal, malfunctioning speaker, malfunctioning sensor, etc.

In one embodiment, when the system sends an early warning watch alert to a user, the system can request a response from the user indicating whether the user is at the location and/or whether the user believes that the watch alert is a false alarm. If no response is received from the user or if the user indicates that the alert may not be a false alarm, the system can automatically increase the sensitivity of the system to help determine whether there is an evacuation condition. The watch alerts and warning alerts can be sent to the user in the form of a text message, voice message, telephone call, e-mail, etc. In an illustrative embodiment, watch alerts are not provided by the system to emergency responders or an emergency response call center.

In one embodiment, one or more of the sensory nodes in a structure can include a video camera that is configured to capture video of at least a portion of the structure. Any type of video camera known to those of skill in the art may be used. In one embodiment, the video captured by the video camera can be sent to a remote server and stored at the remote server. To reduce the memory requirements at the remote server, the remote server may be configured to automatically delete the stored video after a predetermined period of time such as one hour, twelve hours, twenty-four hours, one week, two weeks, etc. A user can log in to the remote server and view the video captured by any one of the sensory nodes. As such, when the user is away from home, the user can check the video on the remote server to help determine whether there is an evacuation condition. Also, when the user is on vacation or otherwise away from home for an extended period of time, the user can log in to the remote server to make sure that there are no unexpected occupants in the structure, that there are no unauthorized parties at the structure, etc. The stored video can also be accessible to emergency responders, emergency call center operators, event investigators, etc. In one embodiment, in the event of an evacuation condition, the video can be streamed in real-time and provided to emergency responders and/or emergency call center operators when they log in to the system and view details of the evacuation condition. As such, the emergency responders and/or emergency call center operators can see a live video feed of the evacuation condition. The live video feed can be used to help determine the appropriate amount of resources to dispatch, the locations of occupants, etc.

Figure 7:
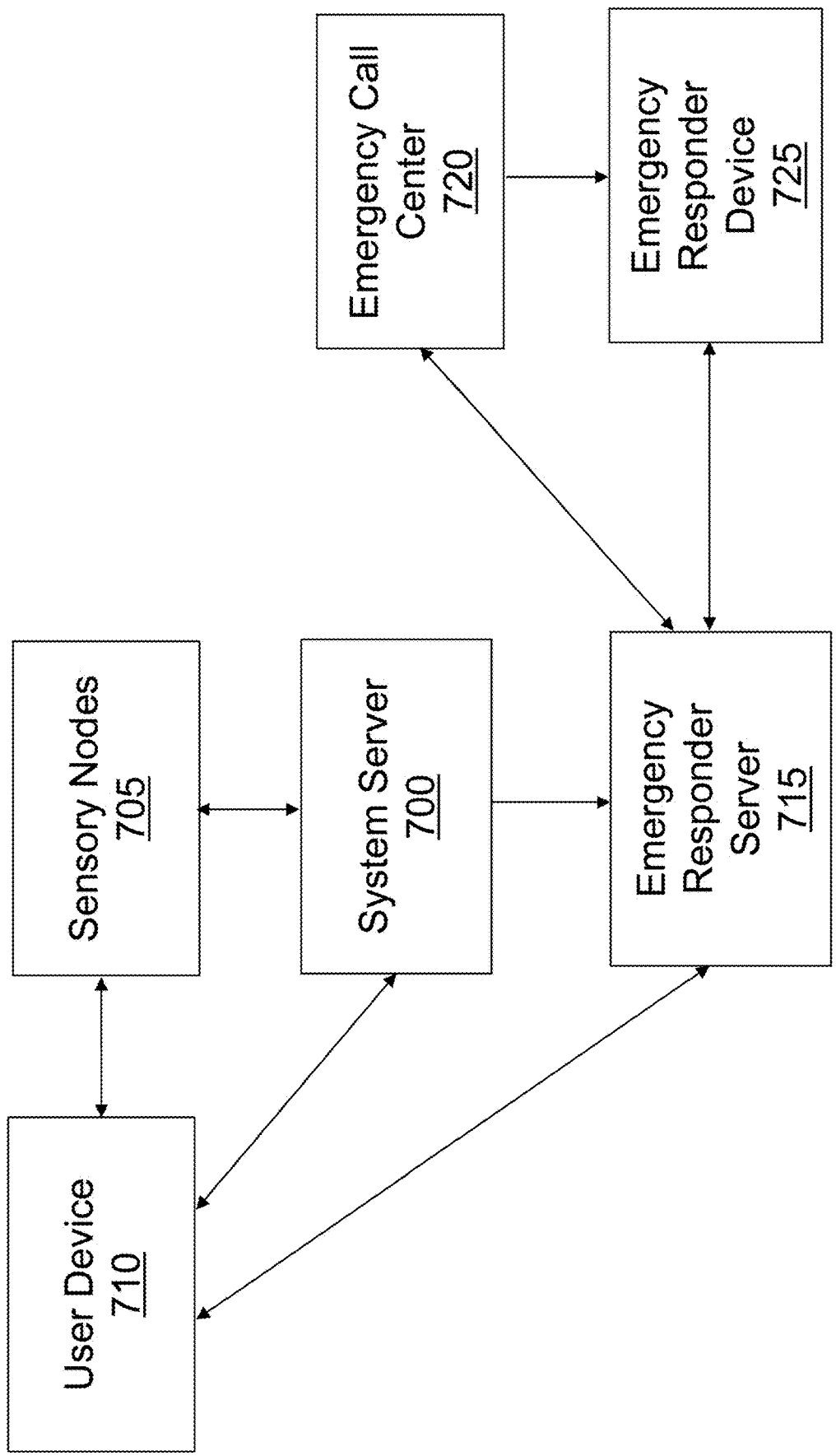
FIG. 7 is a block diagram illustrating communication between the system, emergency responders, a user, and an emergency response call center in accordance with an illustrative embodiment.

FIG. 7 is a block diagram illustrating communication between the system, emergency responders, a user, and an emergency response call center in accordance with an illustrative embodiment. Although not illustrated, it is to be understood that the communications may occur through a direct link or a network such as the Internet, cellular network, local area network, etc. Sensory nodes 705 in a structure can provide detected information, status information, etc. to a system server 700. The sensory nodes 705 can also receive instructions, evacuation routes, etc. from the system server 700. The sensory nodes 705 can also communicate with a user device 710 to provide alerts and receive acknowledgements and/or instructions regarding the alerts. In an alternative embodiment, communication of alerts and acknowledgements may be between the system server 700 and the user device 710. The user device 710 can also communicate with the sensory nodes 705 and/or system server 700 during installation and/or testing the system as described in more detail below. The user device 710 can be any device configured to convey information such as a smartphone, a smart watch, or an implantable device (such as computer chips implantable in humans).

Upon detection of an evacuation condition, the system server 700 or the user device 710 can provide information regarding the evacuation condition and/or structure to an emergency responder server 715. In one embodiment, the emergency responder server 715 can generate a record of the evacuation condition and provide the record to an emergency call center 720. The emergency responder server 715 may also receive information from the emergency call center 720 such as login information, additional information regarding the evacuation condition received during a 911 call, etc. In one embodiment, the emergency responder server 715 or an operator at the emergency response call center can initiate contact with the first responders through a telephone call, etc. to an emergency responder center. Upon receiving notice of the evacuation condition, an emergency responder can use an emergency responder device 725 to log in to the system. The login information can be communicated from the emergency responder device 725 to the emergency responder server 715. The emergency responder device 725 can receive the evacuation condition record and utilize the information to prepare for responding to the evacuation condition and to ensure that sufficient resources are dedicated to the evacuation condition. Information provided to the emergency responder device 725 can include the number of occupants in the building, whether any toddlers or handicapped people are in the building (or may be in the building), where occupants are, where the evacuation condition is the worst, which portions of the building are still accessible and which are not accessible, a floor plan of the building, etc. The emergency responders can use such information to analyze the situation before attempting to mitigate the evacuation condition.

In an embodiment, the user device 710 can be configured to provide information to emergency responders directly, thereby eliminating the need for a third-party call center. Conveyance of such information to the responders can be via the emergency responder server 715 or can be more direct. For example, user device 710 can be configured to transmit information related to a location of user device 710 to the system server 700, which can, in turn, convey the information to a device of the emergency responders. In another example, user device 710 can be configured to detect, via wireless communication networks or direct wireless connections (e.g., Bluetooth), an emergency responder device. In such an example, the user device 710 can communicate with the emergency responder device using the applicable communication medium.

In some embodiments, the user device 710 can be configured to send to the emergency responders information including a location of the user device, a floor plan of the building, other building information, evacuation condition information, or any other information accessible to the user device 710. The user device 710 can also be configured to transmit user input information to the emergency responders. For example, the user device 710 can be configured to send an audio message, a video, text, or other information to the emergency responders. In such an example, the user device 710 can record an audio message of a voice saying, "Please help me. I'm in the master bedroom and I cannot get out." The user device 710 can then send the audio message to the emergency responders. In some embodiments, the user device 710 can detect a location of the user device 710, and send the location information to the emergency responders. In some embodiments, user device 710 can make a determination about a user and send the determination to the emergency responders. For example, the user device 710 can determine that the user is moving along an evacuation route. In such an instance, the user device 710 can send information to the emergency responders indicating that the user does not need emergency assistance. In another example, the user device 710 can determine that the user has not responded to a notification by the user device 710 and send information to the emergency responders indicating that the user may be incapacitated. In yet another example, the user device 710 can detect audio (or any other detectable sense such as motion) that indicates that a person is in need of assistance (e.g., screaming, certain words like "help," loud noises, crashes, falls, etc.) and communicate the relevant information to the emergency responders. The relevant information can include a location of the user device 710, an audio file, a movement speed of the user device 710, or past movements (e.g., a 10 ft. fall).

In some embodiments, the user device 710 can sense that a user of the user device 710 is active. For example, the user device 710 can detect a touch of a screen, a tapping of a screen, a tapping of the user device 710, shaking of the user device 710, etc. In some embodiments, a request can be sent to the user device 710 from system server 700, emergency responder device 725, another user device 710, etc. for an indication that a user of the user device 710 is active. The user device 710 can then detect that the user is active, for example by receiving a textual indication (for example from an on-screen keyboard, keys or buttons of the user device 710, etc.). For example, the user device 710 can detect that the user has typed, "I am in the kitchen." Other examples of the user device 710 detecting that the user is active includes a touch of a screen, a tapping of a screen, a tapping of the user device 710, shaking of the user device 710, an audio recording of the user and/or the user's voice, etc.

In an illustrative embodiment, sensory nodes 705 can provide detected information, status information, etc. to the user device 710. User device 710 can, based at least in part on the information provided by the sensory nodes 705, determine that there is an evacuation condition. In such an embodiment, the user device 710 can provide the information regarding the evacuation condition to the emergency responder server 715. Thus, the system server 700 need not receive the information regarding the evacuation condition before the emergency responder server 715 is notified.

In an illustrative embodiment, the user device 710 can be a smart phone. The user device 710 can, for example, receive information from a sensory node 705 that a master bedroom temperature is 200 degrees F. The user device 710 can determine that 200 degrees F. is higher than an evacuation condition threshold and, therefore, that an evacuation condition exists. The user device 710 can notify a user by any means known to those of skill in the art, for example ringing, flashing, vibrating, text message, etc. For example, the user device 710 can indicate via text that "The master bedroom temperature exceeds 200 degrees F. A fire is expected." The user device 710 can further prompt the user for an action such as acknowledging the alarm, indicating that the alarm is a false alarm, or contacting emergency personnel. For example, the user device 710 can prompt a user to contact 911 personnel. In such an example, the user device 710 can be configured to allow acknowledgement of the prompt via any available input. In one example, the user can verbally confirm that the user device 710 should call 911. In one embodiment, contacting emergency personnel can include sending information related to the evacuation condition to emergency responder server 715. In another embodiment, contacting emergency personnel can include contacting the emergency personnel via a telephone connection, for example by calling the fire department or 911. User device 710 can be configured to send all relevant information to the emergency personnel including sensory information, floor plan, occupancy, video (real-time or recorded), neighborhood information, real-time data, etc. In one embodiment, user device 710 can include a camera and can be configured to send to the emergency personnel pictures or video taken by a camera of the user device 710. In such embodiments, the user device 710 is capable of being used in place of a call center. That is, instead of a notification of a reportable event going to a third-party call center who, in turn, can notify authorities, the notification can go to the user device 710 and the user can determine whether the authorities should be contacted via the user device 710. Thus, some aspects of the present disclosure can eliminate the need for a third-party call center.

In some embodiments, a user can subscribe to a call center 720 that can monitor the status of sensory nodes 705. For example, a sensory node 705 can detect occupancy in a house above a threshold number of individuals (e.g., 0, 1, 2, etc.) and send the information to system server 700. System server 700 can then, in turn, send the information to the call center 720. An operator of call center 720 can access the information and determine how to respond. In some embodiments, an operator is not used and the call center 720 can be automated. In response to the information that occupancy in the house is higher than the threshold, the call center 720 can notify the user, such as with user device 710, or can contact an emergency responder, such as the police department. In some embodiments, the call center 720 can first contact the user via user device 710 and receive instructions on how to respond.

For example, the call center 720 can notify the user via user device 720 that occupancy in the house is above a threshold. The user can be notified that there are 20 people in the user's house. The user can then determine how the occupancy situation should be handled. For example, the user can determine that the call center 720 should ignore the alert because the user is hosting the 20 people. Alternatively, the user can decide that the call center 720 should contact the police because nobody should be at the user's house at that time. In other scenarios, the user can decide that call center 720 should contact a private security guard to take care of the occupancy situation, for example by breaking up an unauthorized house party. The user can use user device 710 to notify the call center 720 of the appropriate response using any method known in the art, including via telephone, text message, smart phone application, email, etc.

In an illustrative embodiment, user device 710 can receive information from emergency responder server 715. Such information can include, for example, instructions on performing emergency medical care, directions to the nearest fire extinguisher, location of en route emergency responders, etc. In some embodiments, user device 710 can already have useful information stored on it and can provide the information to the user. For example, user device 710 can include a floor plan that indicates the location of all defibrillators in the building. In an emergency where a defibrillator is needed, user device 710 can determine the location of the user device 710, and identify the nearest defibrillator. User device 710 can indicate to the user where the nearest defibrillator is and directions to locate the defibrillator. User device 710 can also remember the starting location of the user device, or the location of the emergency, and provide directions to return to the emergency once the defibrillator is located. User device 710 can further provide instructions on how to use the defibrillator. In alternative embodiments, emergency responder server 715 can provide such information to the user device 710. In such an embodiment, such information can be provided to the user device 710 once an emergency responder determines that the user requires the information.

The evacuation condition record provided to the emergency responder device 725 from the emergency responder server 715 can include any of the information discussed above, including maps, pictures, occupancy information, statistics regarding the evacuation condition, etc. In an alternative embodiment, the emergency responder server 715 may not be used. In such an embodiment, the system server 700 can be used to communicate with the emergency call center 720 and the emergency responder device 725.

In some embodiments, the system server 700 can be any building management system, building automated system, supervisory control and data acquisition (SCADA) system, fire alarm control panel (FACP), or the like. The system server 700 can be an existing, pre-installed, and/or previously commissioned computer system that receives information from one or more sensory nodes 705. The system server 700 can have a communications port that can be used to access information (e.g., by the emergency responder server 715). The communications port can be a physical, wired port (e.g., RS-232, RS-422, RS-485, etc.) or a wireless access port.

In such an embodiment, the emergency responder server 715 can use the communications port to access information stored in and/or received at the system server 700. For example, the emergency responder server 715 can access information such as the status of various smoke detectors in communication with the system server 700 (e.g., whether a smoke detector is in alarm, the level of smoke detected, etc.). The emergency responder server 715 can also access information regarding the status of any other sensory node 705, e.g., heat sensors, occupancy detectors, etc. In some embodiments, the emergency responder server 715 can access location information associated with individual sensory nodes 705. For example, the emergency responder server 715 can access sensory node 705 identification or serial numbers, wireless addresses, geographic coordinates, or room information (e.g., living room, Room 315, lobby, etc.). In some embodiments, such location information can be stored in the system server 700 and the emergency responder server 715 can access such information via the communications port.

Figure 13:
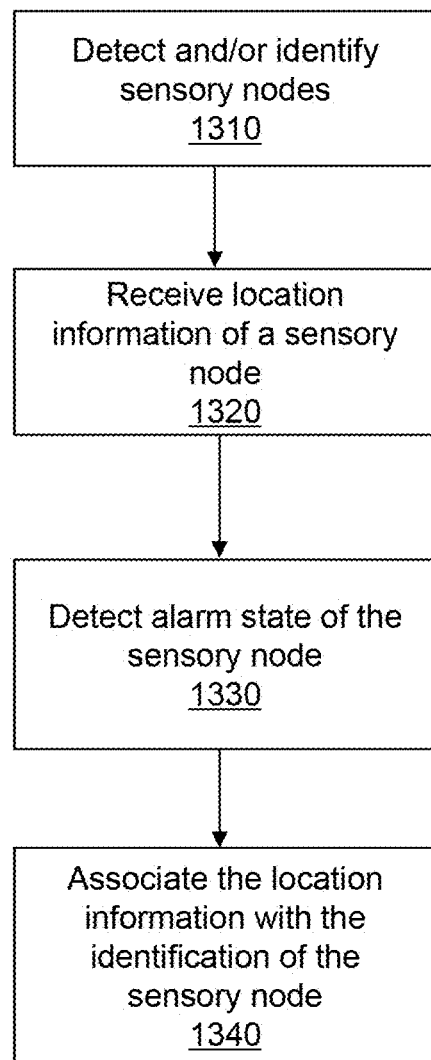
FIG. 13 is a flow diagram illustrating operations performed to identify location information of sensory nodes in accordance with an illustrative embodiment.

In some embodiments, however, some location information is not accessible to the emergency responder server 715. A method illustrated in FIG. 13 can be used to identify the locations of various sensory nodes 705. FIG. 13 is a flow diagram illustrating operations performed by the emergency responder server 715 to identify location information of sensory nodes 705 in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 13 can be performed by one or more elements of the system disclosed herein. In an illustrative embodiment, the emergency responder server 715 can be configured to identify the location of various sensory nodes 705. For example, the system server 700 can be in communication with five sensory nodes 705, all located in different rooms of a building. In an operation 1310, the emergency responder server 715 can communicate with the system server 700 to detect that the system server 700 is in communication with the five sensory nodes 705 and to identify the five sensory nodes 705 from one another via, for example, serial numbers, identification numbers, network addresses, etc. In an operation 1320, the emergency responder server 715 can receive location information of a sensory node 705. The location information can be received via, for example, a user input such as a keyboard, mouse, touchscreen, etc. Such information can be, for example, "living room," "Room 517," "Hallway B," "Floor 2, Northeast Corner," etc. In some embodiments, the location information can be geographic coordinates (e.g., GPS coordinates) received via, for example, user device 710. Along with the location information, other information can also be received regarding the sensory node 705. Such information can include a serial number of the sensory node 705, a product code, an identification number, a picture of the sensory node 705, a type of sensory node 705 (e.g., smoke detector, occupancy detector, etc.), etc.

The emergency responder server 715 can then listen for the sensory node 705 to be identified via an alarm state. In an operation 1330, the emergency responder server 715 can detect an alarm state of the sensory node 705. In some embodiments, the sensory node 705 can be artificially induced to be in alarm. In other embodiments, a test button on the sensory node 705 can be pressed to enter the sensory node 705 into alarm. In an operation 1340, the emergency responder server 715 can associate the location information with the identification of the sensory node 705 that was in alarm.

In the example described above, emergency responder server 715 can detect that system server 700 is in communication with five sensory nodes 705 and detect that they are identified as "Node 1," Node 2," "Node 3," "Node 4," and "Node 5." The emergency responder server 715 can receive location information about a sensory node. Such information can be, for example, "living room." The emergency responder server 715 can also receive information identifying the sensory node as a smoke detector. The emergency responder server 715 can monitor the status of the five sensory nodes 705 via the system server 700. The sensory node 705 can then be induced into an alarm state, which is detected by the emergency responder server 715. For example, the emergency responder server 715 can detect that the node identified as "Node 3" is in alarm. The emergency responder server 715 can then associate the location information (e.g., "living room") with the identification of the sensory node 705 (e.g., "Node 3") and further with the other received information (e.g., smoke detector). Accordingly, the emergency responder server 715 can have information of a single sensory node 705 that identifies which address (or other identification information) the sensory node 705 has within the system server 700 (e.g., "Node 3") and associates such information with other useful information gathered from outside of the system server 700, such as that the sensory node 705 is located in the living room and is a smoke detector.

In some embodiments, the emergency responder server 715 can comprise a wireless gateway. In such an embodiment, the gateway can communicate with the system server 700 and another server (not shown). The gateway can communicate with the other server via any means known in the art including wireless communications to the Internet (e.g., Wi-Fi, 3G, 4G, etc.). The other server can store some or all of the information gathered by the gateway. In some embodiments, the gateway can also include a local storage medium that can store some or all of the information gathered from the system server 700. In some embodiments, the emergency responder server 715 can include some or all of the features disclosed with reference to the recording device 1100 shown in FIGS. 11 and 12 and further discussed below. In some embodiments, the gateway can send gathered information to a server that can publish the gathered information. In an example, the gathered information can be published on the Internet, for example as a webpage. The webpage can be accessed by users, insurance companies, emergency personnel, etc. The webpage can be a secure webpage that can be accessed only by authorized personnel.

In some embodiments, the emergency responder server 715 can be configured to provide information to emergency responders (e.g., firemen, first aid responders, etc.) or insurance companies. Insurance companies can receive the information as a first notice of loss. Emergency responders can receive the information prior to leaving their base of operations (e.g., a firehouse) or while en route to the building. In some embodiments, the emergency responder server 715 can be configured to push information to emergency responder device 725 (e.g., a smartphone, a tablet, a laptop computer, etc.). In other embodiments, the emergency responder server 715 can provide the relevant information in response to a request from the emergency responder device 725. For example, the emergency responder device 725 can be used to log into a webpage hosted by the emergency responder server 715.

In an illustrative embodiment, the system server 700 and/or sensory nodes 705 can communicate with the user device 710 during setup, installation, and/or testing of the system (e.g., as a do-it-yourself system), and also to provide warning and watch alerts as described above. The user device can be a laptop computer, cellular telephone, smart phone, desktop computer, or any other computing device known to those of skill in the art. In one embodiment, the user device 710 can be used to access a user interface such that a user can access the system. The user interface can allow the user to set system preferences, provide occupancy information, provide vehicle information, upload pictures of the structure, provide construction information regarding the structure, provide lot information, provide information regarding the density of the surrounding neighborhood, etc. The user interface can also be used by the user to select and configure a service plan associated with the system and pay bills for the service plan.

In an illustrative embodiment, sensory nodes 705 can have an identification code associated with each sensory nodes 705. The identification code can be located on the sensory nodes 705, for example on an exterior housing or inside the housing. Alternatively, the identification code can be located on materials provided with the sensory nodes 705, for example on a packaging or box of the sensory nodes 705, on a card provided inside the packaging, or on a user manual. The identification code can identify the various sensory nodes 705 and be used to distinguish them from each other. Thus, during installation and/or setup of each sensory node 705, information can be provided to system server 700 to further identify each sensory node 705. The additional information can include location information such as geographical coordinates or room location (e.g. master bedroom), sensory node model/type information, last test date, etc. For example, a first sensory node can be a smoke detector with an identification code X. If the first sensory node detects smoke, the first sensory node can notify the system server 700 of the detected smoke. The notification can include the identification code X. The system server 700 can use the identification code X to provide detailed information to emergency personnel. For example, emergency personnel can be notified that smoke has been detected in the master bedroom and that the first sensory node has alarmed three times in the last month, which were all false alarms.

In some embodiments, sensory node 705 can include a near field communication (NFC) label. In some embodiments, the NFC label can be an active label. In other embodiments, the NFC label can be a passive label. The NFC label can be used to communicate identification information, such as an identification code, a model number, a serial number, a type of sensor, a date of manufacture, etc. A device, such as user device 710, can be used to communicate with the NFC label and receive the information stored in the NFC label. The user device 710, for instance, can transmit such information to system server 700. System server 700 can, for example, receive such information during set-up of the system. The user device 710 can further communicate with the sensory node 705 to transmit to the sensory node 705 location information (e.g., GPS coordinates, a room name), an installation time and/or date, communication network information (e.g., a network address, wireless network identification information, network access code), etc. The NFC label can further be used to locate the sensory node. For example, if a building has been destroyed, a device capable of detecting the NFC label can be used to search the rubble of the building to identify the sensory node 705 and the location of the sensory node 705 in the rubble. The device could then identify the identification code, the location information of where it had been installed, the manufacture date, the installation date, etc.

In another illustrative embodiment, identification codes can be used with the sensory nodes 705 to indicate which user the sensory nodes 705 are associated with. For example, sensory nodes 705 can communicate to user device 710 and system server 700 via, at least in part, a wireless communication. In such an example, sensory nodes 705 in Building A can be in communication range of sensory nodes 705, user device 710, or system server 700 of Building B. When Building A's sensory nodes 705 notify Building A's system of, for example, an evacuation event, identification codes can be used to identify sensory nodes 705 as part of Building A's system. Thus, Building B's system can ignore data transmitted from sensory nodes 705 associated with Building A. In alternative embodiments, data received by Building B's system regarding Building A's system can be forwarded by Building B's system to Building A's system. In other embodiments, data received by Building B's system regarding Building A's system can be forwarded by Building B's system to Building A's system only if the data received is identified as being important, urgent, etc.

The user interface accessible through the user device 710 can allow the user to record personalized evacuation route messages and/or personalized messages for dealing with mass notifications received by the system, and designate which sensory node(s) are used to convey the personalized messages. The user can also select how alerts/notifications are provided to the user, such as phone calls, text messages, e-mails, etc. The user can individually control the volume of each node through the user interface. The user can indicate the name of the room where each sensory node is located such that the room name is associated with the node (e.g., kitchen, living room, master bedroom, garage, etc.). The user can also temporarily decrease node sensitivity based on planned family events such as parties, seasonal canning (which results in high heat), card games in which guests are smoking, etc. In one embodiment, the user can use the user interface to designate the sensitivity level for each of the detectors included in each of the sensory nodes. In another embodiment, the user can also set threshold levels for heat, smoke, and/or carbon monoxide to dictate what constitutes an evacuation condition and/or a watch (or early warning) condition as discussed above.

In some embodiments, the user device 710 can allow a user to make personalized notifications. For example, user device 710 can receive text input from a user, audio (e.g., voice) input from a user, and/or video input from a user. The user device 710 can communicate with the system server 700 to allow the input from the user via the user device 710 to alert occupants if an evacuation event is detected. For example, user device 710 can be configured to receive an audio signal of a voice saying, "The kitchen is on fire, please exit through the front door." Such audio information can be received by the system server 700 and stored. If there is a suspected fire in the kitchen, an occupant in the master bedroom can be alerted to the fire via a playback of the audio input, i.e., "The kitchen is on fire, please exit through the front door."

In some embodiments, sensory nodes 705 can include weather monitors. Such weather monitors can include a device that measures an amount of precipitation, a type of precipitation (e.g., rain, snow, sleet, hail), a wind speed, a wind direction, etc. Such information can be sent from the sensory nodes 705 to the user device 710 and/or the system server 700. At least one of the user device 710, the system server 700, or the sensory node 705 can determine that the weather has become severe and alert users and/or occupants of the situation. In some embodiments, user device 710 can receive radio signals from broadcast radio stations. In such embodiments, the user device 710 can receive weather notifications from such radio signals. The user device 710 can then rebroadcast the notifications. In some embodiments, such rebroadcast can include playing an audio signal from a speaker of the user device 710. In other embodiments, the rebroadcast can include a textual notification.

In some embodiments, the user device 710 can inform the user of an evacuation event. For example, a first user device 710 can receive text input from a user, audio (e.g., voice) input from a user, and/or video input from a user. The first user device 710 can receive information regarding a second user device 710 to alert if there is an evacuation event detected. In some embodiments, all user devices 710 that can communicate with system server 700 or sensory nodes 705 can be configured to alert users of an evacuation event. For example, a first user device 710 can receive an audio input of a voice saying, "Bobby, get up. Please exit the house through the garage door." Such audio, which can be a prerecorded message from a parent or relative, can be stored in the system server 700. In some embodiments, such audio can be stored at a second user device 710. The second user device 710 can be, for example, a smartphone assigned to Bobby. If there is an evacuation event, the second user device 710 can play back the recorded audio to alert users of an evacuation event. The alert by the user device 710 can be customized to indicate an evacuation route, a type of emergency, a style of alert (for example, a first alert style can be recorded for a time when a user is probably sleeping, and a second alert style can be recorded for a time when the user is probably awake), or any other optional variation on how an alert should be indicated, or what should be indicated. In some embodiments, the type of alert style can depend on the location of the second user device 710. For example, a first alert can be given if the user device 710 is in a bedroom (indicating that the user may be asleep) and a second alert can be given if the user device 710 is in the kitchen (indicating that the user may be awake).

In some embodiments, the user device 710 can alert the user to an evacuation condition only if the user device 710 is within an area affected by an evacuation condition. An affected area can be determined based on the location of the evacuation condition and the type of evacuation condition. In some embodiments, the affected area can be particular rooms of a building or particular buildings. In other embodiments, the affected area can be determined to be a distance away from the evacuation condition (e.g., a particular radius from a fire or hazardous fumes). User devices 710 to be alerted to the evacuation condition can be determined based on the location of the user device 710 in relation to the affected area. In one embodiment, user devices 710 within the affected area are alerted to the evacuation condition. In another embodiment, user devices 710 that are within a threshold distance from the affected area (e.g., 1000 feet) are alerted to the evacuation condition. For example, a smoke detector can detect smoke from the oven of a kitchen in a house and users in the kitchen and the surrounding rooms can be alerted. In another example, a kitchen fire in a house can be detected and users in the house can be alerted. In yet another example, a kitchen fire in a house can be detected and users in the house and users in surrounding houses can be alerted.

In one example, a user can live in a primary house that has a system in accordance with the present disclosure. The user, however, can stay a night at a different house, for example, at a sleep-over. In such an embodiment, if there is an evacuation condition (or other condition that provides an alert, e.g., a smoke detector) at the primary house and the user device 710 is located at the different house, the user device 710 of the user will not alert the user to the evacuation condition in the primary house. In another example, a university campus can be configured to use a system in accordance with the present disclosure. In such an example, if there is an evacuation condition in Dorm A, only user devices 710 within Dorm A are alerted to the evacuation condition, and user devices 710 that are not within Dorm A (e.g., other dorms, classrooms, etc.) do not alert the user. In the example, user devices 710 that are near Dorm A (e.g., on a sidewalk in front of Dorm A) are alerted. In another, similar example, if there is an evacuation condition in Dorm A that affects other buildings (e.g., a fire or an explosion), user devices 710 in all affected buildings can receive an alert.

In one embodiment, user devices 710 can receive information related to the evacuation condition, and each user device 710 can determine whether the user should be alerted. In another embodiment, user devices 710 can periodically (or constantly) send location information to system server 700 or sensory nodes 705. In such an embodiment, the system can determine which user devices 710 should receive the alert. In yet another embodiment, system 700 can send an alert via a portion of sensory nodes 705. The portion of sensory nodes 705 can be determined to be within an area affected by an evacuation condition. The portion of sensory nodes 705 can send out an alert to user devices 710 that are within communication range of the sensory nodes 705. Location of the user device 710 can be determined using any method described herein, e.g., GPS, Wi-Fi, etc.

In some embodiments, the user device 710 can alert the user to an evacuation condition. In such embodiments, the user device 710 can use a user display, a light (e.g., the flash light of a camera on a mobile device), audio, vibration, or any other technique known in the art. In some embodiments, the user device 710 can have an application that can receive information from system server 700 or the sensory nodes 705 that indicates that an evacuation condition has been detected. The application can configure the user device 710 to alert the user. For example, the application can set (i.e., override) a volume level to the maximum level. In such an example, the application can have the authority to override user settings to set the volume level to the maximum level. The application can also set other settings, such as a screen brightness, a light brightness, a vibration intenseness, etc. In some embodiments, the application can override operating system alerts and/or notifications. For example, if a brightness level of a screen is set to 50% because of an indication of a low battery, the application can ignore the indication of a low battery and set the screen brightness to 100%. In another example, the application can ignore other events that would normally alert the user. For example, if the user device 710 received an indication that there was a fire, the user device 710 can alert the user of the fire, and not notify the user of new emails, text messages, etc.

In another example, the application can turn features of the user device 710 on and off. In some instances, the application can turn off features to conserve the battery of the user device 710. In other instances, the user device 710 can turn on features that better enable the user device 710 to gather information. For example, the application can turn on a Wi-Fi capability of the user device 710. A Wi-Fi capability can include a wireless capability consistent with the Institute of Electrical and Electronics Engineers's (IEEE) 802.11 standards. Turning on the Wi-Fi can be to receive more information regarding an evacuation condition or an evacuation route. Turning on the Wi-Fi can also be to enable better location determination. For example, in some instances, a location of the user device 710 can be improved by using Wi-Fi rather than traditional methods of locating the user device 710 (e.g., GPS, cellular telephone tower triangulation, etc.). In some embodiments, the application can be configured to turn on a 3G service, a 4G service, an SMS service, etc. In other embodiments, the application can be configured to automatically receive information from an available source (3G, 4G, Wi-Fi, the best Wi-Fi connection, etc.)

In some embodiments, the application can turn on or off features of the user device 710 to monitor the user, the user's surroundings, etc. Such features can include enabling or disabling a microphone, a camera, a light, etc. For example, if one or more sensory nodes 705 detect a high level of carbon monoxide, a notification of the condition can be sent to the user device 710. The user device 710 can activate a camera of the user device 710 and send pictures to, for example, system server 700. Such pictures can comprise a video, for example a live-streaming video. The user device can also activate a microphone and transmit recorded sounds to, for example, the system server 700. In some embodiments, such video and/or audio can be sent to another user device 710 (for example, the smartphone of a parent of the user of the user device 710) and/or emergency responder device 725.

In an embodiment, the user device 710 can be configured to enable system 700, sensory nodes 705, or other devices (such as emergency responder devices) to determine a location of the user device 710. For example, user device 710 can send out a beacon signal that can be detected by system 700, sensory nodes 705, or other devices to determine a location of the user device 710. User device 710 can also be a passive communication device, using technologies such as near field communication (NFC). Such devices can include a smart phone, a smart watch, or implantable chips. In one embodiment, a device of an emergency responder can scan a location (or otherwise detect passive communications) to determine if a user device 710 is within the location. For example, an emergency responder device can detect that a smart phone is within a bedroom. The information can then be used to determine that a user of the smartphone is within the bedroom. In another embodiment, the user device 710 can be an implantable chip within a human. A device of the emergency responder can detect the user device 710 and can identify a user of the user device 710 via the information conveyed by the user device 710 through the NFC. In yet other embodiments, user device 710 can be configured to detect information of other user devices 710. For example, a user following an evacuation route with a first user device 710 can pass a person with a second user device 710 and detect a location of the second user device 710. The first user device 710 can then transmit the location of the second user device 710 to system server 700, sensory nodes 705, or emergency responders.

In an illustrative embodiment, the user interface can include an application running on user device 710, which can be a smart phone. Such an application can include an interface for a user to include information about the system in general, or about particular aspects of the system. For example, the application can provide a user interface to allow a user to enter information regarding a floor plan of the building, a map or layout of the neighborhood, building information such as materials of construction, an elevation drawing, window location, etc. In another example, the application can provide a user interface to allow a user to enter information regarding particular sensory nodes 705. Such information can include location of the sensory node with respect to the building, location of the sensory node with respect to a particular room, a picture of the room and/or sensory node, etc.

In some embodiments, the user interface accessible through the user device 710 can indicate an evacuation route to a user. The evacuation route can be based on the location of the user device 710. The evacuation route can also be based on the type or location of the evacuation event. The evacuation route can be determined by the system server 700, one or more sensory nodes 705, or one or more user devices 710. For example, the user device 710 can receive a map of a building that the user device 710 is in. In some embodiments, the user device 710 can receive the building information as soon as the user device is in communication with system server 700 or sensory nodes 705. In some embodiments, the user can selectively receive the building information. In such embodiments, the user can, for example, request building information from the system 700 or sensory nodes 705. In other embodiments, the system 700 or the sensory nodes 705 can query the user device 710 (or the user) to determine if the user device will receive the building information. In yet other embodiments, building information can be received by the user device 710 automatically. In some embodiments, the user device 710 will receive building information only if there is an evacuation event detected. The user device 710 can be configured to receive information via Wi-Fi, 3G, 4G, SMS, etc.

In some embodiments, the user device 710 can receive information regarding the evacuation condition and information relevant to determining an evacuation route. Such information can include location of other occupants, a type of evacuation condition (e.g., fire, flood, smoke, etc.), location of exits, blocked pathways, location of user device 710, etc. The user device 710 can then use the information regarding the evacuation condition to determine an evacuation route. The user device 710 can also determine the evacuation route based on information from the user device 710. For example, the user device 710 can recognize that the user of the user device 710 is handicapped and cannot climb down stairs. In such an example, the user device 710 can determine an evacuation route that is wheelchair accessible but still allows the user to travel to safety.

In some embodiments, the user device 710 can modify the evacuation route based on information received or determined after an initial evacuation route has been determined. For example, an initial evacuation route can indicate that a user should walk down a hallway. The user device 710 can track the movement of the user device 710 (and, therefore, the user) indicating that the user device 710 is moving down the hallway. The user device 710 can also determine that the user device 710 has begun to move in a direction opposite to the path indicated by the evacuation route. This could be because the evacuation condition has made the hallway an unsafe route, and the user recognized such and began to retreat. In such an instance, the user device 710 (or system server 700) can determine a new evacuation route that avoids the hallway that was previously used in the evacuation route. In another example, the user device 710 can initially receive information indicating that exiting via the west wing of a building is safe and efficient. The user device 710 can then receive information indicating that the west wing is no longer a safe route because, for example, a fire has spread to the west wing. In such a case, the user device 710 (or system server 700) can determine a new evacuation route that avoids the west wing.

In an illustrative embodiment, the user device 710 can be configured to display an evacuation route to a user using turn by turn instructions. In such an embodiment, the user device 710 can have building information including a floor plan stored thereon. The user device 710 can then receive or determine an evacuation route that navigates through the floor plan. The user device 710 can monitor the location of the user device 710, and give turn-by-turn instructions based on the evacuation route, the floor plan, and the current location of the user device 710. The turn-by-turn instructions can be delivered via any method known in the art including audio (e.g., voice) and graphical.

In another illustrative embodiment, the application can be used during installation of the system, thereby allowing a do-it-yourself setup of the system. As discussed above, sensory nodes 705 can be associated with an identification code. The application can be used to read or identify the identification code. The identification code can be identified by reading a bar code, a quick response code (QR code), near field communication (NFC), radio frequency identification (RFID), etc. When the sensory node 705 is placed in commission, the application can identify the sensory node 705 by the identification code and communicate that information to the system server 700. The application can be used to gather and communicate other information such as a location, a picture, etc. For example, if sensory node 705 is a smoke detector on the ceiling of a bathroom, user device 710 can be placed near the sensory node 705 to read the identification code. Once user device 710 reads the identification code, the user device can also capture location information, such as coordinates or room information. Thus, user device 710 can communicate to system server 700 that sensory node 705 with identification code X is located in the bathroom at coordinates Y at an elevation of Z. The application can identify settings of sensory node 705 and communicate that information to system server 700. In one embodiment, settings information can be captured by user device 710 via wireless communication. In another embodiment, settings information can include dip switch settings, electrical jumper locations, or other physical settings. In such an embodiment, user device 710 can be used to capture an image of the physical settings, and send the image to system server 700. Thus, if sensory node 705 needs to be replaced, system server 700 can provide information on how the new sensory node 705 should be configured. Thus, user device 710 can allow a user to setup multiple sensory nodes 705 with a single user device 710, which can be a smartphone, thereby allowing a do-it-yourself system for the user.

The user can also access system integrity and status information through the user interface. The system integrity and status information can include present battery levels, historic battery levels, estimated battery life, estimated sensor life for any of the sensors in any of the sensory nodes, current and historic AC power levels, current and historic communication signal strengths for the sensory nodes, current and historic sensitivity levels of the sensory nodes, the date of system installation, the dates when any system maintenance has been performed and/or the type of maintenance performed, etc. The system information accessible through the user interface can further include current and historic levels of smoke, heat, carbon monoxide, ambient light, occupancy, etc. detected by each of the sensory nodes.

The system can also provide the user with weekly, monthly, yearly, etc. diagnostic reports regarding system status. The reports may also be provided to emergency response departments such as a fire department and an insurance provider that insure the user's home. The system can also send reminders to the user to perform periodic tests and/or simulations to help ensure that the system is functional and that the user stays familiar with how the system operates. In one embodiment, users may receive an insurance discount from their insurance provider only if they run the periodic tests and/or simulations of the system. The system can also send periodic requests asking the user to provide any changes to the information provided during installation. Examples of information that may change can include an addition to the structure, additional occupants living at the structure, a new pet, the death of a pet, fewer occupants living at the structure, a change in construction materials of the structure such as a new type of roof, new flooring, etc.

In an illustrative embodiment, the user can develop and run emergency test scenarios through the user interface to test the system and help ensure that the user understands how the system operates. As an example, the user may simulate an evacuation condition of a fire. As such, the system can provide evacuation routes, play pre-recorded messages, sound an alarm, send a warning alert to the user, etc. such that the user and others in the structure can perform a fire drill. In addition to practicing the fire drill, the user can verify that room locations associated with the sensors are accurate, the desired volume levels of the sensors are being used, that pre-recorded evacuation messages are correct, etc. As discussed above, in the event of an evacuation condition or mass notification message, the system can also be configured take different actions based on the time of day that the evacuation condition is detected or that the mass notification is received. The user can also simulate an evacuation condition for a specific time of day to ensure that the system operates as designated by the user for that specific time. The user can also simulate the system with respect to mass notifications that may be received and conveyed by the system such as weather alerts, school closings, etc.

In an illustrative embodiment, evacuation simulations can be controlled by the system server 700. Alternatively, a separate emergency simulator server may be used. In one embodiment, the simulation of an evacuation condition may be performed in conjunction with the emergency responder server 715 and/or the emergency call center 720 to ensure that the system properly provides the authorities with a notification of the evacuation condition. In such an embodiment, the notification provided to the emergency responder server 715 and/or the emergency call center 720 can be designated as a 'test' notification or similar to ensure that the emergency responders know that there is not an actual evacuation condition.

Although not illustrated in FIG. 7, it is to be understood that the communications may occur through a direct link or a network such as the Internet, cellular network, local area network (LAN), etc. Sensory nodes 705 can communicate with user device 710 via a low energy or ultra-low energy wireless communication, such as Bluetooth Low Energy (BLE). In some embodiments, sensory nodes 705 can communicate directly with user device 710, thereby eliminating the need for a third-party call center. In some embodiments, the user device 710 does not have to be in constant communication range of sensory nodes 705. Sensory nodes 705 can internally store data acquired while user device 710 is not within communication range. Sensory nodes 705 can be configured to store data gathered over a period of, for example, a minute, an hour, a day, two days, a week, a month, etc. Once user device 710 is within communication range, sensory nodes 705 can communicate the data to user device 710. In some embodiments, sensory nodes 705 can communicate with a storage device (not shown in FIG. 7) that is constantly in communication range of sensory nodes 705. Thus, sensory nodes 705 can store data in the storage device when the user device 710 is not within communication range. In some embodiments, sensory nodes 705 communicate exclusively with the storage device. The storage device can communicate the data to user device 710 when the user device 710 is within communication range of the storage device. In such an embodiment, the storage device and/or system server 700 may not be directly connected to a network for remote communication. The data that is provided to user device 710 can include any data acquired by sensory nodes 705, energy usage data within the building, and/or data from sensors placed in the building such as rain sensors, wind sensors, flood sensors, hail sensors, etc.

User device 710 can communicate with system server 700 via any wireless communication protocol known to those skilled in the art. For example, user device 710 can communicate with system server 700 using BLE, wireless LAN, or a cellular network. User device 710 can communicate data received from sensory nodes 705 to system server 700. In some embodiments, the sensory nodes 705 can continuously monitor to determine whether user device 710 is within communication range. In other embodiments, the sensory nodes 705 can periodically check to determine whether user device 710 is within communication range. For example, the sensory nodes 705 can check for a nearby user device 710 every second, every five seconds, every minute, every hour, etc. For example, sensory nodes 705 can be located in a house of a user. User device 710 can be a smart phone. Thus, when the user goes to work for the day and brings user device 710 along, user device 710 is out of communication range of sensory nodes 705. All data acquired by sensory nodes 705 while the user is at work is stored by the sensory nodes 705. When the user returns to the house from work, with user device 710, sensory nodes 705 can communicate the data to the user device 710 which can, in turn, communicate the data to system server 700 and/or any other external system such as emergency responder server 715.

Figure 8:
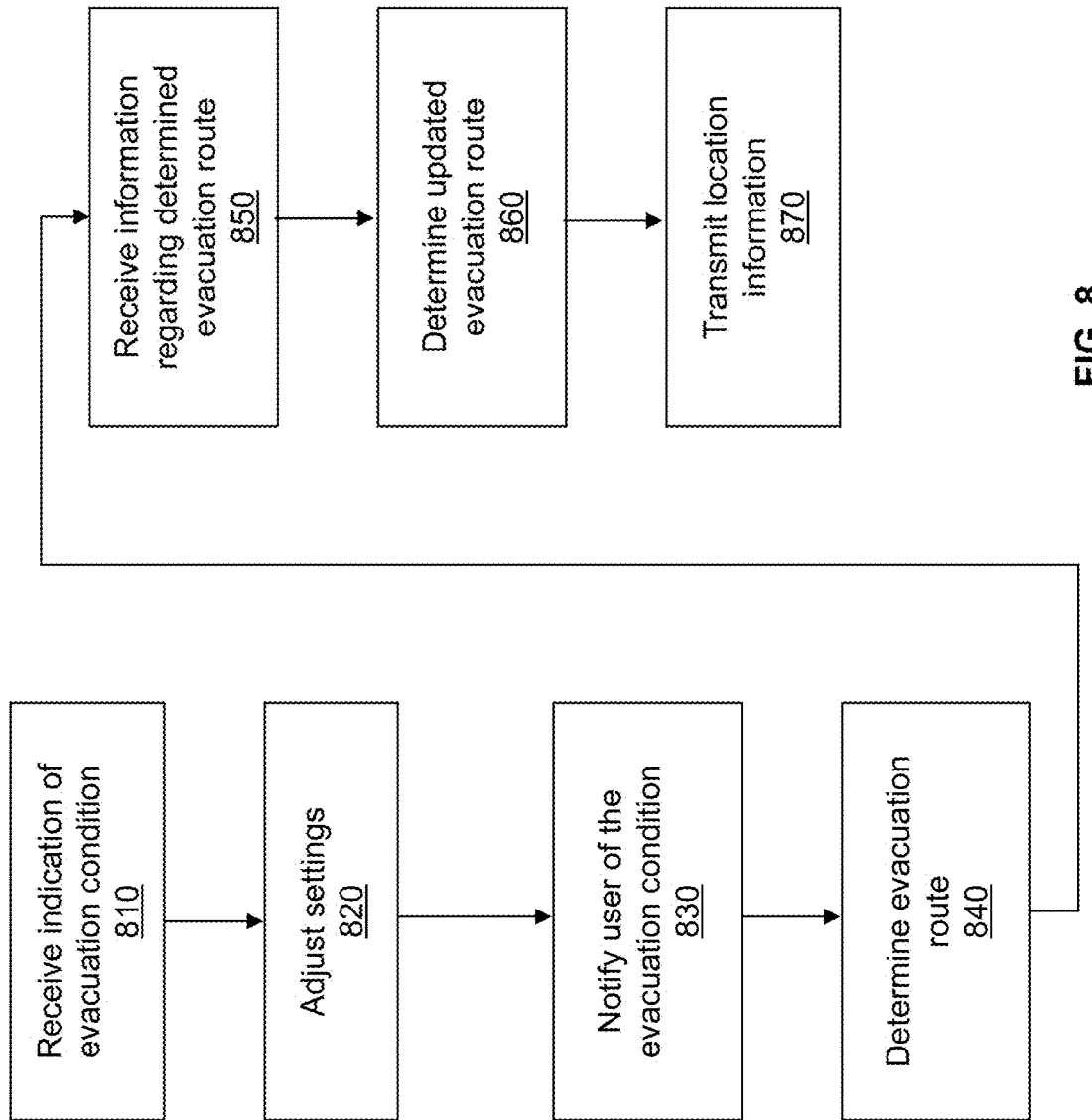
FIG. 8 is a flow diagram illustrating operations performed by a user device in accordance with an illustrative embodiment.

FIG. 8 is a flow diagram illustrating operations performed by a user device 710 in accordance with an illustrative embodiment. In alternative embodiments, additional, fewer, and/or different operations may be performed. Further, the use of a flow diagram is not meant to be limiting with respect to the order of operations performed. Any of the operations described with reference to FIG. 8 can be performed by one or more sensory nodes, by one or more decision nodes, and/or by a system server. In an operation 810, an indication of an evacuation condition is received. The indication of the evacuation condition can be from the system server 700 or by one or more sensory nodes 705. In some embodiments, the indication of the evacuation condition can be received from a system for managing various aspects of a building. For example, hotels, stadiums, and office buildings (and various other types of buildings) can have a building management system or a fire alarm control panel (FACP). The various systems described in the present disclosure can be configured to access and/or share information with the systems already installed and configured in the building. For example, a building management system, building automated system, or FACP can include a panel on a wall or a control center configured to allow a user to access and control various aspects of a building. Such aspects can include security cameras or video (including closed-circuit television (CCTV)), water management, smoke detectors, fire alarms, heating, ventilation, and air conditioner (HVAC) systems, mechanical systems, electrical systems, illumination systems, elevators, announcement systems, and plumbing systems. In some embodiments, the building management system can send an indication of the evacuation condition to the system server 700 or a sensory node 705, and the system server 700 or the sensory node 705 can process the indication of the evacuation condition as described in the present disclosure.

In some embodiments, the building management system, FACP, etc. can send an indication of the evacuation condition to the user device 710, thereby getting rid of the need of a call center. The user device 710 can have an application or other software installed on the user device 710 to process the indication of the evacuation condition accordingly. For example, the user device 710 can notify the user, prompt the user if emergency personnel should be contacted, and/or provide instructions on how to evacuate the building. In an embodiment that has a user device 710 notifies the user of the evacuation condition, in an operation 820, user device 710's settings can be adjusted. For example, a volume level of the user device can be increased. In an operation 830, the user device 710 can notify the user of the evacuation condition. The notification can include a prompt for the user to allow the user device 710 to contact emergency personnel (e.g., via 911). In an operation 840, the user device 710 can determine an evacuation route. The user device 710 can receive information (e.g., a floor plan) including information indicating navigable pathways. The user device 710 can evaluate various possible navigable pathways and determine the best route to escape from the building. In some embodiments, the information received can include pathways that are determined to not be navigable. For example, a hallway can be determined to be not navigable because it is flooded. In some embodiments, the user device 710 can receive the evacuation route from another system. The user device 710 can display the evacuation route to the user (e.g., via turn-by-turn instructions, a map, etc.). Such a system can allow the user device 710 to operate in place of a third-party call center, thereby eliminating the need for such a call center.

In an operation 850, the user device 710 can receive information regarding the determined evacuation route. Such information can include information that indicates that the determined evacuation route is no longer recommended. For example, the user device 710 can track the user device 710's location along the determined evacuation route. The user device 710 can detect sounds indicating that the user device 710 is headed for an unsafe environment (e.g., the roar of a fire is getting louder as the user device heads along the determined evacuation condition and toward the fire). In another example, the user device 710 can determine that the user is not following the determined evacuation route. In some embodiments, the user device 710 can receive information from a building management system, system server 700, and/or sensory nodes 705 that indicates that a portion of the building is not navigable. In an operation 860, the user device 710 can determine an updated evacuation route based at least in part on the information received regarding the determined evacuation route. The updated evacuation route can be a route that avoids a portion of the building determined to not be navigable. The user device 710 can display to the user the updated evacuation route.

In an operation 870, the user device 710 can transmit location information. In some embodiments, the user device 710 can transmit a beacon allowing another system (including other user devices) to determine the location of the user device. For example, an emergency personnel device 725 can be used to scan a given location for the user device 710. In some embodiments, the user device 710 can send information indicating the location of the user device to the system server 700, the sensory nodes 705, and/or emergency personnel via Wi-Fi, 3G, 4G, etc.

Figure 9:
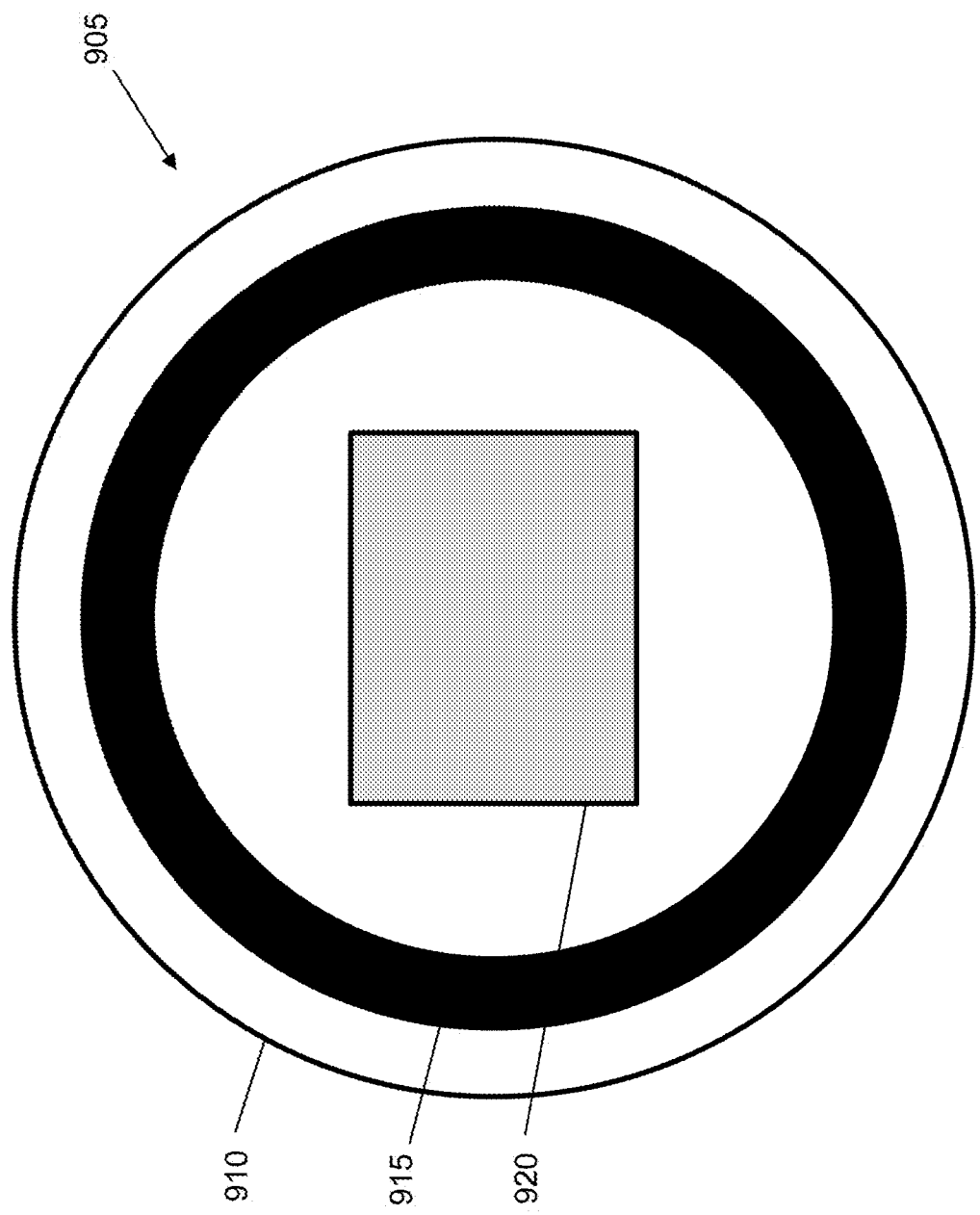
FIG. 9 is a diagram illustrating a sensory node with a heat protective ring in accordance with an illustrative embodiment.

FIG. 9 is a diagram illustrating a sensory node 905 with a heat protective ring 915 in accordance with an illustrative embodiment. The sensory node 905 can comprise a housing 910 and electronic circuitry 920. The protective ring 915 can be configured to release a substance that can protect the electronic circuitry 920 from heat. In one example, sensory node 905 can be located in a house that is on fire. When the fire increases the temperature of the sensory node 905, the protective ring 915 can release a substance that can absorb the heat from the fire, thereby decreasing the rate at which the temperature of the electronic circuitry 920 is increased. That is, the heat from the fire will increase the temperature of the substance released by the protective ring 915 instead of increasing the temperature of the electronic circuitry 920. Thus, the protective ring 915 can, in some instances, protect the electronic circuitry 920 from being damaged. In other instances, the protective ring 915 can delay the harmful effects of the heat, thereby prolonging the life of the electronic circuitry 920 in the case of extreme heat. One of skill in the art will recognize that the protective ring 915 can be used to protect various components from heat and the protective ring 915 is not limited to protecting electronic circuitry 920. One of skill in the art will also recognize that the protective ring 915 can be used in multiple locations for multiple devices and is not limited to use in a sensory node.

The substance released by the protective ring 915 can be any substance that is chemically compatible with the materials of the sensory node 905 and can absorb heat. For example, the substance can be water. In another example, the substance can be water with an additive. The additive can be an anti-freeze. The water and anti-freeze mixture can have a lower freezing point than pure water. In another example, the additive can increase the boiling point of the water. In another example, the substance can be a solid at room temperature and melt and/or evaporate at a higher temperature. For instance, the substance can melt and/or evaporate at a temperature at or slightly lower than a temperature that degrades the performance of the electronic circuitry 920. In some embodiments, while the heat absorbing substance is contained within the protective ring 915, the substance is pressurized to a pressure above atmospheric pressure.

In one embodiment, the protective ring 915 can comprise a hollow ring filled with fluid. In one example, the hollow ring can be comprised of a plastic that melts at a release temperature. The release temperature can correspond to a temperature that degrades the performance of the electronic circuitry 920. In some instances, the release temperature can be between room temperature (e.g., 75° F.) and the temperature that degrades the performance of the electronic circuitry. The hollow ring can be filed with a fluid as described above. As the temperature of the sensory node 905 and, therefore, the temperature of the hollow ring increases, the hollow ring can melt, thereby releasing the substance into the housing 910. As the temperature continues to increase, the substance can absorb the heat and gasify.

In another example, the hollow ring can be comprised of a material with a high melting point such as a metal (e.g., steel, stainless steel, copper, etc.) with orifices configured to slowly release the substance at a release temperature. In one example, the orifices can be holes formed in the hollow ring. The holes can be filled with a material (e.g., a plastic) that melts at the release temperature. When the sensory node 905 and, therefore, the protective ring 915 increases in temperature to the release temperature, the plastic that fills the holes can melt, and the substance within the hollow ring can be released into the housing 910. The orifices can be configured to release the substance gradually and in a controlled manner. In some embodiments, the holes in the hollow ring can be filled with different materials with different melting points. The materials used in various holes can be selected according to the proximity of the holes to electrical components that should be protected. For example, some electrical components on the electronic circuitry 920 can be more susceptible to heat than other components. The holes of the protective ring 915 that are closest to the more susceptible components can be filled with a material that melts and, therefore, releases the substance that absorbs heat at a lower temperature than material of holes in the protective ring 915 that are close to components of the electronic circuitry 920 that are more heat-tolerant.

In some embodiments, the sensory node 905 can comprise a monitoring system that can manage the release of the heat absorbing substance. In such an embodiment, the protective ring 915 can comprise mechanical release mechanisms that can release the heat absorbing substance when the monitoring system determines that the heat absorbing substance should be released (e.g., when the electronic circuitry 920 is at a release temperature). In some embodiments, the monitoring system can have one or more temperature sensors and can monitor the temperature of one or more portions of the electronic circuitry 920. In the embodiment with multiple temperature sensors, the monitoring system can determine that a portion of the electronic circuitry 920 requires protection from heat, and can send a signal to the portion of the protective ring 915 that is closest to the portion of the electronic circuitry 920 requiring heat protection to release the heat absorbing substance. The portion of the protective ring 915 closest to the electronic circuitry 920 requiring heat protection can release the heat absorbing substance in response to the signal from the monitoring system.

In some embodiments, the protective ring 915 has an annular shape. In other embodiments, the protective ring 915 is elliptical, rectangular, arbitrary, or any shape. In some embodiments, the protective ring 915 has a uniform thickness. In other embodiments, the protective ring 915 has a thickness that varies along the length of the protective ring 915. For instance, a portion of the protective ring 915 that is closest to components of the electronic circuitry 920 that is most susceptible to heat can be thicker, thereby containing (and releasing) more of the heat absorbing substance than other portions of the protective ring 915.

Electronic circuitry 920 can have an insulating layer applied over the electrical components. The insulating layer can insulate the electronic circuitry from heat. The insulating layer can also protect the electronic circuitry from harmful effects of releasing the heat absorbing substance (e.g., water). In some embodiments, the insulating layer is a conformal coating applied to the electronic circuitry 920. The conformal coating can be any conformal coating known in the art to protect the electronic circuitry 920 from heat, dust, debris, and/or liquid. For example, the conformal coating can be comprised of polyurethane, acrylic, silicone, epoxy resin, parylene, etc.

Figure 10:
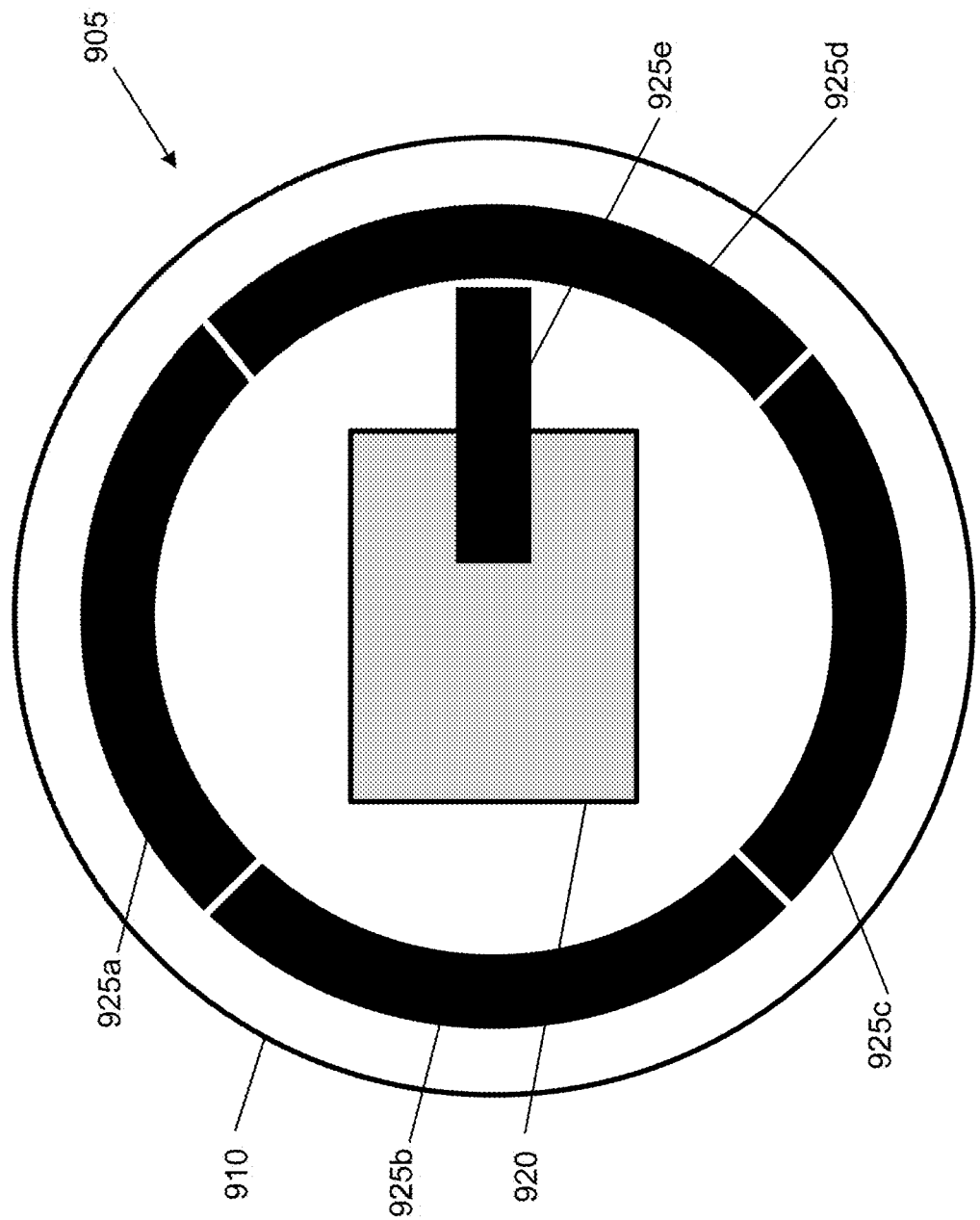
FIG. 10 is a diagram illustrating a sensory node with a segmented heat protective ring in accordance with an illustrative embodiment.

FIG. 10 is a diagram illustrating a sensory node 905 with a segmented heat protective ring 925a-925e in accordance with an illustrative embodiment. As described above with reference to FIG. 9, sensory node 905 can have a housing 910 and electronic circuitry 920. The various segments of the protective ring 925a-925e can be configured to release a heat absorbing substance independently from one another. For example, if protective ring segment 925a increases in temperature to the release temperature, protective ring segment 925a can release the heat absorbing substance regardless of whether protective ring segments 925b-925e have reached the release temperature.

In some embodiments, the release temperature of the various protective ring segments 925a-925e can be different. In other embodiments, the release temperature is the same. In yet other embodiments, some of the protective ring segments, e.g., 925a-925c, have a first release temperature and other protective ring segments, e.g., 925d and 925e, have a second release temperature.

As shown in FIG. 10, at least a portion of a protective ring segment 925e can be disposed of on the electronic circuitry 920. In some embodiments, the entire electronic circuitry 920 is covered with one or more protective ring segments 925e. In some embodiments, the protective ring segments 925a-925e do not comprise a ring shape at all and can be entirely disposed on the electronic circuitry 920. In other embodiments, one or more protective ring segments 925e can be located on portions of the electronic circuitry 920. The one or more protective ring segments 925e can be located near components of the electronic circuitry 920 that are more susceptible to heat and require the most protection from heat.

Figure 11:
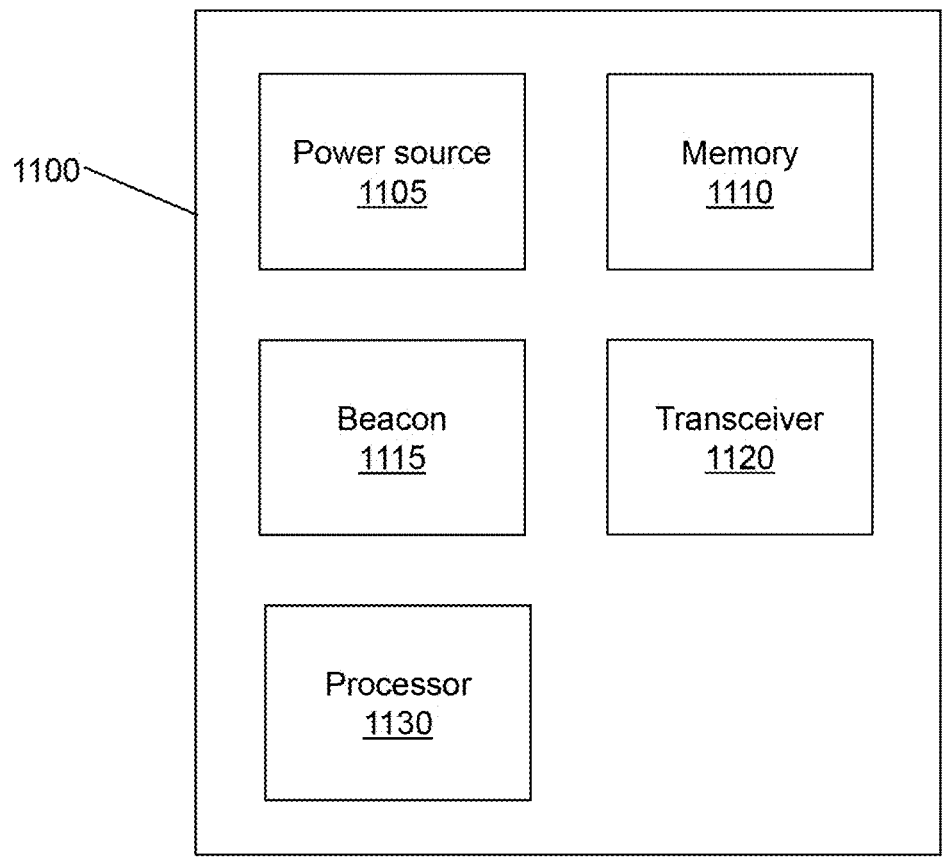
FIG. 11 is a block diagram illustrating components housed in a protective housing in accordance with an illustrative embodiment.

FIG. 11 is a block diagram illustrating components housed in a protective housing in accordance with an illustrative embodiment. In some embodiments, one or more of the components illustrated in FIG. 7 can be housed in a protective housing. The protective housing can be configured to protect the component from heat (e.g., from a fire), water (e.g., from a flood or from sprinkler water), or from physical contact (e.g., from a building collapsing on the component). Within the protective housing can be a backup power source 1105, such as a battery, that can be used to power the device if external power fails. The battery can be sufficiently large to allow the electronics housed within the protective housing to operate, for example, for 168 hours without an external power source. If power is supplied to the electronics by an external power source (e.g., 120 Volts of alternating current power), the battery can be charged using the external power source via a power converter. In such an embodiment, the component can continue to operate during an evacuation condition (e.g., fire, flood, etc.) even under extreme conditions and loss of external power.

In one embodiment, system server 700 is contained within a protective housing. FIG. 11 illustrates a recording device 1100 that can be housed in a protective housing. The recording device 1100 can comprise a power source 1105 which can include an external power source and/or an internal power source (e.g., a battery). The recording device 1100 can further include memory 1110, a beacon 1115, a transceiver 1120, and a processor 1130. The protective housing can protect the recording device 1100 from a static crush force, an impact force, a puncture force, water or other liquid immersion, extreme hot or cold temperatures, and/or corrosive environments. The recording device 1100 can be configured to record information received via transceiver 1120 from sensory nodes 705, system server 700, user device 710, and/or any other source of information relevant to the present disclosure. For example, the recording device 1100 can record sensor data from sensory nodes 705 before, during, and after an evacuation condition.

Such recorded information can be used after the evacuation condition to reconstruct the events that lead to the evacuation condition and the events during the evacuation condition. Such information can be useful for several reasons. For example, insurance companies may be interested in reconstructing the events of an evacuation condition to determine whether an event was caused as part of insurance fraud. In another example, police may be interested in the information to solve crimes related to the evacuation condition (e.g., arson, looting, etc.).

The recording device 1100 can be configured to record information received from various types of sensor nodes 705. For example, the recording device 1100 can be configured to record temperatures, occupancy, motion, carbon monoxide and/or carbon dioxide levels, smoke levels, locations, power throughout the building, still images, videos, sound, etc. with associated time stamps. The recording device 1100 can be configured to record information sent from sensor nodes 705 up to the point that the sensor nodes 705 fail. For example, a sensor node 705 that is a video capture device can send video information to the recording device 1100 that can, in turn, record the video information. The sensor node 705 can send video information to the recording components for as long as the sensor node 705 is capable. For example, the recording device 1100 can record video from the sensor node 705 until the sensor node 705 is disabled or destroyed by a burglar. In another example, the recording device 1100 can record video from the sensor node 705 until the sensor node 705 is melted and/or destroyed by a fire.

The recording device 1100 can be configured to store at least 168 hours of data from the various sensor nodes 705. The memory 1110 can be a non-volatile type memory that does not require power to maintain stored information. The memory 1110 can be configured to store data on a first-in-first-out basis. That is, the memory can store received data until the memory is full. When the memory is full, the oldest data can be overwritten with newly received data. In one embodiment, the recording device 1110 can be configured to continually record received data regardless of alarm condition. In an alternative embodiment, the recording device 1100 can be configured to store ten hours of data prior to an alarm event (e.g., flood, fire, etc.) and five hours of data received after the alarm event. The recording device 1100 can also be configured to store data regarding the sensor nodes 705. Such data can include location data of each sensor node 705, a type of sensor, a sensor identification number, etc.

The recording device 1100 can comprise a beacon 1115. The beacon 115 can be configured to transmit a signal that can be used to locate the recording device 1100. In some embodiments, the beacon 1115 can be configured to transmit an audio and/or visual signal. In other embodiments, the beacon 1115 can be configured to transmit an electromagnetic signal that can be detected by a detector device. For example, the beacon 1115 can be configured to transmit a wireless signal at 900 megaHertz (MHz) every 33 seconds. The detector device can be any device capable of detecting the beacon 1115 to locate the recording device 1100. In some embodiments, the detector device can be user device 710 or another, similar device. The electromagnetic beacon signal can be any electromagnetic signal capable of use for locating the recording device 1100. For example, the electromagnetic signal can be operable with Bluetooth, Zigbee, Bluetooth Low Energy, Wi-Fi, cellular networks, NFC, 2 Gig 345 MHz protocol, General Electric 319.5 MHz protocol, etc. technology.

The recording device 1100 can be secured such that the recording device 1100 cannot be easily removed from a building. The recording device 1100 can be securely fastened to, for example, steel beams, a concrete foundation, a water heater, a main water pipe, etc. In some embodiments, the recording device 1100 can be configured to be secured to a water pipe. The water pipe can be any size, for example, 0.5 inches, 1 inch, 1.5 inches, 2 inches, 6 inches, etc. in diameter. The housing of the recording device 1100 can include a concave side that is configured to receive the pipe. The housing of the recording device 1100 can also include a strap or other securing mechanism to secure the housing to the pipe. The housing of the recording device 1100 can be configured to be cooled by the water pipe, for example in the case of a fire. In an illustrative embodiment, the recording device can include a heat sink to transfer heat from the recording device 1100 to the water pipe. In some embodiments, the recording device 1100 can be configured to determine whether the water pipe has water flowing, and how much. Such information can be used to determine occupancy, whether a sprinkler system is activated, etc. In some embodiments, the recording device 1100 can be secured underground. The recording device 1100 can also be hidden from ready access, such as within a wall. In some embodiments, the recording device 1100 can be placed within a water tank, e.g., an aquarium. In such embodiments, the recording device 1100 can be in communication with an antenna located out of the water, thereby improving communications of the recording device 1100.

The recording device 1100 can be configured to communicate with multiple types of systems. For example, the transceiver 1120 can be configured to communicate with sensory nodes 705 individually and/or with a supervisory control and data acquisition (SCADA) system. The transceiver 1120 can be capable of communicating with devices via Bluetooth, Zigbee, Bluetooth Low Energy, Wi-Fi, cellular networks, NFC, 2 Gig 345 MHz protocol, General Electric 319.5 MHz protocol, etc. technology.

Figure 12:
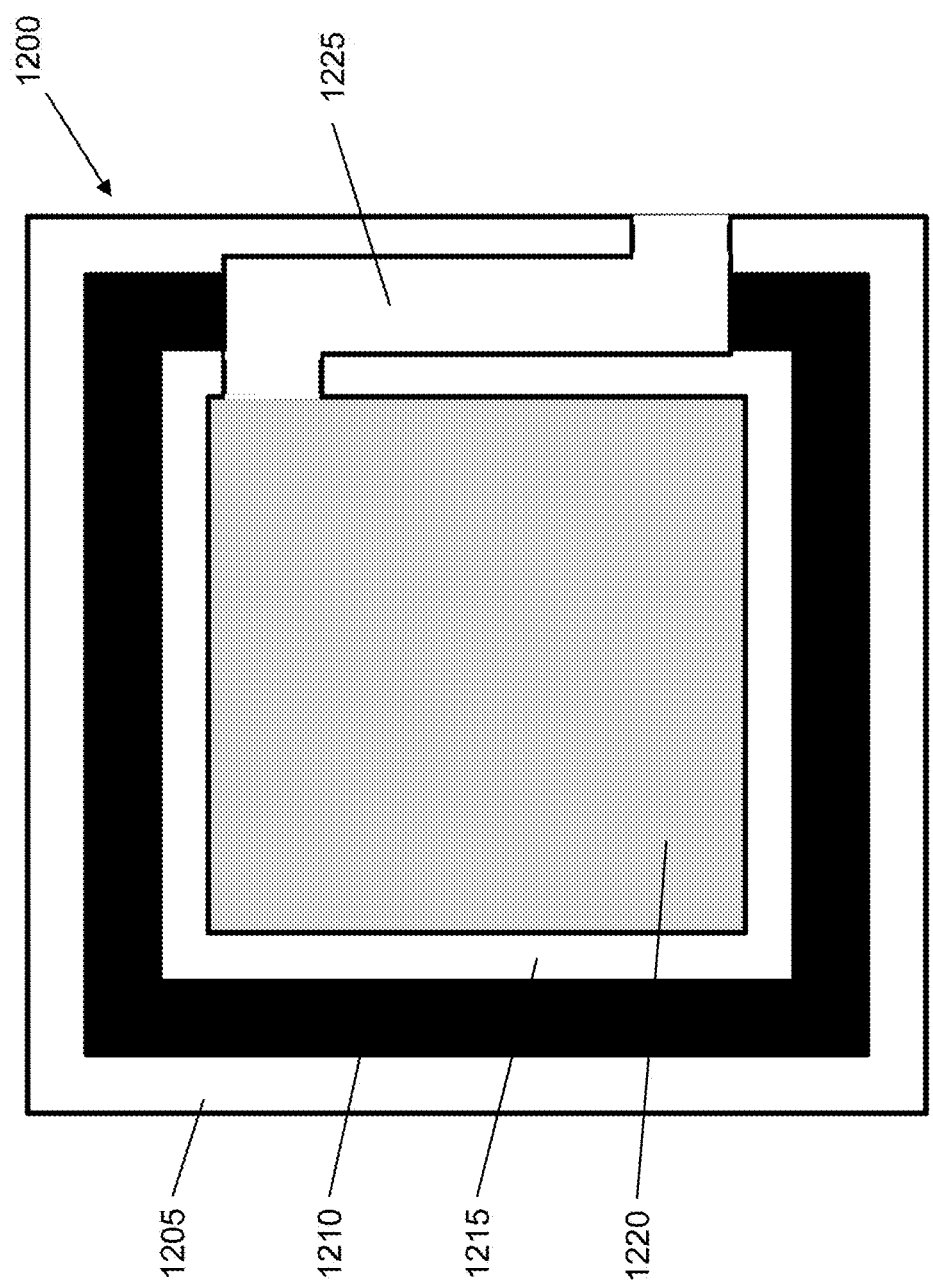
FIG. 12 is a diagram illustrating layers of a protective housing in accordance with an illustrative embodiment.

FIG. 12 is a diagram illustrating layers of a protective housing 1200 in accordance with an illustrative embodiment. As shown in FIG. 12, protective housing 1200 can have a water-resistant layer 1215, a fire-resistant layer 1210, and an outside layer 1205. In alternative embodiments, protective housing 1200 can have additional or fewer layers or have a different arrangement of layers. The layers 1205, 1210, and 1215 can enclose an internal space 1220. The internal space 1220 can be used to house various electronics, for example recording device 1100. The electronics housed in the internal space 1220 can have an insulating material. For example, the electronics can be potted using polyurethane, acrylic, silicone, epoxy resin, parylene, or any other material that will protect the electronics from heat, dust, debris, and/or liquid. In some embodiments, the protective housing 1200 can be tamper-proof. In such embodiments, the protective housing 1200 cannot be opened without specialized tools and/or destroying the protective housing 1200.

The water-resistant layer 1215 can be comprised of a water-impervious material, for example plastic. The materials of the protective housing 1200 can be comprised of materials that permit electronics housed in the internal space 1220 to communicate wirelessly with devices located outside of the protective housing 1200. For example, the various layers of the protective housing 1200 can be non-metals.

A fire-resistant layer 1210 can be configured to keep the internal space 1220 at a particular temperature given certain conditions. For example, the fire-resistant layer 1210 can be configured to maintain a temperature of 257° F. or lower when the outside temperature is 1,200° F. for forty-five minutes. In another example, the fire-resistant layer 1210 can be configured to protect data stored on a memory within the internal space 1220 from a fire outside of the protective housing 1200 that can be up to 1,550° F. for thirty minutes, per ASTM International standard E-119 (also known as the American Society for Testing and Materials Standard). The fire-resistant layer 1210 can be comprised of a single layer or multiple layers. In an embodiment with multiple fire-resistant layers 1210, the various layers can be comprised of the same material or different materials. In an embodiment, the fire-resistant layer 1210 can be 2.5 inches thick.

The fire-resistant layer 1210 can be comprised of a low-conductivity material. The fire-resistant layer 1210 can also be comprised of a hydrate material, for example alum (e.g., potassium aluminum sulfate) or gypsum (e.g., calcium sulfate dihydrate). In an embodiment, the fire-resistant layer 1210 can be comprised of gypsum board. The fire-resistant layer 1210 can comprise moisture (e.g., water trapped in the gypsum board at room temperature). The moisture can vaporize when heated, thereby absorbing heat and preventing outside heat from increasing the temperature of the internal space 1220.

The outside layer 1205 can protect the fire-resistant layer 1210 from dirt, debris, excess moisture, etc. when the protective housing 1200 is not in an extreme environment. The outside layer 1205 can also be used to improve the aesthetics of the protective housing 1200.

In some embodiments, the housing 1200 can further include a crush-resistant layer (not shown in FIG. 12). The crush-resistant layer can maintain a structural rigidity and/or protect the internal space 1220 from a force of 5,000 pounds. The crush-resistant layer can be billet machined. For example, the crush-resistant layer can be billet aluminum or billet titanium, e.g., Grade 2 titanium. In an example, the crush-resistant layer can be billet aluminum and withstand 2,000 pounds of force while maintaining structural integrity. In another example, the crush-resistant layer can be billet titanium and withstand 5,000 pounds of force while maintaining structural integrity. In an embodiment, the crush-resistant layer can surround the fire-resistant layer 1210. In other embodiments, the fire-resistant layer can surround the crush-resistant layer. In some embodiments, the crush-resistant layer can be approximately four inches wide, six inches long, and one inch high. In such an embodiment, if the crush-resistant layer is formed of aluminum, the crush-resistant layer can weigh approximately one pound. Further, if the crush-resistant layer is formed of titanium, the crush-resistant layer can weigh approximately 1.5 pounds.

In some embodiments, for example those with a metal crush-resistant layer, the protective housing 1200 can further include an external antenna. In some embodiments, the antenna can be a low-frequency antenna. The antenna can be encapsulated in a low-permeability ceramic potting layer. The ceramic potting layer can be formed over a surface of the protective housing 1200. The ceramic potting layer can be any ceramic potting layer known to those of skill in the art, for example the ceramic potting layer discussed in U.S. Pat. No. 3,078,186, which is incorporated herein by reference in its entirety. The ceramic potting material can insulate and seal the external antenna. A feed line can be fed through the protective housing 1200 from the external antenna to electronics stored within internal space 1220.

Protective housing 1200 can have an electrical access hole 1225 to allow electrical cables (e.g., Ethernet, power, etc.) to access electronics housed inside the protective housing 1200. The access hole can be configured to prevent water from entering the protective housing 1200. For example, the interior access hole can be offset from the exterior access hole, as shown in FIG. 12. In some embodiments, the space within the electrical access hole 1225 that is not occupied by cables can be filled with a water impervious material.

The protective housing 1200 can be secured such that the protective housing 1200 cannot be easily removed from a building. The protective housing 1200 can be securely fastened to, for example, steel beams, a concrete foundation, a water heater, a main water pipe, etc. In some embodiments, protective housing 1200 can be configured to be secured to a water pipe. The water pipe can be any size, for example, 0.5 inches, 1 inch, 1.5 inches, 2 inches, 6 inches, etc. in diameter. The protective housing 1200 can include a concave side that is configured to receive the pipe. The protective housing 1200 can also include a strap, locking mechanism, or other securing mechanism to secure the protective housing 1200 to the pipe. The protective housing 1200 can be configured to be cooled by the water pipe, for example in the case of a fire. In an illustrative embodiment, the protective housing 1200 can include a heat sink to transfer heat from the internal space 1220 to the water pipe. In some embodiments, the protective housing 1200 can be secured underground. The protective housing 1200 can also be hidden from ready access, such as within a wall. In some embodiments, the protective housing 1200 can be placed within a water tank, e.g., an aquarium. In such embodiments, electronics within the internal space 1220 can be in communication with an antenna located out of the water, thereby improving communications of the electronics within the internal space 1220.

FIGS. 14-20 show the outputs of a sensory node 705 in accordance with an illustrative embodiment of the present disclosure and of a commercially available smoke detector (labeled "OEM Detector"). As shown in FIGS. 14-20, the wireless outputs of sensory node 705 comprise numerical data points (labeled on the left-hand Y-axis) and the outputs of the commercially available smoke detector comprise discrete, descriptive data points.

Figure 14:
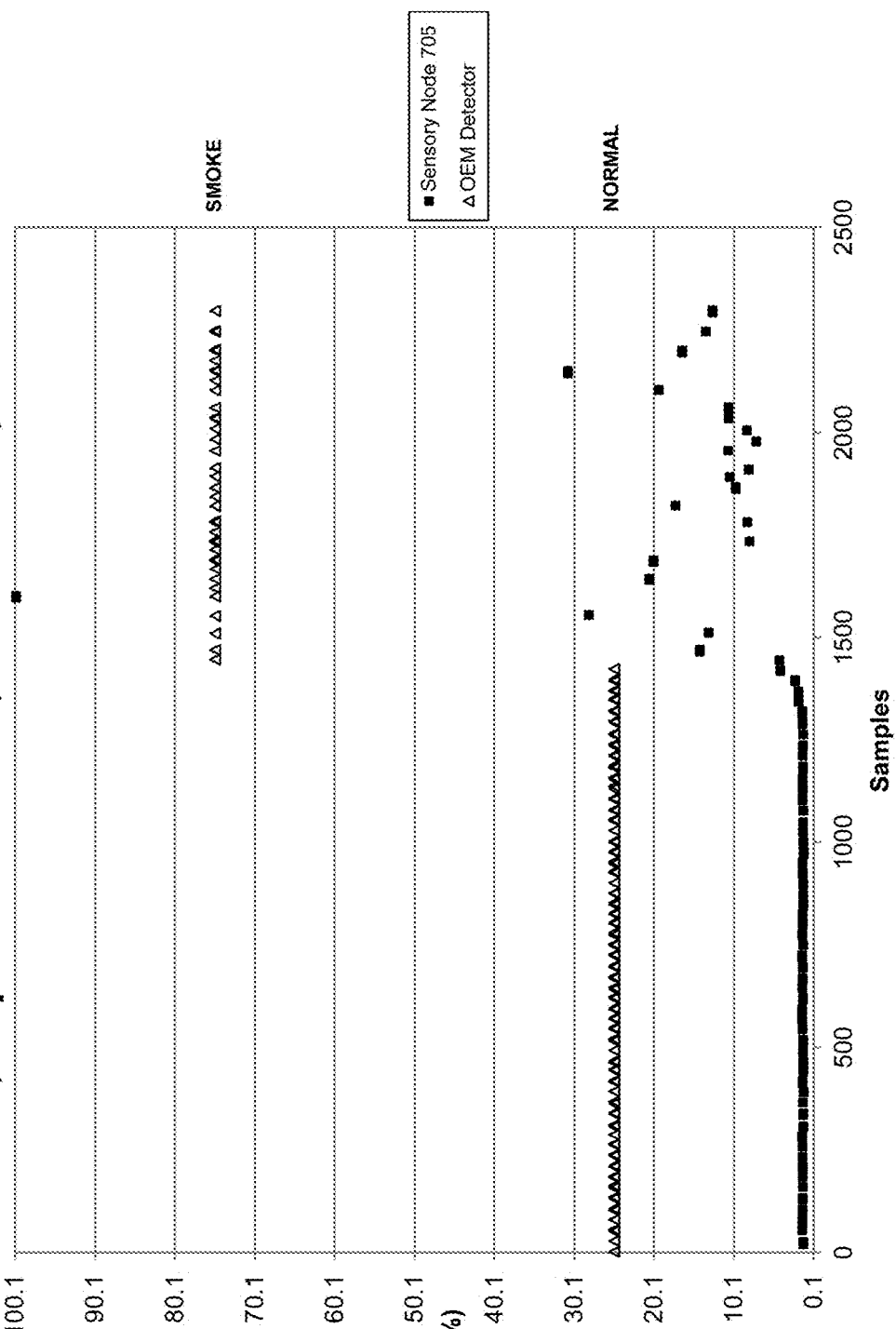
FIG. 14 is a graph illustrating exemplary outputs of a sensory node detecting a paper fire in accordance with an illustrative embodiment.
Figure 15:
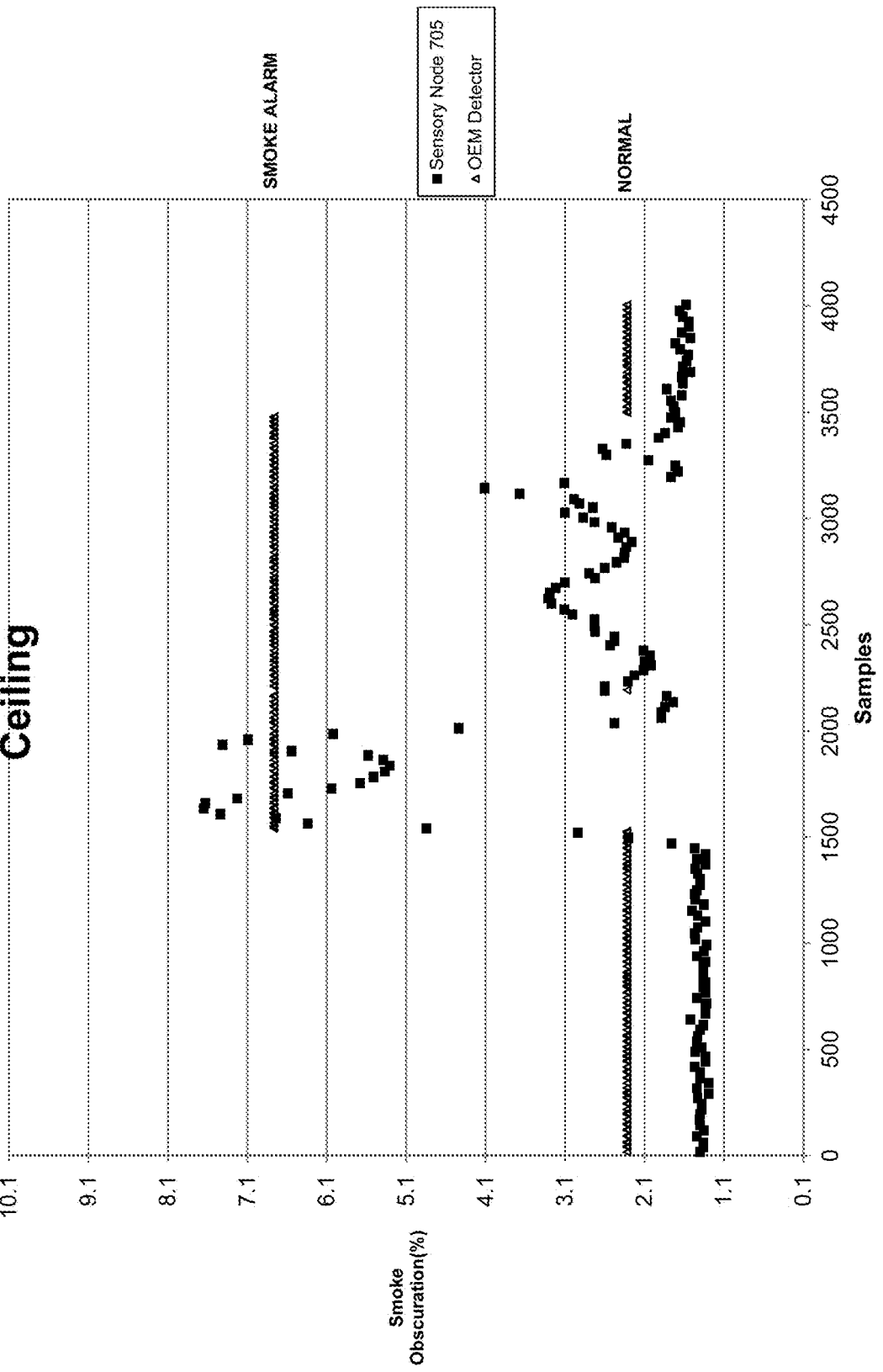
FIG. 15 is a graph illustrating exemplary outputs of a sensory node detecting a wood fire in accordance with an illustrative embodiment.

FIG. 14 is a graph illustrating exemplary outputs of a sensory node 705 detecting smoke from a paper fire in accordance with an illustrative embodiment. FIG. 15 is a graph illustrating exemplary outputs of a sensory node 705 detecting smoke from a wood fire in accordance with an illustrative embodiment. As shown in FIG. 15, the sensor node 705 detected smoke initially rising to about 7.5% obscuration corresponding to the smoldering wood. The sensor node 705 then detected a drop in smoke down to about 5.5% obscuration before detecting smoke levels of about 7.5% obscuration again, corresponding to the ignition of the wood. The up-down-up cycle of smoke detection occurs in this exemplary test because as the smoke smolders and produces smoke, the smoke level at the sensory node 705, which was placed on the ceiling, increases to about 7.5% obscuration. When the wood ignites, a heat wave is generated that rises to the ceiling and then radiates outward towards the sensory node 705. As the heat wave passes by the sensory node 705, the smoke is momentarily reduced at the sensory node 705 before rising to about 7.5% obscuration again. Thus, by monitoring real-time data from sensory node 705, system server 700 (or a user of system server 700) can determine the point and/or time of ignition of the fire by a graph similar to the graph shown in FIG. 15. In an exemplary embodiment, system server 700 can monitor the smoke levels detected by a sensory node 705 and determine the fuel that started the fire. System server 700 can then send the information (e.g., what fuel started the fire) in a notification to a user via, e.g., user device 710 or emergency responder device 725. In another exemplary embodiment, system server 700 can monitor the smoke levels detected by a sensory node 705 and send the detected information to, for example, user device 710 or emergency responder device 725. The device receiving the information can then determine, based on the received information, what fuel started the fire.

Figure 16:
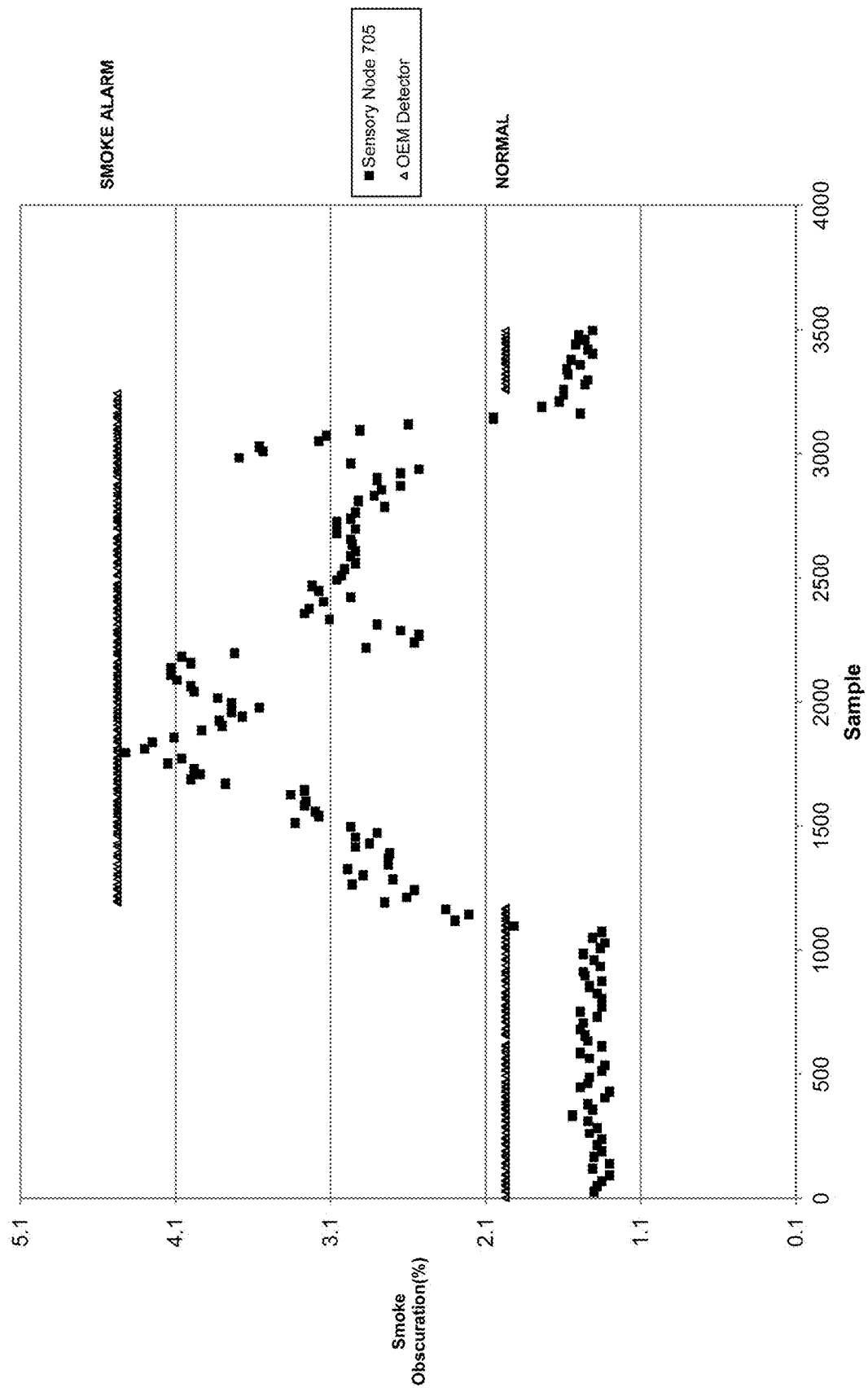
FIG. 16 is a graph illustrating exemplary outputs of a sensory node detecting a flammable liquid fire in accordance with an illustrative embodiment.

FIG. 16 is a graph illustrating exemplary outputs of a sensory node 705 detecting smoke from a flammable liquid fire in accordance with an illustrative embodiment. FIGS. 14-16 show the different smoke signatures from fires fueled by different materials. Monitoring, tracking, and/or storage of such real-time and/or streaming data can be used to determine what started a fire based on the smoke signature of the fire. For example, the magnitude of the smoke detected can be used to differentiate the fuel supplying the fire. Such information can be used, for example, by emergency personnel to determine how to respond to such a fire.

Figure 17:
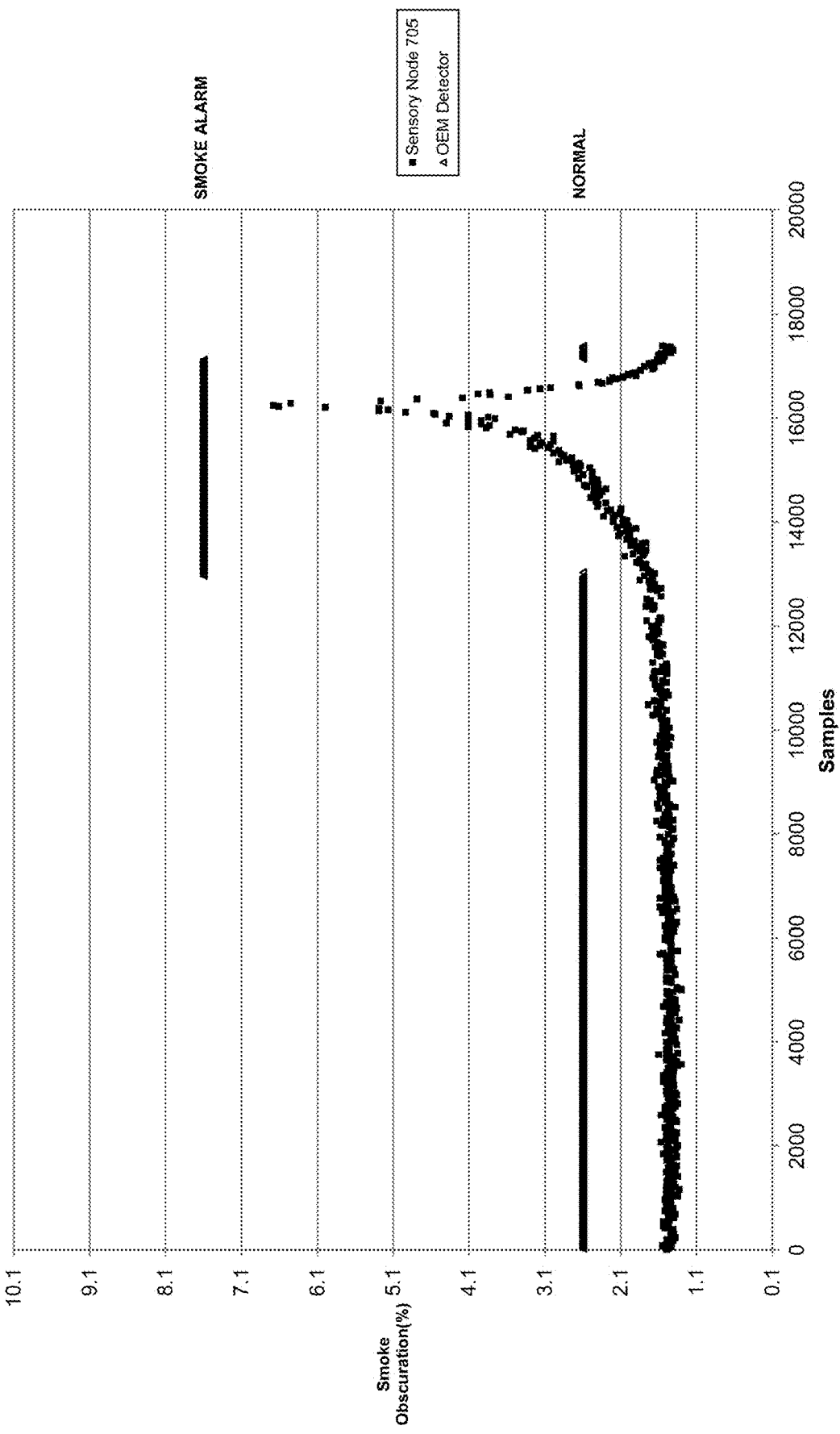
FIG. 17 is a graph illustrating exemplary outputs of a sensory node detecting a smoldering fire in accordance with an illustrative embodiment.

FIG. 17 is a graph illustrating exemplary outputs of a sensory node 705 detecting smoke from a smoldering fire in accordance with an illustrative embodiment. As shown in FIG. 17, between approximately sample 8,000 to sample 13,000 sensory node 705 detected a rise in smoke levels before the level of smoke rose to an alarm level. That is, around sample 13,000, a traditional smoke detector would alarm, even though there has been a rising level of smoke before the smoke levels rose to the alarm threshold. A continuous sample rate or near continuous sample rate (e.g., one sample per three seconds) can identify a potentially hazardous situation before a traditional smoke detector by monitoring the first derivative (i.e., the rate of change) of the smoke level detected by the sensory node 705. For example, sensory node 705, system server 700, user device 710, or any other computing device that can receive such real-time data can identify a continuous rate of change in the smoke level detected by sensory node 705 and warn occupants and/or users of a potential hazard before the smoke levels trigger an alarm.

Figure 18:
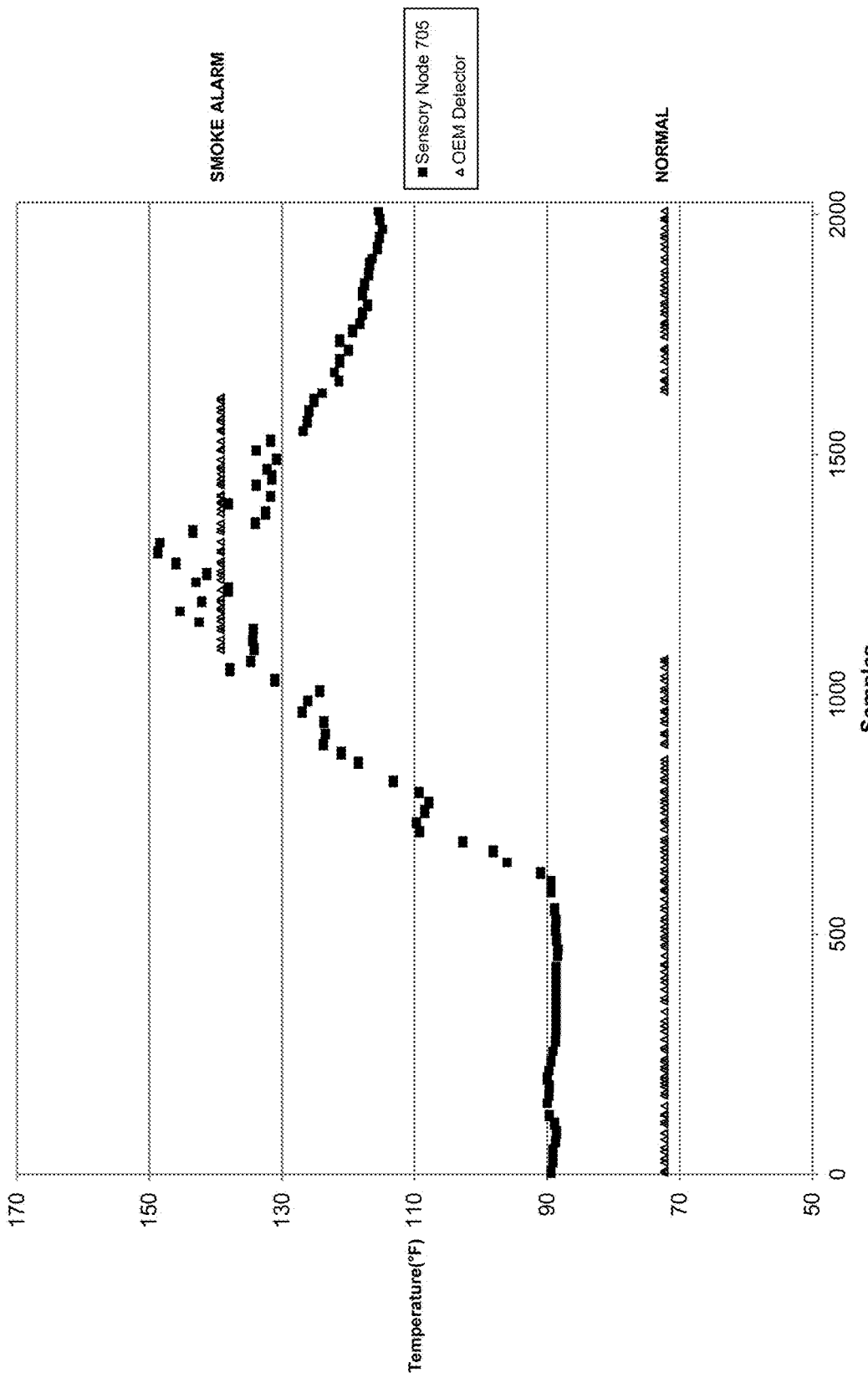
FIG. 18 is a graph illustrating exemplary outputs of a sensory node detecting a fire in accordance with an illustrative embodiment.
Figure 19:
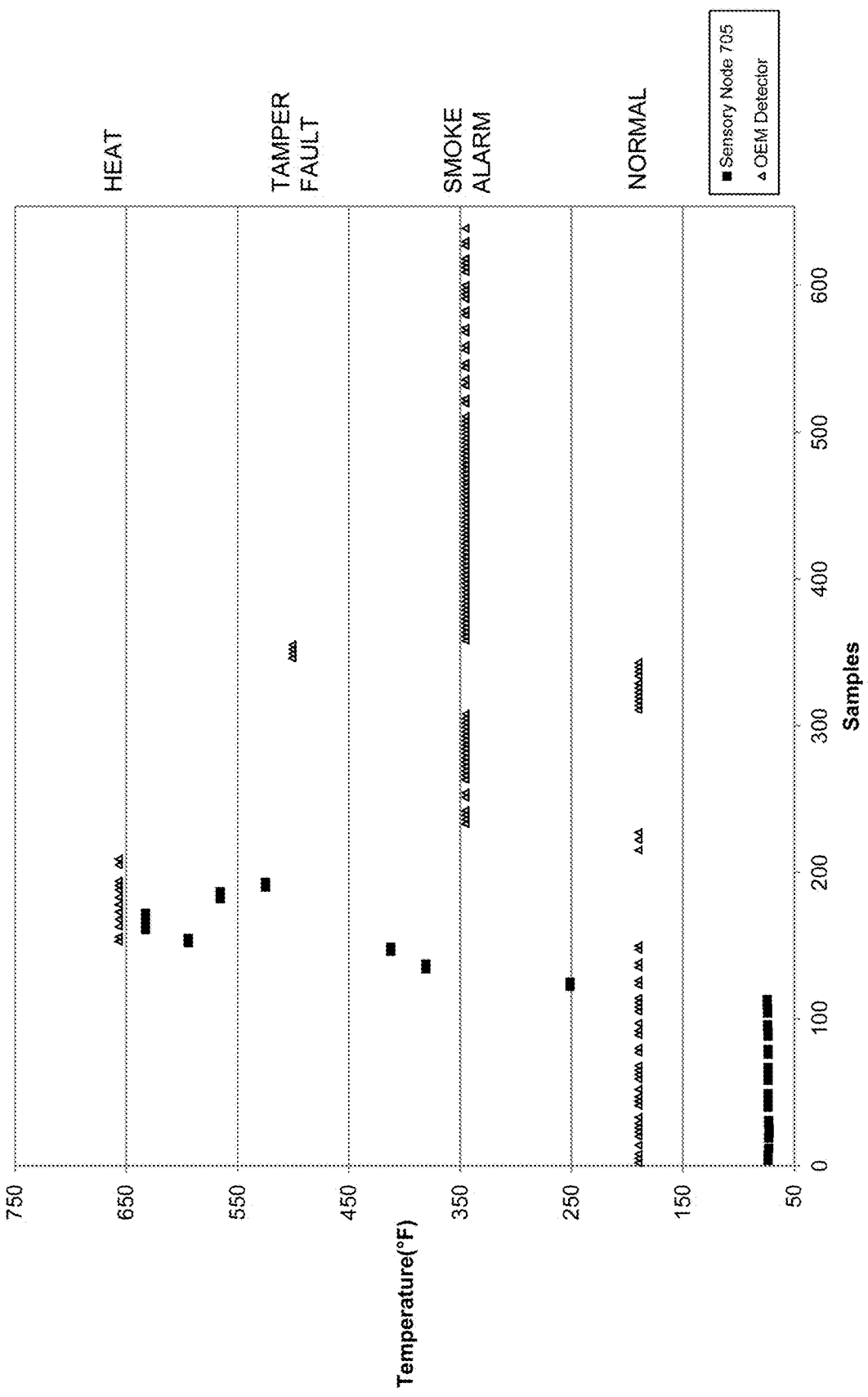
FIG. 19 is a graph illustrating exemplary outputs of a sensory node detecting high temperatures in accordance with an illustrative embodiment.
Figure 20:
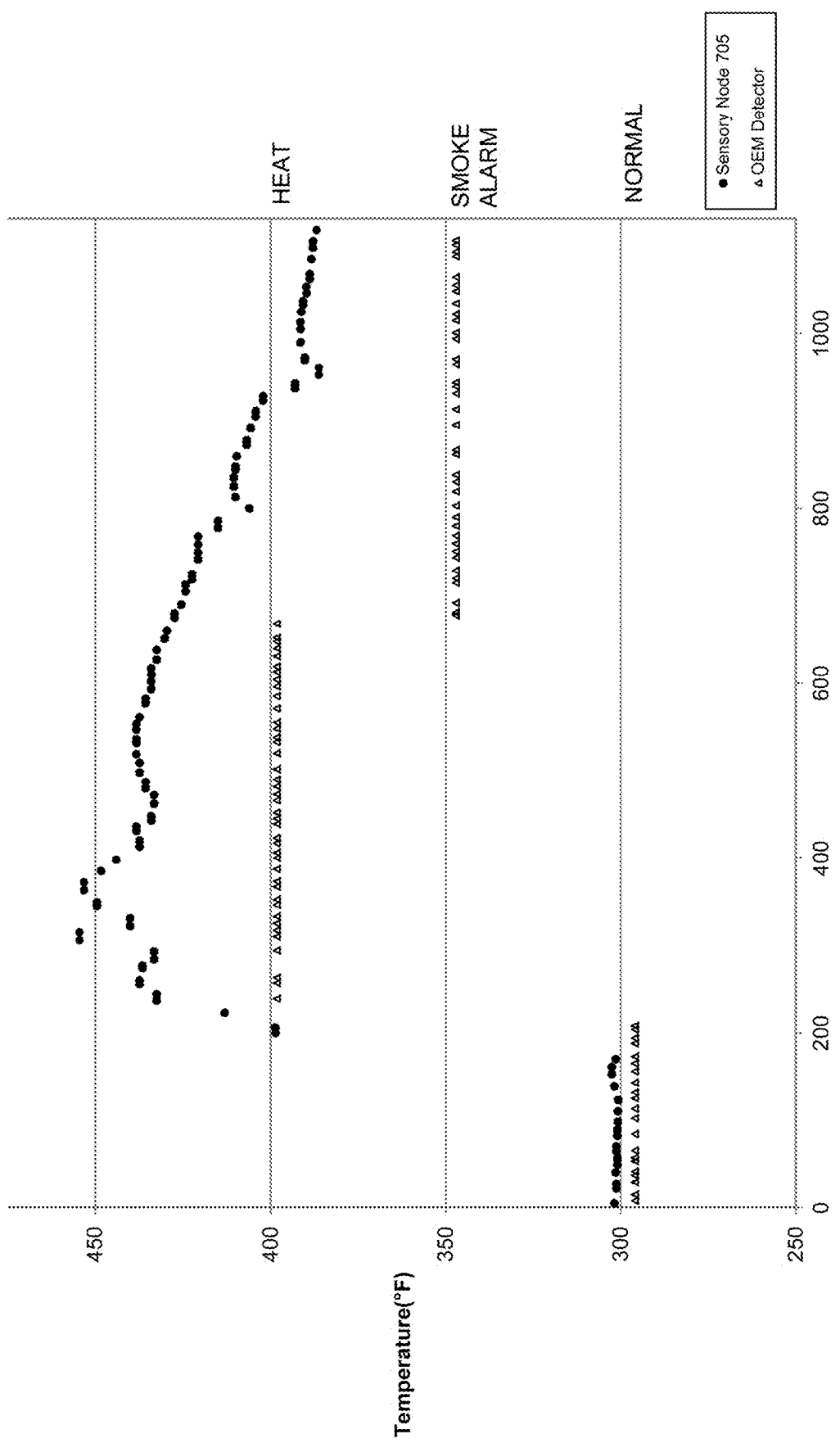
FIG. 20 is a graph illustrating exemplary outputs of a sensory node detecting high temperatures in accordance with an illustrative embodiment.

FIG. 18 is a graph illustrating exemplary outputs of a sensory node 705 detecting temperature of a fire in accordance with an illustrative embodiment. FIG. 19 is a graph illustrating exemplary outputs of a sensory node 705 detecting high temperatures in accordance with an illustrative embodiment. FIG. 20 is a graph illustrating exemplary outputs of a sensory node detecting high temperatures in accordance with an illustrative embodiment. FIGS. 18-20 illustrate that sensory nodes 705 in accordance with the present disclosure can register temperatures up to (and beyond) 700° F.

As shown in FIG. 19, sensory node 705 can be configured to provide an indication of only one sensed alarm condition at a time. For example, the sensory node 705 can be configured to transmit either a smoke alarm or a high heat alarm. In such an embodiment, the smoke alarm indication can be given priority over the high heat alarm, as per UL Standard UL-217, § 34.1.6 (6th ed., Nov. 20, 2012). That is, if a smoke condition and a high heat condition are detected, the sensory node 705 will transmit only the smoke alarm.

However, in other embodiments, sensory node 705 can be configured to give priority to the high heat alarm. In yet other embodiments, sensory node 705 can be configured to transmit a plurality of alarms simultaneously (e.g., at the same time, in rapid succession, etc.). In addition to smoke alarm conditions and heat alarm conditions, sensory node 705 can be configured to transmit other fault and/or alarm conditions such as tamper conditions, battery level, sensitivity, settings, etc. In many circumstances, emergency responders may be more interested in the temperatures within a building that is on fire than with the smoke concentration. In some circumstances, emergency responders are interested in both smoke concentration and heat.

Thus, a sensory node 705 that can communicate multiple conditions at once can be useful to emergency responders.

For example, emergency responders can receive a temperature and smoke concentration detected by sensory node 705 and can monitor changes in temperature and smoke conditions as the fire progresses. Emergency responders can also monitor the status of the sensory node 705, such as a tamper condition indicating that a cover plate has melted. In a further example, emergency responders can, while the sensory node 705 indicates a smoke alarm, monitor the temperature sensed by sensory node 705 rise and trigger a heat alarm. While also monitoring the smoke alarm of the sensory node 705, emergency responders can monitor the sensed temperature reach, for example, 700° F. before falling to a default, non-alarm temperature. In such a situation, emergency responders can infer that the temperature of sensory node 705 continued to rise, but the sensory node 705 experienced a problem (e.g., the burning of a thermistor). As discussed above, under UL Standard UL-217, emergency responders utilizing the system described herein may receive only a smoke alarm. The emergency responders would not receive any indication that there is a temperature problem until after the smoke clears below the alarm threshold, and emergency responders may make incorrect inferences based on such data. However, with smoke alarms and temperature information available at the same time, emergency responders can make more appropriate inferences and assumptions about a situation.

Figure 21:
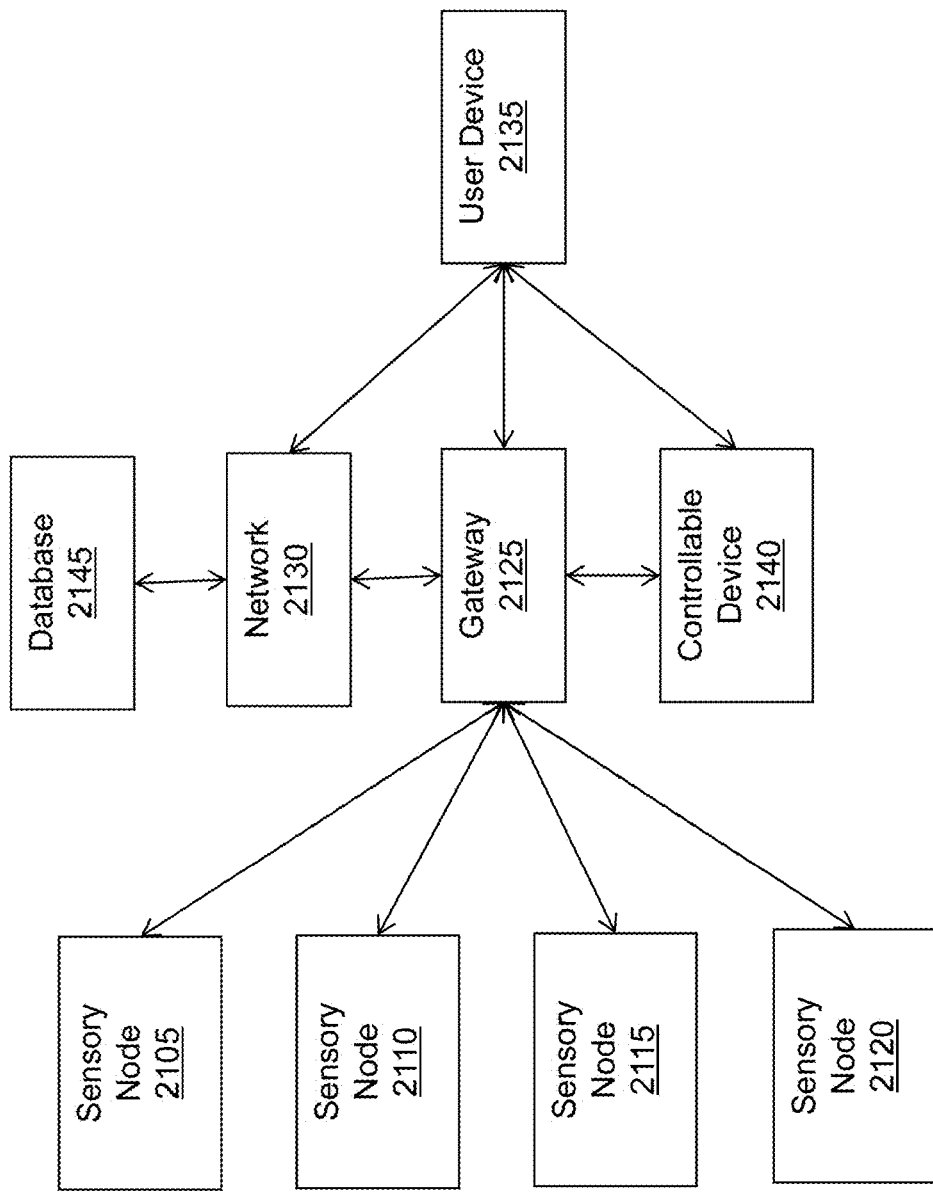
FIG. 21 is a block diagram illustrating monitoring and control of a controllable device based on sensed conditions in accordance with an illustrative embodiment.

FIG. 21 is a block diagram illustrating monitoring and control of a controllable device based on sensed conditions in accordance with an illustrative embodiment. The system includes sensory node 2105, sensory node 2110, sensory node 2115, and sensory node 2120, each of which is in communication with a gateway 2125. The system also includes a database 2145, a user device 2135, and a controllable device 2140 that communicate with one another via a network 2130. In alternative embodiments, fewer, additional, and/or different components may be included in the system.

In an illustrative embodiment, sensory nodes 2105-2120 can be any of the nodes described herein and can include any of the node functionality described herein. The sensory nodes 2105-2120 can communicate with the gateway 2125 through a wired connection or through a wireless connection such as a short-range communication. In one embodiment, the gateway 2125 can be a device that acts to receive, store, and/or distribute information received from the sensory nodes 2105-2120. The gateway 2125 can receive information from the sensory nodes regarding occupancy, sensed conditions, battery life, etc. In an alternative embodiment, the gateway 2125 may be a decision node that includes at least some sensory functionality. The gateway 2125 is in communication with network 2130, which can be a local area network, a wide area network, a telecommunications network, and/or any other network known to those of skill in the art.

The database 2145 is in communication with the network 2130 such that the database 2145 is able to receive information from the gateway 2125 regarding occupancy, sensed conditions, battery life, etc. The database 2145 can be used to store and sort the received information. The stored information can be sorted based on the particular sensory node from which the information originated, based on time of day that a condition was detected, based on the day of the week that the condition was detected, etc. such that trends can be identified for the particular sensory node. In one embodiment, the database 2145 can include the processing power to identify trends in the accumulated history of information received from the sensory nodes. Alternatively, the processing of information may occur at the gateway 2125, at the user device 2135, or at another component of the system.

The user device 2135 can be a cellular phone, a tablet, a laptop computer, a desktop computer, a gaming device, or any other type of personal computing device that is able to communicate through network 2130. In an illustrative embodiment, the user device 2135 is a smartphone. The user device 2135 can receive information from database 2145 and gateway 2125 via network 2130. The user device can also receive information directly from gateway 2125 through a wireless or wired connection. The information received by the user device 2135 can include alerts, data regarding sensed events, data regarding the battery condition of sensory nodes, identified trends in sensed data, etc. User device 2135 is also in communication with controllable device 2140 as discussed in more detail below.

The controllable device 2140 can be a household appliance, a controllable valve, an electrical outlet, a heating/cooling system, etc. In an illustrative embodiment, the controllable device 2140 is a device associated with the structure that is affected by a sensed evacuation condition or a device associated with the structure that might cause an evacuation condition. For example, an oven/stove/range is a controllable device that can potentially cause an evacuation condition in the form of smoke or a fire. The controllable device 2140 can similarly be a curling iron, a furnace, a controllable valve on a water main or other water line, a controllable valve on a gas line, a dishwasher, a microwave, a refrigerator, a freezer, an air conditioning unit, a water softener, a hot water heater, a gas fireplace, a fireplace fan or other house fan, etc.

In an illustrative embodiment, the controllable device 2140 includes a control unit that allows for remote and/or automated control of the controllable device 2140. The control unit can include a wireless communication component that is configured to receive wireless control signals to place the controllable device into an off (or shut down) state. Alternatively, the control unit may receive the control signal through a wired connection. The control unit can also include a switch, actuator, signal generator, or other component that is able to place the controllable device into the off (or shut down) state.

In one embodiment, communication with the controllable device 2140 can be one way communication. For example, in the event of an evacuation condition, a control signal can be sent to the controllable device to place the controllable device in the off state, regardless of whatever state the controllable device was in when the evacuation condition was detected. Alternatively, communication with the controllable device 2140 can be two-way such that the control unit of the controllable device can provide an indication of whether the controllable device is in an on state or an off state. The indication of state can be transmitted by the controllable device to any component of the system that is in communication with the controllable device. In such an implementation, the controllable device can periodically broadcast the indication of its state to one or more other components in the system, or the controllable device can transmit its state in response to a status request received from another component in the system.

In one embodiment, a control signal can be generated by the gateway 2125 and provided to the controllable device 2140. The control signal can be generated in response to detection of an evacuation condition by a sensory node. The control signal can also be generated based on an instruction received from the database 2145 and/or from the user device 2135. The control signal may also be generated by the user device 2135 and/or the database 2145, and sent directly to the controllable device 2140 from the user device 2135 or the database 2145. In one embodiment, the control signal can be generated and directly sent to the controllable device 2140 by one or more of the sensory nodes.

In an illustrative embodiment, the controllable device 2140 is monitored and/or controlled based on information that is sensed by the sensory nodes. For example, in one embodiment, one or more controllable devices may be placed into an off state as a result of one or more nodes in the structure detecting an evacuation condition or other condition such as running water, elevated levels of smoke/heat, elevated levels of carbon monoxide, etc. In one embodiment, all controllable devices in the structure are placed into the off state responsive to detection of an evacuation condition by any node in the structure. Alternatively, only controllable devices which are proximate to the sensory node that detects the evacuation condition may be placed into the off state. Proximate can refer to being in the same room of the structure or being within a certain distance of one another, such as within 20 ft, within 30 ft, within 50 ft, etc. In another embodiment, the controllable devices which are placed into the off state may be based on the type of evacuation condition that is detected and/or the severity of the detected evacuation condition. The determination of whether to place the controllable device into the off state can also be based at least in part on detected occupancy within the structure (i.e., the determination of whether to turn off the controllable device may be based in part on whether any occupants are in the structure at the time that the evacuation condition or other condition is detected).

The controllable device 2140 may also be controlled based at least in part on monitoring that results in historical information being stored in the database 2145 or other location. The historical information can be information regarding previously sensed conditions within the structure. The historical information can also refer to trends that are identified as a result of previously sensed conditions within the structure. The trends may be identified by a processing component of the database 2145, by the gateway 2125, by the user device 2135, and/or by one or more of the sensory nodes. For example, a sensory node located in a bathroom of a structure may detect elevated levels of humidity on weekday mornings between 6:30 am and 7:00 am as a result of an occupant's daily shower before going to work, and the system may identify this occurrence as a trend based on accumulated data over a period of time. The system can then know that detection of elevated humidity levels in that bathroom between 6:30 am and 7:30 am is an ordinary occurrence that does not require any action to be taken such as alerting the user, turning off a water supply to the bathroom, turning off a water main to the structure, etc.

As an example, the controllable device 2140 can be a range that is located in a kitchen of a structure. Although a range is used in several of the examples below, it should be understood that the controllable device 2140 is not limited to a range and can be any of the other devices/systems described herein. If an evacuation condition is detected by a sensory node located in the structure, an indication of the evacuation condition can be provided from the sensory node to the gateway 2125. In response to receiving the indication of the evacuation condition, the gateway 2125 can generate a control signal and send the control signal to the control unit of the range to automatically turn off the range so that it does not contribute (or further contribute) to the evacuation condition. In one embodiment, the gateway 2125 may not know the status of the range (i.e., whether the range is on or off), and the control signal is sent to the range regardless of whether the range is in the off state or on state to ensure that the range is off. In an alternative embodiment, the gateway 2125 can send a status request signal to the control unit of the range, where the status request signal inquires as to the current state of the range. In response to the status request signal, the control unit of the range can send a status indicator signal back to the gateway 2125 which specifies the current state of the range. If the status indicator signal indicates that the range is already in an off state, a control signal is not sent from the gateway 2125 to the range. If the status indicator signal indicates that the range is in an on state, a control signal is sent from the gateway 2125 to the range to place the range in the off state. In another alternative embodiment, the control unit of the range may periodically broadcast a status indicator signal to the gateway 2125 such that the gateway 2125 is aware of the status of the range. In the event of an evacuation condition, the gateway 2125 can take appropriate action based on a most recent status indicator signal broadcast by the range. For example, if an evacuation condition is detected, and the most recent status indicator signal indicates that the range is off, the gateway 2125 can take no action. However, if an evacuation condition is detected, and the most recent status indicator signal indicates that the range is on, the gateway 2125 can send a control signal to the control unit of the range to turn the range off.

In an embodiment in which the control unit of the controllable device 2140 is able to broadcast a status indicator signal, the controllable device 2140 can also be configured to transmit information regarding any defects or problems with the controllable device. As just one example in which the controllable device is a furnace, the furnace can be configured to detect reduced air flow as a result of a clogged filter. In response to detection of the reduced air flow, the control unit of the furnace can send a message directly or indirectly to the user device 2135 with an indication that the filter should be replaced. Similarly, the controllable device 2140 can transmit indications of mechanical failure, maintenance reminders, etc. to the user.

In an alternative implementation of the above example, the interactions with the control unit of the range may be performed by the user device 2135. For example, upon detection of an evacuation condition in the structure, an indication of the evacuation condition can be provided to the user device 2135 either directly from the sensory node that detected the evacuation condition, from another sensory node in communication with the sensory node that detected the evacuation condition, directly from the gateway 2125, or indirectly from the gateway 2125 or a sensory node through the network 2130. Upon receipt of the indication of the evacuation condition, the user device 2135 can automatically cause a control signal to be sent to the range to turn the range off. The control signal can be sent directly from the user device 2135 to the range, or indirectly from the user device 2135, through the network 2130 to the gateway 2125 such that the gateway 2125 can send the control signal on to the range. As discussed above with respect to communications between the gateway 2125 and the range, the user device 2135 may similarly receive a status indicator signal from the range as either a periodic broadcast from the range or in response to a status request signal initiated by the user device 2135 and sent either directly or indirectly to the range.

In one embodiment in which the user device 2135 interacts with the controllable device 2140, the user device 2135 can, upon receipt of an indication of an evacuation condition, prompt a user of the user device 2135 regarding whether the user wishes to send a control signal to turn off the controllable device 2140. The prompt may include information regarding which sensory node detected the evacuation condition, the severity of the evacuation condition, the type of the evacuation condition, etc. such that the user can make an informed decision regarding whether to turn off the controllable device 2140. In one embodiment in which the user device 2135 is aware of the state of the controllable device 2140 based on a status indicator signal received directly or indirectly from the controllable device 2140, the user device 2140 may only prompt the user to take action if the controllable device 2140 is on. In an illustrative embodiment, the user can also use the user device 2135 to remotely control any controllable devices regardless of whether any condition is sensed within the structure.

In another implementation, actions taken by the gateway 2125 or user device 2135 with respect to the controllable device 2140 may occur in only certain situations based on the specific sensory node that detected the evacuation condition, the type of the evacuation condition, the severity of the evacuation condition, detected occupancy within the structure, and/or historical information or trends identified by the system based on an accumulated history of sensed data within the structure. For example, the system may be configured such that the controllable device 2140 is turned off only in the event of an evacuation condition being detected by one or more specific sensory nodes. In such an embodiment, the controllable device 2140 may be a range in a kitchen of the structure and the range may be turned off only if the evacuation condition is detected by a sensory node located in the kitchen, only if the evacuation condition is detected by a sensory node located in the kitchen or by a sensory node located in a hallway adjacent to the kitchen, etc.

Similarly, the controllable device 2140 may be turned off only if the detected evacuation condition is of a certain type. For example, if the controllable device 2140 is a range, the range may be turned off only if the detected evacuation condition is heat or smoke. As discussed above, the range may also be turned off only if the smoke/heat is detected by one or more specific sensory nodes that are located proximate to the range. Similarly, the controllable device may be a furnace that is turned off if the detected evacuation condition is an elevated carbon monoxide (CO) level within the structure. In such an example, the furnace may be turned off if the high CO level is detected anywhere within the structure or by one or more specific sensory nodes within the structure. Similarly, a water valve may be turned off if one or more sensory nodes detect running water for an unusual duration of time or at a time of day when water is not normally running in the structure based on historical information saved in the database 2145 regarding prior water use in the structure. As another example, the controllable device 2140 may be a shut-off valve on a gas line (e.g., natural gas or propane) coming into the structure, and the valve may be turned off if any sensory node in the structure detects excessive heat or smoke, or if one or more specific sensory nodes detect such excessive heat or smoke. The valve to turn off the gas line can be located within the structure or external to the structure, depending on the implementation.

Additionally, the determination of whether to send a control signal to turn off the controllable device 2140 can be based at least in part on a severity or a magnitude of the sensed condition. For example, thresholds can be used to determine when to send a control signal. One threshold can be temperature such that a control signal is sent to one or more predetermined controllable devices if the temperature exceeds X degrees Fahrenheit, where X can be 100°, 105°, 110°, 120°, etc. Similarly, the control signal can be sent to one or more predetermined controllable devices if a detected carbon monoxide level exceeds a threshold level, if detected water flow exceeds a threshold rate, if smoke concentration exceeds a threshold level, etc.

The determination of whether to send a control signal to turn off the controllable device 2140 can also be based at least in part on detected occupancy within the structure. For example, in the event of a detected condition, a control signal to turn off the controllable device 2140 may be sent only if the system determines that there are no occupants present in the structure. Similarly, the control signal may be sent only if there are no occupants detected in a certain portion of the structure, such as a particular room or rooms.

In another illustrative embodiment, the determination of whether to send a control signal to turn off the controllable device 2140 can also be based at least in part on historical information or trends that are identified over time by the system. The historical information can include time(s) of day and/or day(s) of the week when smoke is detected, time(s) of day and/or day(s) of the week when heat is detected, time(s) of day and/or day(s) of the week when instructions have been received from a user (e.g., via user device 2135) to not turn off a controllable device in the event of detected condition, time(s) of day and/or day(s) of the week when water flow is detected, etc. The historical information can also include levels of smoke, heat, gas, etc. that have previously been detected in the structure alone or in combination with the time(s) of day and/or day(s) of the week when such levels were detected. As a result, the system can identify false alarms based on prior activity in the structure. In the event that a potential false alarm is detected, the system can either take no action or request instructions from the user (e.g., via user device 2135) regarding whether to turn off controllable devices as a result of the sensed information.

The ability to avoid false alarms is also important in the context of a kitchen, where it is more common for smoke and/or heat to be generated during cooking. Many homes do not include a smoke detector or other sensor system in the kitchen due to the high number of false alarms that would be received as a result of cooking. This is a dangerous situation because many fires actually originate in the kitchen. With the ability to identify false alarms based on historical information, the present system allows for a sensory node to be placed in kitchens, improving the overall safety of the structure.

In one embodiment, sensory nodes or other components of the system can be configured to identify information regarding a fire based on a smoke signature received by one or more sensory nodes. The controllable device 2140 may be controlled based at least in part on the identified smoke signature. As discussed above, a smoke signature can be used to determine a type of fire and/or a source of fuel for a fire. As an example the smoke signature may indicate that a given fire is an grease/oil fire in the kitchen. As a result of the determination, the system can override a sprinkler system (i.e., controllable device) in the structure such that water is not put on the grease/oil fire, causing the fire to spread. In another embodiment, the smoke signature may indicate that the fire is a wood fire. Such detection of a wood fire in a home with a wood burning fireplace may be ignored up to certain thresholds of heat and/or smoke, whereas detection of a wood fire in a home without a wood burning fireplace may result in control signals being sent to one or more controllable devices within the structure and/or alerts sent to the user.

In another illustrative embodiment, the systems described herein may perform monitoring of controllable devices without implementing actual control of the controllable devices. For example, the system can be configured to identify out of boundary conditions, conditions which depart from previously recognized trends, etc. and alert a user and/or an external computing device of the identified condition such that the user and/or external computing device determines whether to implement a control instruction based on the alert.

Figure 22:
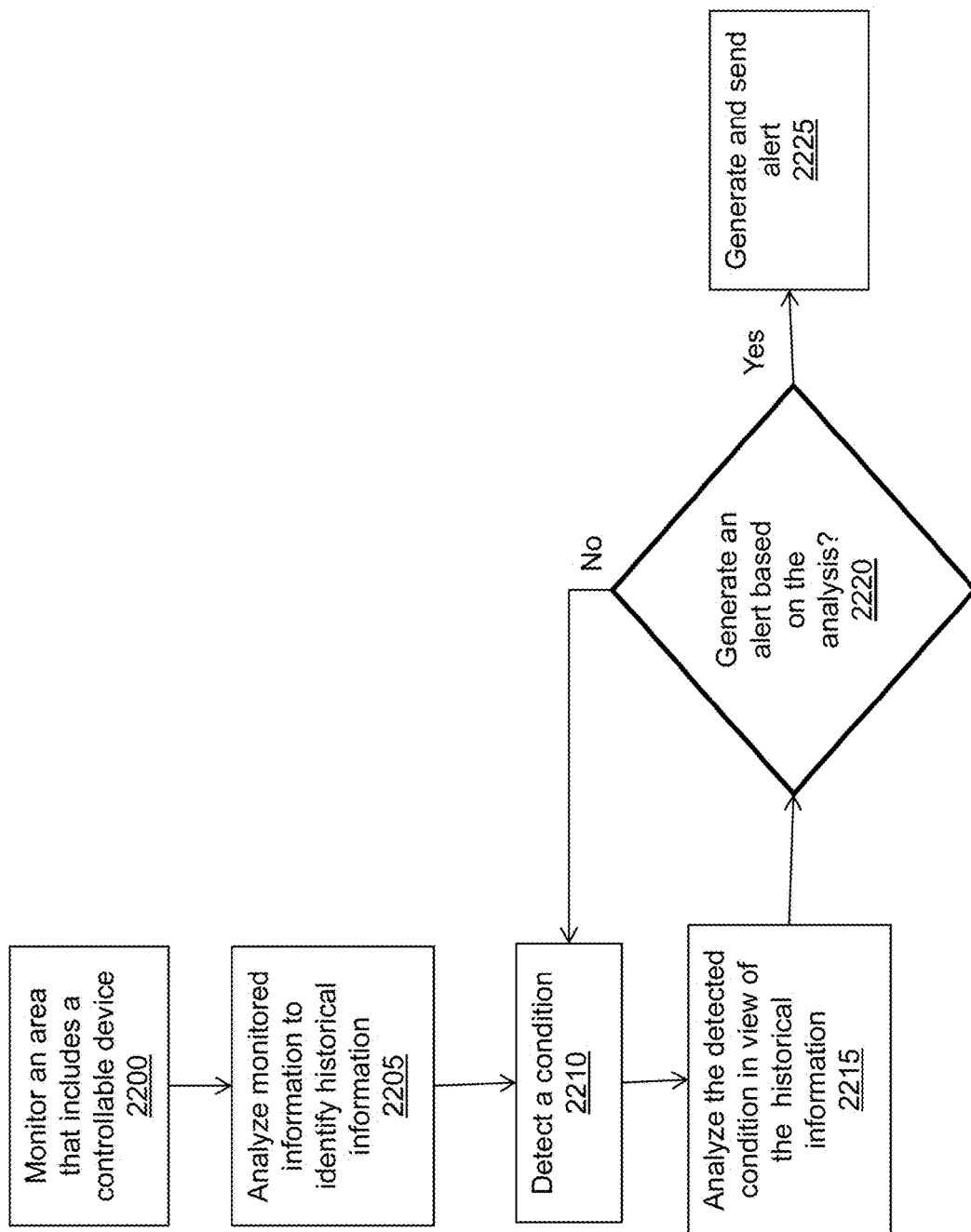
FIG. 22 is a flow diagram illustrating operations for monitoring a controllable device in accordance with an illustrative embodiment.

FIG. 22 is a flow diagram illustrating operations for monitoring a controllable device in accordance with an illustrative embodiment. In alternative embodiments, fewer, additional, and/or different operations may be performed. Also, the use of a flow diagram is not meant to be limiting with respect to the order of operations performed. In an operation 2200, the system monitors an area that includes a controllable device. The monitoring can be performed by one or more sensory nodes, as discussed herein. The area that is monitored can be a structure, a room or space within a structure, any other area proximate to a controllable device, and/or any other area associated with a controllable device. The controllable device can be any of the controllable devices described herein.

In an illustrative embodiment, information regarding the monitored area is stored in a database or other storage unit. In an operation 2205, the monitored information is analyzed to identify historical information. The historical information can include trends, patterns, normal times and/or durations of usage, etc. with respect to sensed conditions such as temperature levels, smoke levels, occupancy, water running, and so on. The analysis can be performed by any of the system components described herein, included the gateway, and user device, the database, and the sensor nodes themselves.

In an operation 2210, a condition is detected. The condition can refer to any type of condition that is sensed by one or more of the sensor nodes. For example, the detected condition can be running water, an increase in temperature, an increase in smoke, a decrease in temperature, a change in humidity, related to occupancy, etc. In an operation 2215, the detected condition is analyzed in view of the historical information. In an illustrative embodiment, the analysis is performed automatically by one or more of the system components, such as the gateway, the database, the sensory nodes, and/or the user device. The analysis can include identifying that a detected condition has exceeded a threshold and is potentially indicative of an out of bounds condition, where the threshold is based on the accumulated historical information. The analysis can also include identifying that the detected condition does not match a trend or pattern of the historical information.

In an operation 2220, a determination is made regarding whether to generate an alert based on the analysis of operation 2215. The determination can be made based on whether the detected condition exceeds a threshold or otherwise indicates that the controllable device should potentially be turned off. The determination can be made by the gateway, the database, or any other component of the system. If the determination of operation 2220 is affirmative, an alert is generated and sent in an operation 2225. In one embodiment, the alert is sent to a user device such that the user or the user device can determine whether the controllable device should be placed into an off state. If the user or user device determines that the controllable device should be placed into the off state, the user device can send a control signal to a control unit of the controllable device. In another embodiment, the alert can be sent directly to the control unit of the controllable device or an external computer, and the control unit or external computer can determine whether to place the controllable device into the off state. If the determination of operation 2220 is negative, the system continues monitor the area and detect conditions within the area.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents. Unless otherwise noted, use of the term "approximately," "about," or similar words is to mean plus or minus ten percent.

What is claimed is:

1. A method for monitoring devices comprising:
   sensing, by one or more sensory nodes, information in an area;
   determining, by a processor, that the area includes a controllable device;
   identifying, by the one or more sensory nodes, a condition in the area based on the sensed information;
   determining, by the processor, that the controllable device is within a predefined threshold proximity to the one or more sensory nodes that have identified the condition;
   sending, by the processor, an alert to a user device; and
   in response to the determination that the controllable device is within the predefined threshold proximity and in response to historical information regarding previously sensed conditions of the area, sending, by at least one of the processor or the user device, a control signal to the controllable device in response to identifying the condition, wherein the control signal causes the controllable device to enter an off state.

2. The method of claim 1, wherein sending a control signal to the one or more controllable devices is based, at least in part, on an occupancy of the area.

3. The method of claim 1, further comprising determining trends in the sensed information, wherein the trends are based on previously sensed information within the area.

4. The method of claim 3, wherein determining a condition is, at least in part, based on the determined trends in the sensed information.

5. The method of claim 1, wherein sending a control signal to the one or more controllable devices is, at least in part, based on a type of identified condition.

6. The method of claim 1, further comprising determining a severity of the identified condition.

7. The method of claim 6, further comprising sending a control signal to the one or more controllable devices upon identifying a condition if the severity of the identified condition is above a predetermined threshold.

8. The method of claim 1, wherein sending a control signal to the one or more controllable devices is, at least in part, based on a location of a sensory node of the one or more sensory nodes that identified the condition.

9. The method of claim 1, further comprising sending a status request signal to each of the one or more controllable devices, wherein the status request signal determines a state of each of the one or more controllable devices.

10. The method of claim 9, wherein sending a control signal to the one or more controllable devices is, at least in part, based on the state of each of the one or more controllable devices.

11. The method of claim 1, further comprising sending an alert to a user device regarding the identified condition.

12. The method of claim 11, wherein sending a control signal to the one or more controllable devices is executed by the user device.

13. A system comprising:

one or more sensory nodes configured to:

sense information in an area that includes one or more controllable devices; and identify a condition within the area, based on the sensed information;

a processor that is configured to:

determine that the one or more controllable devices are within a predefined threshold proximity to the one or more sensory nodes;

responsive to determining that the one or more controllable device are within the predefined threshold proximity and responsive to historical information regarding previously sensed conditions of the area, generate an alert regarding the one or more controllable devices in response to determining the proximity of the one or more controllable devices;

send the alert to a user device; and a user device configured to send a control signal to the one or more controllable devices, responsive to the sent alert, that causes the one or more controllable devices to go into an off state.

14. The system of claim 13, wherein the user device is configured to send the control signal to the one or more controllable devices based, at least in part, on an occupancy of the area.

15. The system of claim 13, wherein the one or more sensory nodes are further configured to determine trends in the sensed information, wherein the trends are based on previously sensed information within the area.

16. The system of claim 13, wherein the one or more sensory nodes are further configured to identify a condition within the area based on the trends in the sensed information.

17. The system of claim 13, wherein the user device is configured to send a control signal to the one or more controllable devices based, at least in part, on a type of identified condition.

18. The system of claim 13, further comprising a transmitter configured to transmit the alert to a control unit of the controllable device.

19. The system of claim 13, wherein the proximity is based on a predefined threshold.

20. The system of claim 13, wherein the user device is configured to send the control signal to the one or more controllable devices based at least in part on the state of each of the one or more controllable devices.

21. The method of claim 1, further comprising:

determining a status of the controllable device based on a broadcast status indicator signal associated with the controllable device; and in response to the broadcast status indicator signal, sending the control signal to the controllable device.

* * * * *